United States Patent [19]
Kohn et al.

[11] Patent Number: 5,963,447
[45] Date of Patent: Oct. 5, 1999

[54] MULTIPLE-AGENT HYBRID CONTROL ARCHITECTURE FOR INTELLIGENT REAL-TIME CONTROL OF DISTRIBUTED NONLINEAR PROCESSES

[75] Inventors: Wolf Kohn, Bellevue, Wash.; Anil Nerode, Ithaca, N.Y.

[73] Assignee: Hynomics Corporation, Kirkland, Wash.

[21] Appl. No.: 08/916,418

[22] Filed: Aug. 22, 1997

[51] Int. Cl.$^6$ .................................................. G05B 13/02
[52] U.S. Cl. .................... 364/148.04; 364/131; 364/188; 364/474.23; 706/10; 706/46; 706/59; 706/61; 395/11; 395/51
[58] Field of Search .............................. 364/148.04, 131, 364/188, 474.23; 706/10, 46, 59, 61, 45; 395/11, 51; 370/276; 702/182; 342/465

[56] References Cited

U.S. PATENT DOCUMENTS 4,724,495  2/1988  Hedberg et al. ........................... 360/22

OTHER PUBLICATIONS

A. Nerode and W. Kohn, "Foundations of Hybrid systems Including a Theory of Stability," in Hybrid Systems, Springer Verlag series in Computer Science #726, New York, 1993.

W. Kohn and A. Nerode, "Multiple Agent Autonomous Hybrid Control Systems," Proc. IEEE CDC 1992, vol. 4, pp. 2956, 2972.

W. Kohn, "Declarative Control Architecture," CACAM Aug. 1991, vol. 34, No. 8.

A. Nerode and W. Kohn, "An Autonomous Systems Control Theory: An Overview," Proc. IEEE CACSD '92, Mar. 17–19, Napa, Ca., pp. 200–220.

A. Nerode and W. Kohn, "Models for Hybrid Systems: Automata, Topologies, Controllability, Observability," Technical Report 93–28, MSI, Cornell University, Jun., 1993.

(List continued on next page.)

*Primary Examiner*—William Grant
*Assistant Examiner*—McDieunel Marc
*Attorney, Agent, or Firm*—Fulbright & Jaworski LLP

[57] ABSTRACT

A Multiple-Agent Hybrid Control Architecture (MAHCA) uses agents to analyze design, and implement intelligent control of distributed processes. A network of agents can be configured to control more complex distributed processes. The network of agents interact to create an emergent global behavior. Global behavior is emergent from individual agent behaviors and is achieved without central control through the imposition of global constraints on the network of individual agent behaviors. Agent synchronization can be achieved by satisfaction of an interagent invariance principle. At each update time, the active plan of each of the agents in the network encodes equivalent behavior modulo a congruence relation determined by the knowledge clauses in each agents's knowledge base. The Control Loop and the Reactive Learning Loop of each agent can be implemented separately. This separation results in an implementation runs faster and with less memory requirements than an unseparated arrangement. A Direct Memory Map (DMM) is to implement the agent architecture. The DMM is a procedure for transforming knowledge and acts as a compiler of agent knowledge by providing a data structure called memory patches, which are used to organize the knowledge contained in each agent's Knowledge Base. Content addressable memory is used as the basic mechanism of the memory patch structure. Content addressable memory uses a specialized register called the comparand to store a pattern that is compared with contents of the memory cells. The DMM has two comparands, the Present State Comparand and the Goal Comparand. The MAHCA can be used for compression/decompression for processing and storage of audio or video data.

26 Claims, 17 Drawing Sheets

OTHER PUBLICATIONS

H. Garcia and A. Ray, "Nonlinear Reinforcement Schemes for Learning Automata," Proceedings of the 29th IEEE CDC Conference, vol. 4, pp. 2204–2207, Honolulu, Hawaii, Dec. 5–7, 1990.

A. Nerode and W. Kohn, "Model for Hybrid Systems: Automata, Topologies, Stability," Revised Technical Report 93–11, MSI, Cornell University, Mar. 1993.

W. Kohn, "Declarative Hierarchical Controllers," Proceedings of the Workshop on Software Tools for Distributed Intelligent Control Systems, pp. 141–163, Pacifica, Ca., Jul. 17–19, 1990.

W. Kohn and T. Skillman, "Hierarchical Control Systems for Autonomous Space Robots," Proc. of AIAA Conference in Guidance, Navigation and Control, vol. 1, pp. 382–390, Minneapolis, MN, Aug. 15–18, 1988.

W. Kohn, "A Declarative Theory for Rational Controllers," Proceedings of the 27th IEEE CDC, vol. 1, pp. 131–136, Dec. 7–9, Austin, TX, 1988.

W. Kohn, "Declarative Multiplexed Rational Controllers," Proceedings of the 5th IEEE International Symposium on Intelligent Control, pp. 794–803, Philadelphia, Pa., Sep. 5, 1990.

W. Kohn et al., "The Rational Tree Machine," IR&D BE–499, Technical Document D–905–10107–1, Jul. 7, 1989.

T. Skillman, et al., "Class of Hierarchical Controllers and Their Blackboard Implementations," Journal of Guidance Control & Dynamics, vol. 13, N1, pp. 176–182, Jan.–Feb., 1990.

W. Kohn, et al., "Agents in Multiple Agent Hybrid Control," Technical Report 93–101, MSC, Cornell University.

J. Albus, et al, "NASA/NBS Standard Reference Model for Telerobot Control System Architecture (NASREM)," NIST (formerly NBS) Technical Note 1235, Apr. 1989 Edition.

J. Albus and R. Quintero, "Toward a Reference Model Architecture for Real–Time Intelligent Control Systems (ARTICS)," Proc. of Workshop on Software Tools for Distributed Intelligent Control Systems, Sep. 1990.

R Quintero, "Toward an Intelligent Control Systems Development Methodology," Proceedings of the JSGCC Software Initiative Workshop, Dec. 1–4, 1992, GGuidance and Control Information Analysis Center PR92–03.

W. Kohn, et al., Multiple–Agent Reactive Control of Distributed Interactive Simulations (DIS) Through a Heterogeneous Network, Proc. of Army Researc Office Workshop on Hybrid Systems and Distributed Interactive Simulations, Research Triangle Park, NC Feb. 28–Mar. 1, 1994.

W. Kohn, et al., "A Hybrid Systems Approach to Computer–Aided Control Engineering," Proceedings of the Joint Symposium on Computer–Aided Control System Design, Tucxon, AZ, Mar. 7–9, 1994.

A. Nerode and W. Kohn, "Multiple Agent Hybrid Control Architecture," *Hybrid Systems*, Springer Verlag, 1993, vol. 736.

A. Nerode and W. Kohn, "Multiple Agent Autonomous Control: A Hybrid Systems Architecture," *Logical Methods in Honor of Anil Nerode's Sixtieth Birthday*, Birkhauser, Boston, 1993.

W. Kohn, et al., "Multiple–Agent Hybrid Control Architecture for the Target Engagement Process (MAHCA–TEP), Version 0.2 of MAHCA–TEP: Technical Background, Simulation Requirements, and Engagement Model," Intermetrics Technical Report, Aug. 25, 1994.

W. Kohn, et al., "Multiple Agent Declarative Control Architecture: A Knowledge Based System for Reactive Planning, Scheduling and Control in Manufacturing Systems," Intermetrics White Paper, Oct. 1994.

W. Kohn, et al., "Hybrid Systems as Finsler Manifolds: Finite State Control as Approximation to Connections," Springer–Verlag, 1995.

J. Liu, "Real–Time Responsivness in Distributed Operating Systems and Databases," proceedings of the Workshop on Software Tools for Distributed Intelligent Control Systems, Jul. 17–19, 1990, pp. 185–192.

W. Kohn, J. James, and A. Nerode, "Multiple–Agent Reactive Control of Distributed interactive Simulations (DIS) Through a Heterogeneous Network," Proc. Army Research Office Workshop on Hybrid Systems and Distributed Interactive Simulations, Research Tr, Mar. 1994.

W. Kohn, J. James, and A. Nerode, "Hybrid Systems as Finsler Manifolds: Finite State Control as Apprximation to Connections," Springer–Verlag, 1995.

J. Albus et al., "NASA/NBS Standard Reference Model for Telerobot Control System Architecture (NASREM)," NIST (formerly NSB) Technical note 1235, Apr. 1989.

NETWORK AT TIME t     NETWORK AT TIME t+Δ

○ ACTIVE AGENT     ○ SPAWNED AGENT
⊖ DEACTIVATED AGENT     → ACTIVE LINK
                                              ---→ DEACTIVATED LINK

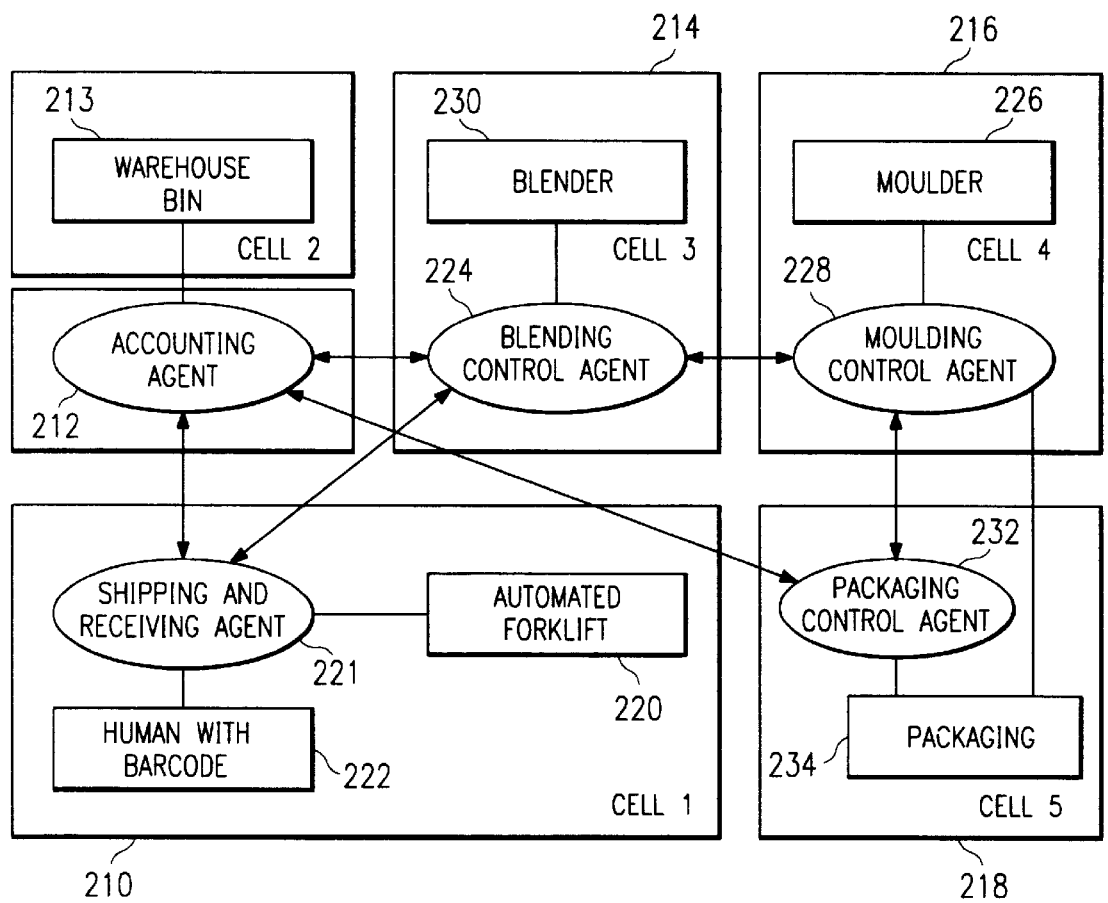
FIG. 13
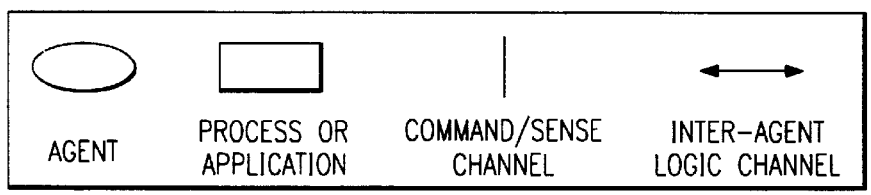

MULTIPLE-AGENT HYBRID CONTROL ARCHITECTURE FOR INTELLIGENT REAL-TIME CONTROL OF DISTRIBUTED NONLINEAR PROCESSES

BACKGROUND OF THE INVENTION

1. Field of the Invention

This invention generally relates to real-time, knowledge-based control of both small-scale systems and large-scale systems. More particularly, this invention relates to computer-based control of systems distributed in space and/or time that are composed of components whose logical (set-based) and evolution (continuum-based) behaviors are controlled by a collection of agents.

2. Discussion of the Related Technology

Computer-controlled systems are collections of components used either to advise humans in executing their control responsibilities or to autonomously execute appropriate control actions. Computer-controlled systems may also have a combination of both advisory components and autonomous components.

Typical components of distributed, real-time computer-controlled systems include computers, communication networks, software, sensors (analog-to-digital transducers), and actuators (digital-to-analog transducers). Systems are controlled to achieve and maintain desired high-level event-based goals (such as safety goals or quality goals) often expressed by rules of desired behavior and are controlled to achieve desired low-level evolution-based goals (such as accurate rate of change of angular position or precision control of displacement velocity) often expressed as differential or difference equations.

Current engineering environments provide support for conducting extensive experiments for trying out various control mechanisms. Major efforts have been conducted over the past few decades to provide ever more precise statements of system constraints and ever more powerful simulation environments for conducting more extensive combinations of experiments to discover failure modes of the contemplated control mechanisms. As systems are being analyzed, designed, implemented, and maintained, these extensive experiments conducted in the engineering environment are used to perform verification, validation, and accreditation of the models and algorithms used by the computer-controlled system to achieve autonomous or semi-autonomous (human-in-the-loop) control of the distributed system.

The existing technical approach has met with great success for small-scale systems. However, according to the U.S. Department of Commerce, as many as seventy to ninety percent of real-time systems fail to ever meet their goals and be deployed. Moreover, for those systems that are deployed, the fraction of initial system cost attributable to software continues to rise, accounting for between thirty to ninety percent of initial acquisition costs. A primary cause of failure in constructing large-scale, distributed systems is the difficulty of synchronizing real-time processes.

The best existing technology relies on engineering experience and heuristics to build computer-controlled systems that combine logical constraints, geometric constraints, and evolution constraints on system behavior. Verification, validation, and accreditation of these systems is achieved through expensive and inconclusive development efforts that attempt to discover and correct system failure modes through a series of simulation or benchmark experiments followed by correction of discovered failure modes. As indicated above, large-scale, real-time control efforts often fail and the projects are abandoned after expenditure of significant resources. Those that are successful are difficult to update, because the series of verification, validation, and accreditation experiments must be repeated whenever the system is changed.

The invention improves over the current technology through the generation of control software that meets declared constraints. The technology is based on rigorous mathematical results that establish that the approach is sound (will not prove a theorem that contradicts assertions in the knowledge base) and complete (will prove theorems that generate actions to cause the system state to reach (within declared closeness criteria) any point that is in the range of points described by the knowledge base). This formal theoretical result, and the practical implementation of the result in the invention, enables the incremental construction of large-scale, distributed, real-time control systems from trusted components. Thus, to the extent that an existing component has achieved a degree of trust, the invention enables inclusion of that component in a larger system, without repeating the previous experiments. Moreover, for smaller well-understood systems constructed from legacy, product-line applications, the invention enables reliable implementation of a wider variability in system parameters.

There are no products similar to the Multiple-Agent Hybrid Control Architecture (MAHCA). Features of MAHCA include:

1. MAHCA uses general descriptions of system state that combine logical and evolution constraints on system behavior. The best commercial simulation products have supported such combined descriptions of system behavior for many years. Examples of commercial simulation systems include SIMNON and ACSL, both of which support nonlinear system descriptions, discovery of system equilibrium points, and linearization about system equilibria for design of linear controllers. The best experimental prototype is DSTOOL from Cornell University, which uses a system description closest to that of MAHCA. A recent Ph.D. thesis by Mats Anderson from Lund Institute of Technology discusses simulation of hybrid systems. The thesis describes the systems modeling language Omola and the simulation system OmSim. While these products and experimental systems support discovery of system behavior, including discovery of failure modes, they do not support creation of controllers to compensate for undesired behaviors.

2. MAHCA's logical and evolution description of system behavior delivers cumulative control solutions. Commercial products for design of control systems exist, including some that generate control code from experiments. The best commercial systems are MATLAB, MATRIX-X, and BEACON. The best experimental prototypes are ANDECS from Germany, HONEY-X from Honeywell, and METL from University of Waterloo. METL is closest in spirit to MAHCA in that METL supports both logical and evolution descriptions of system behavior and delivery of control solutions that meet logical and evolution constraints. METL, however, relies on experimental discovery of failure modes and application of engineering heuristics to construct combined solutions, as do all other control design tools currently available.

3. MAHCA supports a system for solving both linear and nonlinear scheduling of events. Commercial products exist for scheduling discrete sequences of events. An extension to the G2 product from Gensym Corp. is currently being marketed as an optimal scheduling package for discrete manufacturing. This product, like other scheduling packages, relies on solution of a linear approximation to what is known to be a nonlinear problem. MAHCA solves the nonlinear scheduling problem as well as its linear approximation.

4. MAHCA uses a general purpose architecture descriptor. General purpose architectures for large-scale, real-time systems have been under development for some time. The NASREM architecture, a joint development of the National Bureau of Standards and the National Aeronautics and Space Administration, was published as an open standard in 1989. This reference architecture for real-time, distributed control has been used as a starting point for several large-scale systems as well as the beginning of the Next Generation Controller project and the beginning of two projects in component-based programming supported by the Advanced Research Projects Agency (ARPA) Domain-Specific Software Architecture (DSSA) project. One of these projects has the best experimental prototype for declaring system architectures, the ARDEC-TEKNOWLEDGE (ARTEK) model. Neither NASREM nor ARTEK, however, support development of control programs for the systems described by their architectural syntax. MAHCA can use either NASREM or ARTEK syntax to describe reference architectures for large-scale systems and can also can generate control software to execute actions necessary to meet the design goals of the architecture applications. Also, while both NASREM and ARTEC support declarations of synchronization requirements for large-scale distributed system, neither support construction of control solutions that achieve the required synchronization.

MAHCA provides technology for flexible implementations of heterogeneous systems which substantially expand on the capabilities of real-time control architectures envisioned by the National Institute of Standards and Technology (NIST) and the National Aeronautics and Space Administration (NASA) in "NASA/NBS Standard Reference Model for Telerobot Control System Architecture (NASREM)," NIST (formerly NBS) Technical Note 1235, April 1989. The NASREM experimentation-based architecture represents the most logical arrangement of tools for experimental development of intelligent, real-time, computer-controlled systems. The NASREM architecture has been one of the most widely implemented architectures for large-scale systems and was the starting point for real-time, component-based control research being conducted by the Department of Defense. NASREM has several very useful features which are implemented in the MAHCA agents, including:

1. NASREM supports separation of complex real-time systems into a fixed hierarchy based upon lower levels of the hierarchy being implemented at faster time scales and higher levels in the hierarchy being implemented at slower time scales. The time scales nominally vary from several hours of observations of system evolution at the slowest time scale to several milliseconds of observations of system evolution at the fastest time scale.

2. NASREM supports a further separation of complex, real-time systems into fixed heterarchical partitions at each layer in the hierarchy which correspond to components for a fixed, closed-loop approach for control of each layer according to a sense-decide-act paradigm of:
   a. Sense the state of the system at each layer (time scale) in the hierarchy. Analog-to-digital transducers are used to automatically sense and provide inputs at the lowest levels in the hierarchy while user interfaces are used to obtain human queries, response to system queries, or decisions at the highest layers in the hierarchy.
   b. Decide which action or plan should be implemented. Scheduling algorithms for sequential machines used for a discrete-event system, switching tables experimentally produced for accomplishing gain-scheduling for closed-loop control algorithms appropriate for different operating modes, or adaptive control algorithms appropriate for use around well-defined operating points are used to decide what actions are to be taken at the lowest layers in the hierarchy.
   c. Act to execute the appropriate action for the current state of the system at each layer in the hierarchy. Since lower levels operate at faster time scales than higher levels in the hierarchy (the lowest level being several orders of magnitude faster than the highest level), many actions are taken at a lower level for each action taken at a higher level.

Each hierarchical partition proceeds at a fixed rate to implement the sense-decide-act cycle for the level it controls. The rate can be designed into the system based upon the performance requirements of the users, or the rate may be experimentally determined based upon the physical requirements of existing processes. Each layer accesses a global knowledge base that contains the knowledge of the current state of the system and constraints concerning decisions that can be made for the next cycle.

3. NASREM separates system behaviors into major logical activities being conducted based upon nominal partitioning according to system time scales. This supports a deliberate design of adding higher-level logical functionality in layers from the simplest to the most elaborate as the complex system is incrementally designed, prototyped, assembled, tested, and commissioned.

NASREM, and other architectures based upon conducting extensive experiments to implement complex, large-scale systems, has been a successful engineering approach. However, as systems grow in size and complexity, this technology has been increasingly less effective in achieving successful implementations. A central problem of all these architectures is that the synchronization of levels is application dependent. In MAHCA synchronization is done with a generic invariance principle. Another serious drawback is that the construction of the levels is not provably correct by effective methods.

SUMMARY OF THE INVENTION

An object of the invention is to provide a general-purpose architecture for incremental construction of provably-correct, near-optimal systems for real-time control of small-scale and large-scale systems which may be nonlinear, time-varying, and distributed in time and space. This invention provides a computationally-feasible method for implementation of closed-loop, near-optimal, autonomous control of nonlinear, real-time distributed processes by first proving that a near-optimal solution of system descriptions exists and then generating control automata that achieve near-optimal performance in spite of certain system nonlinearities, disturbances, uncertainties, and changes over time.

Another object of this invention is to construct a clausal language that enables declarations of both logical and evolution constraints on behavior of the hybrid system. This declarative approach to system composition permits complex systems to be defined in terms of relationships between interacting components of subsystems.

It is another object of this invention to explicitly support construction of declarations that exploit the "close-enough" nature of near-optimal solution technology to substantially reduce costs of achieving feasible solutions for large-scale, distributed systems. This will be done through automatic relaxation of constraints that meet nearness criteria of the logical and evolution models. The automatic relaxation is achieved through syntactical transformation of constraints. The semantics of the constraints are not altered.

It is another object of this invention to provide a set of engineering tools to assist system engineers in defining appropriate clausal declarations for composing components into systems and systems of systems whose behaviors are synchronized through a network of agents.

It is another object of this invention to provide agent synchronization. This is achieved by satisfaction of an interagent invariance principle. At each update time, the active plan of each of the agents in the network encodes equivalent behavior modulo a congruence relation determined by the knowledge clauses in each agents's knowledge base.

It is another object of this invention to provide an architectural model of an agent with separated loops, specifically the Control Loop and the Reactive Learning Loop are implemented separately. However, the Control Loop and the Reactive Learning Loop interact via two coupling channels. This separation results in an implementation which is logically equivalent to an agent with unseparated loops, but runs faster and with substantially less memory requirements.

It is another object of this invention to use a Direct Memory Map (DMM) to implement the agent architecture. The DMM is a procedure for transforming knowledge. At the input of the procedure, the agent's knowledge is encoded as a collection of Equational Logic Clauses. These types of clauses are very effective bridges between a graphic description of these properties and the run time representation of the agent knowledge. The DMM acts as a Compiler of agent knowledge by providing a data structure called memory patches, which is used to organize the knowledge contained in each agent's Knowledge Base. A memory patch is a computational representation of an open set in the topology of the carrier manifold.

It is another object of this invention to use content addressable memory as the basic mechanism of the memory patch structure. Content addressable memory uses a specialized register called the comparand to store a pattern that is compared with contents of the memory cells. If the content of a memory cell matches or partially matches the pattern of the comparand, that cell is activated. The DMM has two comparands, the Present State Comparand and the Goal Comparand.

It is another object of this invention to apply the MAHCA to compression/decompression, which consists of processing and storage of the audio or video source. The processing and storage of the source is accomplished as a DMM data structure and the on-line or off-line decompression of the stored DMM data structure. The processing of the source is a lossy process which can be altered by changing the set precision in the knowledge models of the compression and decompression agents. The uncompressed data source is a sequence of data pages. In the case of video, a page is a frame composed of pixels. In the case of audio, a page is a collection of counts.

It is a related object of this invention that the network of agents support reuse of trusted components of other applications through declarative inclusion into new system architectures. This declarative inclusion decreases the experimentation needed to achieve verification, validation, and accreditation of legacy components as trusted component parts of the new system.

It is a related object of this invention that the on-line generation of automata that comply with logical and evolution constraints on system behavior supports generation and repair of schedules and plans in accordance with declared constraints and optimality criteria.

These and other objects of this invention are achieved, according to the technology of this invention, by providing a software and hardware engineering tool in the form of an architecture and methodology for building and synchronizing operation of nonlinear, large-scale real-time systems that maybe distributed in time or space by implementing on-line integration of heterogeneous components, including both logical and evolution components and legacy or new components. This engineering tool achieves flexible, on-line integration of heterogeneous components through generation of automata that comply with declarations of system behavior. These automata are executed by local agents in a network of agents to support incremental expansion of system functionality and scalability of system operation in space and time. This engineering tool includes a basic architecture for an individual agent and a basic architecture for a network of agents. The tool includes a modular set of capabilities that have already been applied to a wide variety of distributed, real-time applications and are provided as an initial set of engineering capabilities for design, analysis, and implementation of hybrid systems.

Accordingly, the MAHCA provides a multilevel architecture for design and implementation of layers of agents, software applications, database systems, wide-area and local-area communication networks, sensors, actuators, and physical network components. MAHCA also provides an architecture for a multiple-agent logical communication network, operating over the multilayer architecture, for synchronization of the operation of distributed processes. MAHCA can be configured to support cooperative and noncooperative strategies of behaviors between individual components and aggregation and disaggregation of system behaviors.

At the top level of MAHCA is the network of agents. This network of agents can be considered to be a cooperative operating system that provides reactive support for synchronization of heterogeneous components through reactive, on-line code generation that complies with restrictions of the current system state. Heterogeneous components can be distributed in time to operate at multiple time scales and can be distributed in space to operate at multiple locations. Local component behavior is controlled by a local agent to meet locally-defined optimality criteria, globally-defined optimality criteria, logical constraints on local behavior, local constraints on component evolution, global constraints on continuity, and the local and global system state as captured in the hybrid system state for the local agent. Evolution of the global system behavior is emergent from the control behaviors of local agents and the evolution of components whose behavior is controlled by local agents.

The next level of MAHCA is the application layer whose high-level logical interfaces are synchronized by the network of agents. A single-agent in the network, or a collection of multiple-agents, can be configured to accommodate synchronization of one or more evolution processes with the high-level logic of other processes in the application or set of applications being controlled.

The next level of MAHCA is the database layer whose inputs and outputs are nominally controlled by the application layer, but individual agents can be configured to directly control database operations.

The next level of MAHCA is the network controller and scheduler level which implements the communications protocols for transmission of messages across the logic communications network.

The lowest layer of MAHCA is the physical network layer. This layer contains the hardware of the transmission and receiving equipment and the transmission media being used for local-area networks and wide-area networks. This is also the layer for sensors and actuators for real-time control applications.

The sequence of steps taken by an agent lead to generation of software that complies with the current specifications and parameter values are:

1. Reformulate the original problem as a calculus of variations problem on a carrier manifold of system states. The carrier manifold is the combined simulation model of the network and the simulation models at the nodes. State trajectories and their evolution occurs on this carrier manifold. This method seeks control functions of the state of the system for the global and local problems that minimize a non-negative cost function on state trajectories whose minimization perfectly achieves all the required goals of the distributed real-time control problem.
2. Replace the standard calculus of variations problem with a convex variational problem by convexifying, with respect to the state rate u, the Lagrangian $L(x, u)$ that represents the cost function being minimized. The convexified problem has a solution that is a measure-valued (sometimes referred to as weak or L. C. Young) solution to the original problem. This solution is a chattering control that chatters appropriately between local minima of the original problem so as to achieve close to the global minimum of the original problem. This solution, however, is only abstract and gives local and global control functions of time.
3. To get feedback control functions of state instead, convert the convexified variational problem to an appropriate Hamilton-Jacobi-Bellman equation form. This transformation is done by the planner of the MAHCA agent automatically. An "$\epsilon$-solution" of this equation for the appropriate boundary conditions gives valid infinitesimal transformations on the state space representing the generators of feedback controls.
4. The control functions that are possible at a given state are a cone in the tangent space, and move with the tangent space. Following the optimal state trajectory produces the near-optimal corresponding controls. The controls are algebraically dependent on the Christoffel symbols of an affine connection that is characteristic of the Carrier manifold. The affine connection gives the real-time state transition function of the global and local automata, or control programs, needed to govern the communications network and the approximations at nodes in order to meet the prescribed goal. The global program takes responsibility for message passing between nodes; the local programs take responsibility for local updates in real time. Required dynamics of the global system are achieved without central control (global umpire) of the distributed system by enforcing continuity conditions at each node.

The most important advantage that MAHCA provides over experimentation-based architectures such as NASREM is the substantial reduction in experiments needed to perform verification, validation, and accreditation of new components in an implementation architecture. This is achieved through on-line generation of automata to reactively synchronize distributed processes. The reactive synchronization is achieved through a proof process that ensures compliance with declared system behaviors. These behaviors can include the logical assertions associated with safety and quality constraints as well as the evolution assertions associated with performance and precision constraints. MAHCA has several very useful features including:

1. MAHCA supports separation of complex real-time systems into a nominal hierarchy based upon lower levels of the hierarchy being implemented at faster time scales and higher levels in the hierarchy being implemented at slower time scales and also supports on-line creation of automata that react at intermediate time scales so that, in effect, a continuum hierarchy is supported. The time scales nominally vary from several hours of observations of system evolution at the slowest time scale to several milliseconds of observations of system evolution at the fastest time scale. Moreover, MAHCA can be configured to react to create links between layers in the nominal hierarchy so that timing constraints for rare events can be met at the time they occur.
2. MAHCA supports a further separation of complex, real-time systems into fixed heterarchical partitions at each layer in the hierarchy that correspond to components for a fixed, closed-loop approach for control of each layer according to a sense-decide-act paradigm similar to the NASREM sequence. Each heterarchical partition proceeds at a fixed rate to implement the sense-decide-act cycle for the level it controls. However, MAHCA also supports on-line creation of automata that react at intermediate time scales so that, in effect, a continuum heterarchy is supported. For example, a normal engineering activity is to separate complex processes into intermediate steps and arrange the sequence of steps into a scenario of activities that are then executed with or without human intervention.

MAHCA supports configuration and incremental change of scenarios of activities as logical events arranged in a hierarchical or heterarchical fashion. The rate of execution can be designed into the system based upon the performance requirements of the users, or it may be experimentally determined based upon the physical requirements of existing processes. Each layer accesses a global knowledge base that may contain the current state of the system and constraints concerning decisions that can be made for the next cycle.

3. MAHCA supports the separation of system behaviors into major logical activities conducted based upon nominal partitioning according to system time scales. This supports a deliberate design of adding higher-level logical functionality in layers from the simplest to the most elaborate as the complex system is incrementally designed, prototyped, assembled, tested, and commissioned. Thus, it is possible to configure MAHCA to be a more flexible implementation of a experimentation-based architecture. However, MAHCA also supports a more general assemblage of components based upon defining behaviors of agents which can then be modified on-line in accordance with pre-arranged relaxation criteria.

Like the above discussion for the NASREM architecture, MAHCA can be configured to either strictly mimic operation of general-purpose, real-time (or non-real-time) architectures or to have the built-in flexibility to incrementally improve on fixed architectures. It can thus include legacy systems in larger systems and support incremental expansion of functionality. However, a most important improvement that MAHCA has over existing architectures for realtime systems is the ability to achieve high-safety, high-assurance operation at less cost through on-line generation of near-optimal solutions that are provably correct in accordance with the hybrid system models and current system inputs.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 13 shows an example of a five-agent multiple-agent network for discrete manufacturing applications.

DESCRIPTION OF THE PREFERRED EMBODIMENTS

Figure 1A:
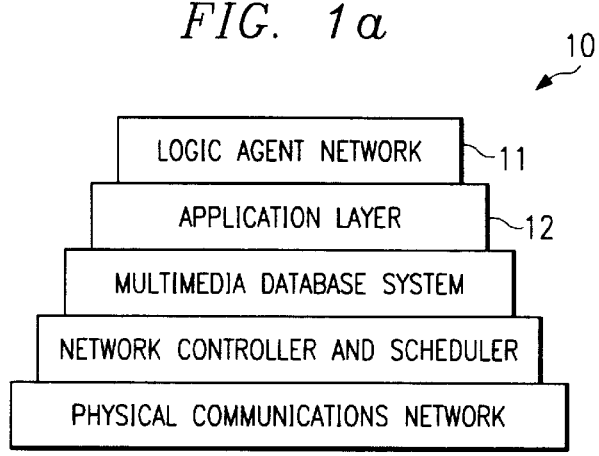
FIG. 1a shows the overall layered architecture denoting the structure of higher-layer components and lower-level components of the multiple-agent hybrid control architecture.

FIG. 1a shows the overall layered architecture 10 of a network or collection of networks, such as the National Information Infrastructure, denoting the structure of higher-layer components, normally implemented in software, and lower-level components, normally implemented in hardware connecting MAHCA. The lowest layer of the architecture is always implemented in hardware. MAHCA functions as real-time "middleware" to synchronize distributed legacy or new applications.

MAHCA is a collection of multiple agents in a logical agent network 11 that synchronizes systems behaviors implemented through a conventional multi-layered structure 12 of distributed applications, such as client-server applications for multimedia processes, preferably including an application layer, a multimedia database system layer, a network controller and scheduler layer, and a physical communication network layer. This flexible structure provides an open architecture for synchronization of heterogeneous distributed processes. The multi-layered structure 12 of distributed applications is a convenient model of many distributed process applications such as manufacturing, telecommunications, federal and state governments, military command, and control, banking, and medical processes. The collection of multiple agents 11 implements the hybrid systems control paradigm which permits complex distributed real-time processes to be conveniently controlled through the synchronization of activities of system components.

The computational model, Equational Reactive Inferencing, implemented by MAHCA provides for on-line implementation of a new paradigm for computer-based-control of hybrid systems which first proves that a solution exists for the current control problem and then either generates control automata from the results of a successful proof process or reacts to repair failure modes of an unsuccessful proof process in accordance with approved relaxation criteria.

This proof process supports two degrees of freedom: (1) a logical degree of freedom that supports off-line adjustment of the high-level semantics of the problem statement by the designer or user as well as on-line adjustment of the logical constraints through strictly syntactic transformations; and (2) an evolution degree of freedom that supports explicit declaration of evolution relationships appropriate for achieving precision results around fixed operating points. According to a preferred embodiment, the open architecture is based upon message passing between agents in a multiple-agent network and Equational Reactive Inferencing.

MAHCA is implemented as a hierarchy of software and hardware components 12 whose topology changes over time through addition of new components and deletion of old components. The addition and deletion of components is synchronized through creation and deletion of agents in the logic agent network. The architecture supports flexible construction of templates of generic domain models and reference architectures for product lines of applications and the specialization of these domain models and reference architectures to specific domain models and application architectures for specific applications.

The computational model eases verification, validation, and accreditation of compositions of system components through reductions in the number of experiments necessary to achieve a degree of trust in system performance. This reduction in experiments is made possible through a provably correct generation of automata to integrate component operations so that experiments already performed to achieve trust in individual components do not have to be repeated for the composed system.

A model of the logic agent network 11 of FIG. 1a follows: Let $A_i$, where i=1, . . . , N(t), denote the agents active at the current time t. In this model, t takes values on the real line. At each time t, the status of each agent in the network is given by a point in a locally differentiable manifold M. Preferably, the goal of the network is to provide near-optimal control of a set of multimedia distributed interactive processes and the fundamental goal of the network is to minimize unsatisfied demand for multimedia services. The demand of an active agent $A_i$ is given by a continuous function $D_i$, $$D_i : M \times T \rightarrow R^+ \qquad (1)$$

where T is the real line (time-space) and $R^+$ is the positive real line. Consider a logic agent network 11 configured to achieve synchronization of multimedia processes used for distributed interactive simulation. Then a point p in the manifold M is represented by a data structure of the form:

$$p(id, proc(proc\_data), sim(sim\_data), \qquad (2)$$
$$in(synch\_data), mp(mult\_data))$$

Here id is an identifier taking values in a finite set ID, proc( ) is a relation characterizing distributed interactive simulation (DIS) processes status which depends on a list of parameters labeled proc_data, whose parameters define the load and timing characteristics of the process involved (note that each existing simulation process will normally have different data structures), and sim( ) is a relation that captures attributes of the multimedia process being represented which depends on a list of parameters labeled sim_data which characterize constraint instances, at that point, of the process being represented at a level of abstraction compatible with the logic agent network 11.

Also in expression (2), in( ) is a relation carrying synchronization information of the logic agent network 11 with respect to the hierarchical organization of FIG. 1a. Specifically, it characterizes the protocol at the operation point. This includes information such as priority level, connectivity, and time constants. Finally, in expression (2), the relation mp( ) carries multiplicity information, that is, it represents the level of network usability at this point. The associated parameter list mult_data is composed of statistical parameters reflecting the network's load.

The parameter lists in the data structure of the points of manifold M can be composed of integers (such as the number of users), reals (such as traffic loads), and discrete values (such as process identifiers or switches). They characterize the status of the network and the active processes. Computing the evolution of these parameters over time is the central task of MAHCA.

The dynamics of the logic agent network 11 is characterized by certain trajectories on the manifold M. These trajectories characterize the flow of information through the network and its status. A generator for the demand functions is defined:

$$\{D_i(p, t) | i \in I(t), p \in M\} \quad (3)$$

where I(t) is the set of active agents at time t and the actions issued by the agents in the DIS controller. These actions are implemented as infinitesimal transformations defined in manifold M. The general structure of the functions in equation (3) for an active agent i at time t is given in equation (4) below:

$$D_i(p, t) = F_i(C_i^u, D, \alpha_i)(p, t) \quad (4)$$

where $F_i$ is a smooth function, D is the vector of demand functions, $C_i^u$ is the unsatisfied demand function, and $\alpha_i$ is the command action issued by the i-th agent.

In general, a manifold M is a topological space (with topology $\Theta$) composed of three items:
1. A set of points of the form of equation (2), homeomorphic to $R^k$, with k an integer.
2. A countable family of open subsets of manifold M, $\{U_j\}$ such that $\cap U_j = M$
3. A family of smooth functions $\{\phi_j | \phi_j: U_j \to V_j\}$ where for each j, $V_j$ is an open set in $R^k$. The sets $U_j$ are referred to in the literature as coordinate neighborhoods or charts. For each chart, the corresponding function $\phi_j$ is referred to as its coordinate chart. "Smooth" functions possess arbitrarily many continuous derivatives.
4. The coordinate chart functions satisfy the following additional condition:
    Given any charts $U_j$, $U_i$ such that $U_j \cup U_i \neq \emptyset$, the function $\phi_i \circ \phi_j^{-1}: \phi_j(U_j \cup U_i) \to \phi_i(U_j \cup U_i)$ is smooth.

Now, the generic definition of the manifold M is customized to a control system application. Looking at the topology $\Theta$ associated with manifold M, note that the points of M have a definite structure (see expression (2)) whose structure is characterized by the intervals of values of the parameters in the lists proc_data, sim_data, synch_data, and mult_data. The number of these parameters equals k. "Knowledge" about these parameters is incorporated into the model by defining a topology $\Omega$ on $R^k$.

The open sets in $\Omega$ are constructed from the clauses encoding known facts about the parameters. The topology $\Theta$ of manifold M is defined in terms of $\Omega$ as follows: For each open set W in $\Omega$, such that $W \subseteq V_j \subseteq R^k$, the set $\phi_j^{-1}(W)$ must be in $\Theta$. These sets form a basis for $\Theta$ so that $U \subset M$ if and only if for each $p \in U$ there is a neighborhood of this form contained in U; that is, there is $W \subseteq U_j$ such that $p \in \phi_j^{-1}(W) \subset U$, with $\phi_j: U_j \to V_j$ a chart containing p.

To characterize the actions commanded by the MAHCA intelligent DIS controller, derivations on manifold M must be introduced. Let $F_p$ be the space of real-valued smooth functions f defined near a point p in manifold M. Let f and g be functions in $F_p$. A derivation v of $F_p$ is a map $$v: F_p \to F_p$$

that satisfies the following two properties:

$$v(f+g)(p) = (v(f) + v(g))(p) \text{ (Linearity)}$$

$$v(f \cdot g)(p) = (v(f) \cdot g + f \cdot v(g))(p) \text{ (Leibniz's Rule)}$$

Derivations define vector fields on manifold M and a class of associated integral curves. Suppose that C is a smooth curve on manifold M parameterized by $\phi: I \to M$, with I a subinterval of R. In local coordinates, $p = (p^1, \ldots, p^k)$, C is given by k smooth functions $\phi(t) = (\phi^1(t), \ldots, \phi^k(t))$ whose derivative with respect to t is denoted by $\dot{\phi}(t) = (\dot{\phi}^1(t), \ldots, \dot{\phi}^k(t))$. An equivalence relation on curves in M is introduced as the basis of the definition of tangent vectors at a point in manifold M. Let $p \in M$. Two curves $\phi_1(t)$ and $\phi_2(t)$ passing through p are said to be equivalent at p (notation: $\phi_1 \sim \phi_2$), if they satisfy the following two conditions:

For some $t, \tau$ in $I \subset R$ $$\phi_1(t) = \phi_2(\tau) = p \text{ and}$$

$$\dot{\phi}_1(t) = \dot{\phi}_2(\tau)$$

Clearly, $\sim$ defines an equivalence relation on the class of curves in manifold M passing through p. Let $[\phi]$ be the equivalence class containing $\phi$. A tangent vector to $[\phi]$ is a derivation $v|_p$, defined in the local coordinates $(p^1, \ldots, p^k)$, by:

Let $f: M \to R$ be a smooth function. Then, $$v|_p(f)(p) = \sum_{j=1}^{k} \dot{\phi}_j(t) \frac{\partial f(p)}{\partial p^j}, \text{ with } p = \phi(t) \quad (5)$$

The set of tangent vectors associated with all the equivalence classes at p defines a vector space called the tangent vector space at p, denoted by $TM_p$. The set of tangent spaces associated with manifold M can be "glued" together to form a manifold called the tangent bundle, which is denoted by TM:

$$TM = \bigcup_{p \in M} TM_p$$

It is important to specify explicitly how this glue is implemented. After introducing the concept of a vector field and discussing its relevance in the model, glue implementation will be specified.

A vector field on manifold M is an assignment of a derivation v to each point of M: $v|_p \in TM_p$, with $v|_p$ varying smoothly from point to point. In this model, vector fields are expressed in local coordinates. Although the tangent vector is expressed in terms of the chosen local coordinates, this definition is independent of the chosen local coordinates. Let $(p^1, \ldots, p^k)$ be local coordinates, then $$v|_p = \sum_j \lambda^j(p) \frac{\partial}{\partial p^j} \quad (6)$$

Comparing equations (5) and (6), note that if $p=\phi(t)$ is a parameterized curve in manifold M whose tangent vector at any point coincides with the value of v at the same point, then:

$$\phi(t) = v|_{\phi(t)}$$

for all t. In the local coordinates, $p=(\phi^1(t), \ldots, \phi^k(t))$ must be a solution to the autonomous system of ordinary differential equations:

$$\frac{dp^j}{dt} = \lambda^j(p) \text{ for } j = 1, \ldots, k \quad (7)$$

In the multimedia distributed interactive simulation application, each command issued by the DIS controller is implemented as a vector field in manifold M. Each agent in the controller constructs its command field as a combination of "primitive" predefined vector fields. Since the chosen topology for manifold M, topology $\Theta$, is not meterizable, given an initial condition, a unique solution to equation (7) cannot be guaranteed in the classical sense. However, they have solutions in a class of continuous trajectories in M called relaxed curves. In this class, the solutions to equation (7) are unique. The basic characteristics of relaxed curves as they apply to process control formulation and implementation are discussed later. For describing some properties of relaxed curves as they relate to the DIS processor model and control, the concept of flows in M must be introduced.

If v is a vector field, any parameterized curve $\phi(t)$ passing through a point p in manifold M is called an integral curve associated with v, if $p=\phi(t)$, and in local coordinates $v|_p$ satisfies equation (5). An integral curve associated with a vector field v, denoted by $\Psi(t, p)$, is termed the "flow" generated by v if it satisfies the following properties:

$$\Psi(t, \Psi(\tau, p)) = \Psi(t + \tau, p) \quad \text{(semigroup property)} \quad (8)$$

$$\Psi(0, p) = p; \text{ and} \quad \text{(initial condition)}$$

$$\frac{d}{dt}\Psi(t, p) = V|_{\Psi(t,p)} \quad \text{(flow generation)}$$

In order to customize these concepts for MAHCA, suppose that agent i in the communication network is active. Let $\Delta > 0$ be the width of the current decision interval $(t, t+\Delta)$. Let $U_i(p, t), p \in M$ be the unsatisfied demand at the beginning of the interval. Agent i has a set of primitive actions:

$$[v_{ij}|j=1, \ldots, n_i, v_{ij}|_p \in TM_p, \text{ for each } p \in M] \quad (9)$$

Agent i schedules during the interval $(t, t+\Delta)$ one or more of these actions and determines the fraction $\alpha_{ij}(p, t)$ of $\Delta$ that action $v_{ij}$ must be executed as a function of the current service request $S_{ri}(t, p)$ and the demand of the active agents in the logic agent network $D(p, t)=[D_1(p, t), \ldots, D_{N(t)}(p, t)]$.

Figure 1B:
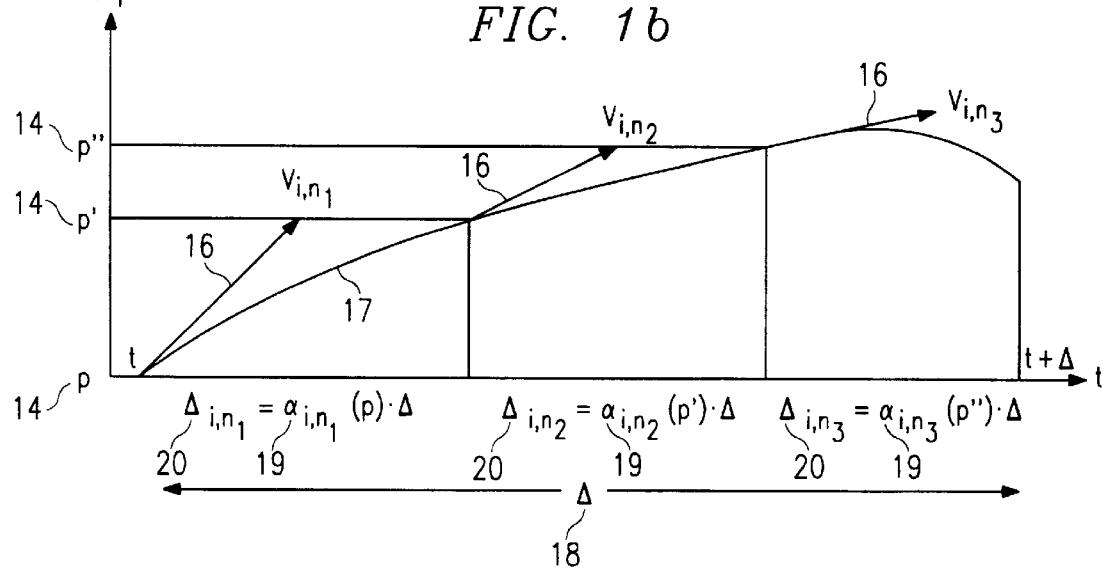
FIG. 1b shows an individual agent in the logic agent network, which executes a schedule of infinitesimal actions that alter the flow associated with the agent.

FIG. 1b conceptually illustrates a schedule of actions involving three primitives. FIG. 1b shows an individual agent in the logic agent network 11 shown in FIG. 1a, which executes a schedule of infinitesimal actions that alter the flow associated with the agent. Each individual agent is built to apply declarative Knowledge, written in Equational Logic Language, such that the controlled system follows a continuous trajectory (the flow $\Psi_i$ 13 associated with actions of agent i) which is a near-optimal path compared to the actual optimal path for meeting system goals. The Equational Logic Language format is merely a restricted version of the more general Horn clause format.

The flow $\Psi_i$ 13 associated with actions of a local agent i will change over an interval $\Delta$ 18 at times $n_j$ in accordance with the actions taken at times $t_{nj}$ and lasting for intervals of time $\Delta_{i,nj}$. Considering the smooth line segment 17 as the $\epsilon$-optimal path for local agent i, then the actions generated by MAHCA maintain the state of the system on a near-optimal trajectory over the time interval. Global synchronization over longer time intervals is achieved through on-line generation of automata that react to deviations from optimality to take appropriate actions to return the state of the system to the near-optimal path. This on-line generation process is accomplished by calculating an affine connection for a Finsler manifold associated with the system. The affine connection enables parallel transport of the global final goal condition back to the current instance along the optimal path and the generation of current actions to move, in a near-optimal fashion, the state of the system from its current state to the final goal state.

The flow $\Psi_i$ 13 associated with the schedule of FIG. 1b can be computed from the flows associated with each of the actions:

$$\Psi_{vi,n1}(\tau, p) \quad (10)$$

if $t \leq \tau < t + \Delta_{i,n1}$ $\Psi_i(\tau, p) = \Psi_{vi,n2}(\tau, \Psi_{vi,n1}(t + \Delta_{i,n1}, p))$ if $t + \Delta_{i,n1} \leq \tau < t + \Delta_{i,n1} + \Delta_{i,n2}$ $\Psi_{vi,n3}(\tau, \Psi_{vi,n2}(t + \Delta_{i,n1} + \Delta_{i,n2}, \Psi_{vi,n1}(t + \Delta_{i,n1}, p)))$ if $t + \Delta_{i,n1} + \Delta_{i,n2} \leq \tau < t + \Delta_{i,n1} + \Delta_{i,n2} + \Delta_{i,n3}$ with $\Delta_{i,n1} + \Delta_{i,n2} + \Delta_{i,n3} 20 = \Delta 18$ and $\alpha_{i,n1} + \alpha_{i,n2} + \alpha_{i,n3} 19 = 1$ Flow $\Psi_i$ 13 given by equation (10) characterizes the evolution of the process as viewed by agent i. The vector field $v_i|_p$ 16 associated with the flow $\Psi_i$ 13 is obtained by differentiation and the flow generation identity in equation (8). This vector field $v_i|_p$ 16 applied at p 14 is proportional to $$v_i|_p \; 16 = [v_{i,ni}, [v_{i,n2}, v_{i,n3}]] \quad (11)$$

where $[.,.]$ is the Lie bracket. The Lie bracket is defined as follows: Let v, w be derivations on manifold M and let f be any real valued smooth function f: $M \to R$. The Lie bracket of v, w is the derivation defined by $[v,w] (f) = v (w(f)) - w (v (f))$. Thus, the composite action $v_i|_p$ generated by the i-th agent to control the process is a composition of the form of equation (11). Moreover, from a version of the chattering lemma and duality, this action can be expressed as a linear combination of the primitive actions available to the agent:

$$[v_{i,n1}, [v_{i,n2}, v_{i,n3}]] = \sum_j \gamma_j^i(\alpha) v_{ij} \quad (12)$$

$$\sum_j \gamma_j^i(\alpha) = 1$$

with the coefficients $\gamma_j^i$ determined by the fraction of time $\alpha_{ij}(p, t)$ 19 that each primitive action $v_{ij}$ 16 is used by agent i.

The effect of the field defined by the composite action $v_i|_p$ on any smooth function is computed by expanding the right hand side of equation (10) in a Taylor series. In particular, for the case of MAHCA being used for control of a multimedia distributed interactive simulation application, the evolution of the unsatisfied demand $C_i^u$ due to the flow $\Psi_i$ 13 over the interval [t, t+Δ) starting at point p 14 is given by:

$$C_i^u(t+\Delta, p'') = C_i^u(t, \Psi_i(t+\Delta, p)) \quad (13)$$

Expanding the right hand side of equation (13) in a Taylor series around (p, t) produces:

$$C_i^u(t+\Delta, p'') = \sum_j \frac{(v_i|_p(C_i^u(p, t)))^j \cdot \Delta^j}{j!} \quad (14)$$

with $(v_i|_p(\cdot))^j = v_i|_p((v_i|_p)^{j-1}(\cdot))$ and $(v_i|_p)^0(\cdot)$ = identity operator Because the topology of manifold M is generated by logic clauses, the series in the right-hand side of equation (14) will have only finitely many non-zero terms. Intuitively, this is so because in computing powers of derivations, the MAHCA needs only to distinguish among different neighboring points. In the formulation of the topology Θ of manifold M, this can only be imposed by the clausal information. Since each agent's Knowledge Base has only finitely many clauses, there is a term in the expansion of the series in which the power of the derivation goes to zero. This is important because it allows the series in the right-hand side of equation (14) to be effectively generated by a locally finite automaton. The construction of this automaton will be expanded later. Note that given the set of primitive actions available to each agent, the composite action $v_i|_p$ is determined by the vector of fraction functions $\alpha_i$.

Now the specific nature of the model formulated in expression (4) can be written. At time t and at point p∈M, the unsatisfied demand function of agent i is given by:

$$C_i^u(p, t) = C_i^u(p, t^-) + S_{ri}(p, t) + \sum_k Q_{i,k}(p, t) \cdot D_k(p, t^-) \quad (15)$$

where $t^-$ is the end point of the previous update interval, $S_{ri}$ is the service request function to agent i, and $Q_{ik}$ is a multiplier determining how much of the current demand of agent k is allocated to agent i. This allocation is determined from the characteristics of the process both agents are controlling and from the process description encoded in the agent's Knowledge Base. The actual request for service from agent k to agent i is thus the term $Q_{ik} \cdot D_k(p, t^-)$. The information sent to agent i by agent k is the demand $D_k$ at the end of the previous interval. Finally the point p∈M carries the current status of the process controlled by the agents appearing in equation (15); agent k is controlling the process if $Q_{i,k} \neq 0$.

Figure 1C:
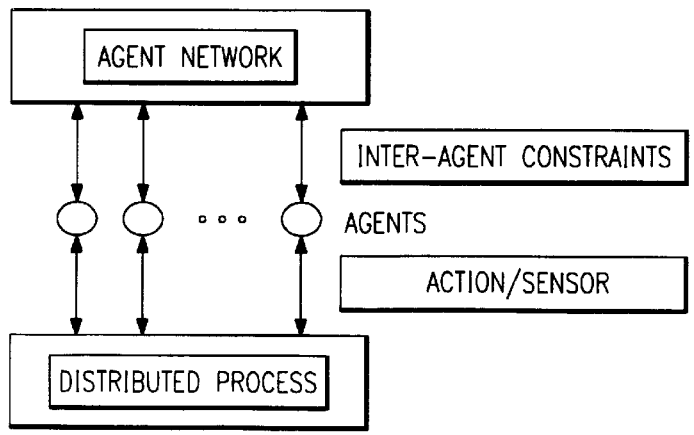
FIG. 1c shows the MAHCA framework with the controlled distributed process.

FIG. 1c illustrates the MAHCA framework with the controlled distributed process. Each of the circles represents an agent 20, which is a logic device that carries out prespecified synchronization and/or control functions. The action of each agent is a function of three information items: 1) sensory data or on-line status data flowing from the process to the agent; 2) active knowledge or selected information data encoded in the agent's Knowledge base; and 3) inter-agent constraints or on-line status information from other agents via the prespecified logic network. An agent carries out its control and synchronization functions by issuing command actions to the process and constraint data to the other agents.

The framework of FIG. 1c is very general. It depicts the representation of many dynamic distributed processes, as well as their control and synchronization activities. For example, consider a discrete multicomponent manufacturing process. The process is carried out by an assembly line composed of assembly stations and product transportation subsystems. Each assembly station performs a partial assembly task on the incoming items which are then directed by the appropriate transportation subsystem to the station responsible for carrying the next stage in the assembly. In this scenario, each assembly station and transportation subsystem carries out its tasks under the command or supervision of an assigned agent. The agent knows about the dynamics, constraints and operating rules of its station from encoded knowledge in its knowledge base. It knows about the current status of the station from the sensory information. It acquires and receives synchronization information from the other agents in the form of imposed constraints on the actions it can select.

Figure 2:
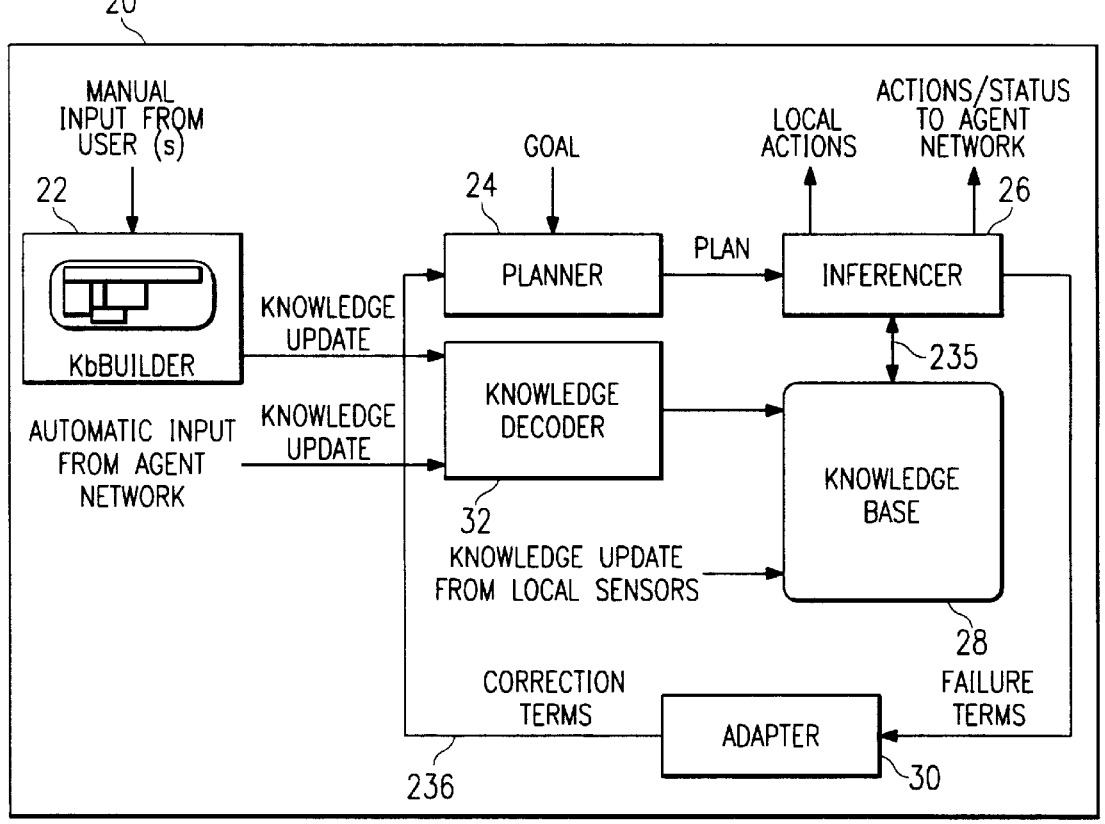
FIG. 2 shows the components of a single agent, denoting the structure of the software and hardware components with a reactive controller for a node in the logic agent network.

Equational Reactive Inferencing, the MAHCA computational model, is implemented in each agent through a set of standard components shown in FIG. 2. The MAHCA is a collection of agents; FIG. 2 shows the components of a single agent. A single agent 20 consists of six components: Knowledge-base Builder 22 (which supports manual input from users), Planner 24, Inferencer 26, Knowledge Base 28, Adapter 30, and Knowledge Decoder 32 (which supports automatic input from other agents). The computational model uses points in a carrier manifold to capture current system state and achieves near-optimal results by chattering between controls as the system state evolves. The near-optimal controls needed are algebraically represented by the Christoffel symbols of an affine connection.

The Knowledge-base Builder 22 is a tool that takes a block-diagram representation of system declarations and places the constraints in Equational Logic Language format. The Planner 24 generates a statement representing the desired behavior of the system as an existentially quantified logic expression herein referred to as the behavior statement. The Planner also constructs and repairs the agent's optimization criterion. The Inferencer 26 determines whether this statement is a theorem currently active in the Knowledge Base 28. The current theory is the set of active clauses in the Knowledge Base with their current instantiations. If the behavior statement logically follows from the current status of the Knowledge Base 28, the Inferencer 26 generates, as a side effect of proving this behavior statement to be true, the current control action schedule. The Inferencer determines whether there is a non-empty solution set for the agent's optimization problem. If there is such a solution set, it infers appropriate control actions, new state information and interagent constraint information. The Knowledge Base 28 stores the requirements of operations or processes controlled by the agent. It also encodes system constraints, interagent protocols and constraints, sensory data, operational and logic principles, and a set of primitive inference operations defined in the domain of equational terms. It essentially stores and updates the agent's knowledge.

If the behavior statement does not logically follow from the current status of the Knowledge Base 28, that is, the desired behavior is not realizable, the Inferencer 26 transmits the failed terms to the Adapter 30 for replacement or modification. The adapter repairs failure terms and computes correction terms. Finally, the Knowledge Decoder 32 receives and translates data from the other agents and incorporates them into the Knowledge Base 28 of the agent.

An agent's functionally is implemented through the architecture shown in FIG. 2. The agent architecture operates via two interacting asynchronous loops: the control loop 235 and the reactive learning loop 236. The control loop 235 generates control actions and the agent's state as a function of its current knowledge to satisfy an internally generated plan. The reactive learning loop 236 modifies the agent's plan as a function of observed agent behavior. These two loops are implemented via five of the six interacting modules, specifically: the Planner, the Inferencer, the Knowledge base, the Adapter and the Knowledge Decoder. The two loops of he architecture are executed separately. This separation is necessary to exploit the Direct Memory Map (DMM) concept which is described via its implementation shown in FIG. 15.

Figure 3:
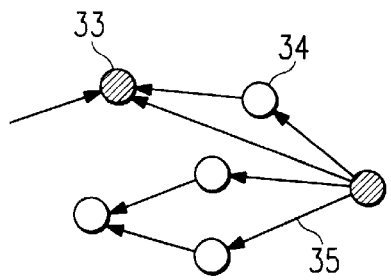
FIG. 3 shows a network of agents having a collection of agents.

Referring now to FIG. 3, the preferred embodiments use a set of individual agents as defined in FIG. 2 to build a network of cooperating control agents. The network can be arranged as a hierarchy, but it is more generally arranged as a directed graph of relationships between agents. The current network of cooperating control agents includes declarative controller agents 34, boundary controller agents 33, and communications paths 35. An agent can be configured as a boundary controller agent 33 that interfaces with users or with other major components in a complex architecture, or a single agent can be configured as a declarative controller agent 34 that interacts with boundary controller agents 33 and other declarative controller agents in the domain of the component being controlled. The logic network of agents passes messages along established communications paths 35.

Figure 4:
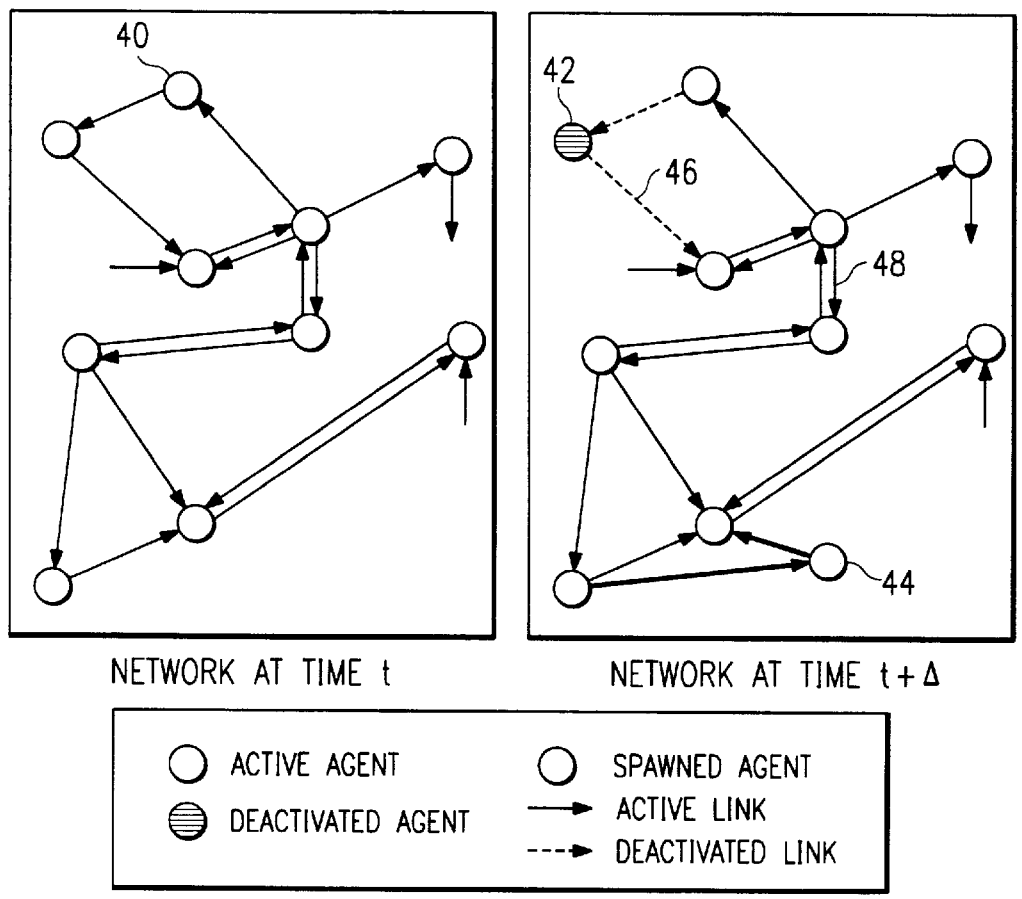
FIG. 4 shows evaluation of a network of agents having both permanent agents and temporary agents.

FIG. 4 shows a evolution of a network of agents having both permanent agents and temporary agents. The network may evolve over time t to t+Δ through activation of new agents and deactivation of old agents. Each individual agent takes local actions in accordance with global and local constraints, local sensor inputs, and inputs from connected agents. A network of cooperating control agents implements local control actions to synchronize attainment of global goals. Local agents implement local optimality criteria, which can use the same optimality strategies (Min-Max, Team, Pareto, Stakelberg, or Nash) or different optimality strategies, but must all comply with global optimality criteria and global conservation laws (balancing constraints). Synchrony is achieved and maintained through use of individual agent reactivity to maintain phase coherence for values of shared data elements that have global application (i.e., agents react to achieve agreement based on each agent complying with global conservation laws or global criteria).

The logic agent network consists of permanent agents performing persistent tasks and temporary agents performing transient tasks linked by active links 48. Network evolution consists of spawning new agents 44 and deactivating old agents 42 and deactivating links 46 as required to take appropriate actions so that the flow associated with the current system state and current agent actions follows a near-optimal path. Two results of this feature of the MAHCA are: (1) support for gradual construction and enhancement of large systems; and (2) support for implementation of a continuum hierarchy for real-time systems whose engineering design supports partitioning of system functions into a hierarchy according to time scales or displacement scales of the system.

The multiple-agent hybrid control architecture supports autonomous creation of a new agent 44 at time t+Δ. Spawning a new agent supports temporary accommodation of transient tasks by temporary agents or changing of system topology for a longer period through creation of permanent agents. During evolution, the architecture supports autonomous deactivation of an old agent 42 and links 46 from agent 40. Deactivation of an old agent supports system modification to end processes that are no longer needed.

Figure 5A:
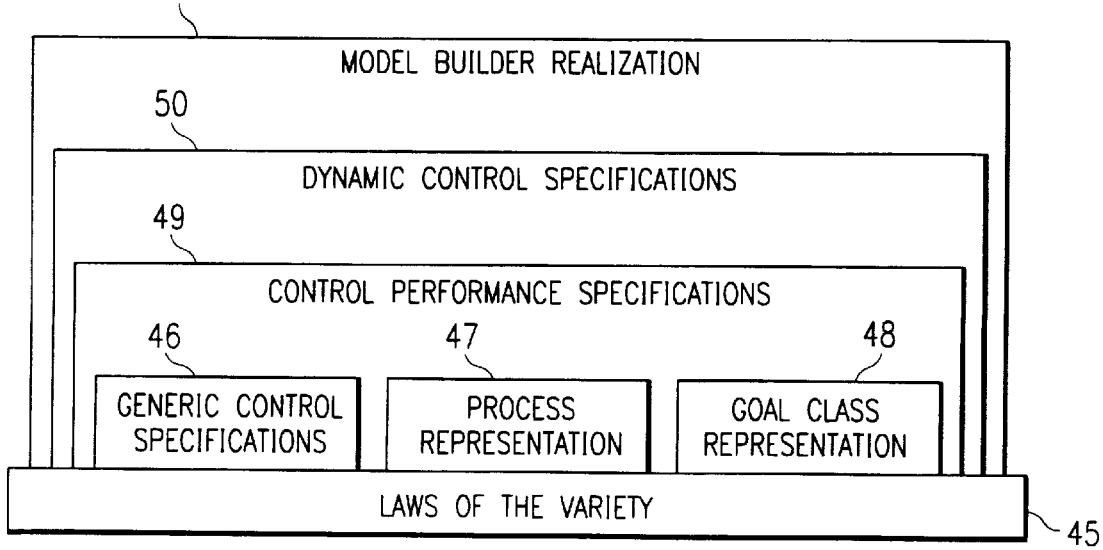
FIG. 5a shows a knowledge base arranged as a set of equational-relational clauses arranged in a hierarchy of relationships.

FIG. 5a shows details of Knowledge Base 28 shown in FIG. 2 arranged as a set of equational-relational clauses. Equational-relational clauses are used to declare both logical and evolution constraints on system evolution. The Knowledge Base has underlying Laws of the Variety 45, Generic Control Specifications 46, Process Representation 47, Goal Class Representation 48, Control Performance Specifications 49, Dynamic Control Specifications 50, and Model Builder Realization 51 arranged in a nested hierarchy. This arrangement of domain Knowledge is the means whereby more complex descriptions of system performance requirements are created from elemental algebraic declarations. Declarations can be written as equational-relational clauses in Equational Logic Language.

The bottom of this hierarchy contains the Laws of the Variety 45 equations that characterize the algebraic and topological structures of the manifold M. These are expressed the terms of relational forms. From the algebraic point of view, they model an algebraic equational variety. Modeling the manifold as an equational variety captures the state dynamics of the simulations involved in a DIS process in terms of equational clauses that MAHCA can reason about. The Knowledge Base of each agent in MAHCA contains a copy of this Knowledge; however, during operation the corresponding clauses will be in a different instantiation status because they depend on sensory data.

The Generic Control Specifications 46, together with Process Representations 47 and Goal Class Representation 48 are the next level of the hierarchy. The Generic Control Specifications 46 are clauses expressing general desired behaviors of the system. They include statements about stability, complexity, and robustness that are generic to the class of declarative rational controllers. Generic Control Specifications 46 are constructed by combining Laws of the Variety in the Equational Logic Language format.

The Process Representation 47 is given by clauses characterizing the dynamic behavior and structure of the process, which may include sensors and actuators. These clauses are written as conservation principles for the dynamic behavior and as invariance principles for the structure.

The Goal Class Representation 48 contains clauses characterizing sets of desirable operation points in the domain (points in the manifold M). These clauses are expressed as soft constraints; that is, constraints that can be violated for finite intervals of time. They express the ultimate purpose of the controller but not its behavior over time. The goal clauses are agent dependent. Goal Class Representation clauses are also constructed by combining Laws of the Variety in the Equational Logic Language format.

The Control Performance Specifications 49 contain clauses used for expressing problem-dependent and agent-dependent criteria and constraints. Control Performance Specification clauses comprise the next layer in the Knowledge Base nested hierarchy. They include generic constraints such as speed and time of response, and qualitative properties of state trajectories. Control Performance Specification clauses are also constructed by combining Laws of the Variety in the Equational Logic Language format.

The Dynamic Control Specifications 50 are clauses whose bodies are modified as a function of the sensor and goal commands. Dynamic Control Specification clauses comprise the next layer in the Knowledge Base nested hierarchy. Dynamic Control Specification clauses are constructed by combining Laws of the Variety in the Equational Logic Language format.

The Model Builder Realization 51 contain clauses that constitute a recipe for building a procedural model (automaton) for generating a variable instantiation and theorem proving. Model Builder Realization 51 clauses constitute the top layer in the Knowledge Base hierarchy.

Figure 5B:
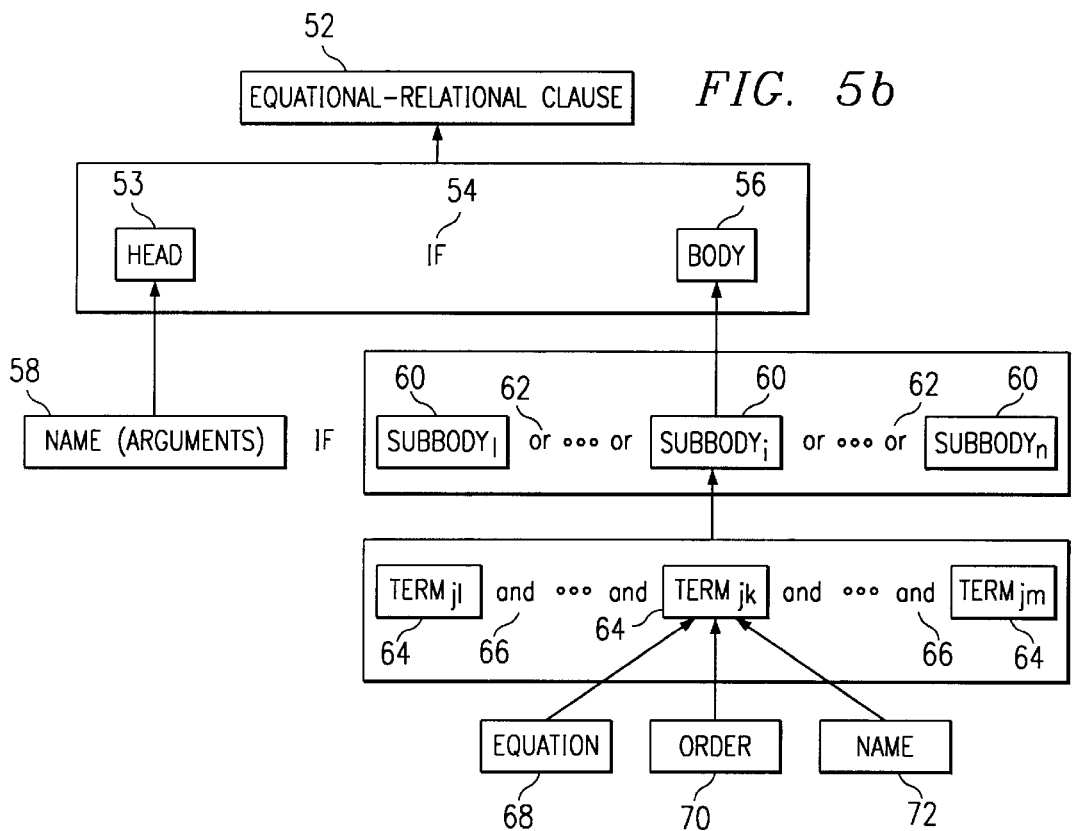
FIG. 5b shows a basic element of a single-agent knowledge base as an equational-relational clause.

FIG. 5b shows a basic element of a single-agent Knowledge Base 28 as shown in FIG. 2 as an equational-relational clause. Clauses stored in the Knowledge Base of an agent are used to generate automata that comply with the set of logical and evolution constraints on system behavior. The Equational-Relational Clause 52 is the elemental unit of Knowledge concerning system behavior. The syntax of an elemental equational-relational clause is the syntax of a Horn clause. That is, the clause has the syntax: a Head 53, implication function (IF) 54, and Body 56.

The Knowledge Base consists of a set of equational first-order logic clauses with second-order extensions. The syntax of clauses is similar to the ones in the Prolog language. Each clause is of the form:

$$\text{Head} < \text{Body} \quad (16)$$

where Head 53 is a functional form $p(x_1, \ldots, x_n)$ 58 taking values in the binary set [true, false] with $x_1, x_2, \ldots, x_n$ variables or parameters in the domain D of the controller. The variables appearing in the clause head are assumed to be universally quantified. The symbol < stands for logical implication function (IF) 54.

The Body 56 of a clause is a disjunction 62 of subbodies 60, where each subbody is a conjunction 66 of logical terms 64. Each logical term is an equation 68, an order 70, or a name 72. The conjunction of terms, $e_i$, has the form:

$$e_1 \wedge e_2 \wedge \ldots \wedge e_m \quad (17)$$

where $\wedge$ is the logical "and" 66. Each term in equation (17) is a relational form. A relational form is one of the following: an equational form, an inequational form, a covering form, or a clause head. The logical value of each of these forms is either true or false. A relational form $e_i$ is true for precisely the set of tuples of values $S_i$ of the domain D taken by the variables when the relational form is satisfied and is false for the complement of that set. That is, for $e_i = e_i(x_1, \ldots, x_n)$, $S_i$ is the possibly empty subset of $D^n$ $$S_i = \{(x_1, \ldots, x_n) \in D^n | e_i(x_1, \ldots, x_n) = \text{true}\} \text{ so } e_i(x_1, \ldots, x_n) = \text{false if } (x_1, \ldots, x_n) \in D^n | S_i$$

The generic structure of a relational form is given in Table 1.

TABLE 1

Structure of the Relational Form

| Form | Structure | Meaning |
| --- | --- | --- |
| equational | $w(x_1, \ldots, x_n) \approx v(x_1, \ldots, x_n)$ | equal |
| inequational | $w(x_1, \ldots, x_n) \neq v(x_1, \ldots, x_n)$ | not equal |
| covering | $w(x_1, \ldots, x_n) < v(x_1, \ldots, x_n)$ | partial order |
| clause head | $q(x_1, \ldots, x_n)$ | recursion, chaining |

In Table 1, w and v are polynomic forms with respect to a finite set of operations whose definitional and property axioms are included in the Knowledge Base. A polynomic form v is an object of the form:

$$v(x_1, \ldots, x_n) = \sum_{\omega \in \Omega^*} (v, \omega) \cdot \omega$$

where $\Omega^*$ is the free monoid generated by the variable symbols $\{x_1, \ldots x_n\}$ under juxtaposition. The term $(v, \omega)$ is called the coefficient of v at $\omega \in \Omega^*$. The coefficients of a polynomial form v take values in the domain of definition of the clauses. This domain will be described shortly.

The logical interpretation of equations (16) and (17) is that the Head is true if the conjunction of the terms of the Body are jointly true for instances of the variables in the clause head. The domain in which the variables in a clause head take values is the manifold M. Manifold M is contained in the Cartesian product:

$$M \subseteq G \times S \times X \times A \quad (18)$$

where G is the space of goals, S is the space of sensory data, X is the space of controller states, and A is the space of control actions. G, S, X, and A are manifolds themselves whose topological structure is defined by specification clauses in the Knowledge Base. These clauses, which are application-dependent, encode the requirements on the closed-loop behavior of the process under control. In fact, the closed-loop behavior, which will be defined later in terms of a variational formulation, is characterized by continuous curves with values in manifold M. This continuity condition is central, because it is equivalent to requiring the system to look for actions that make the closed loop behavior satisfy the requirements.

Figure 5C:
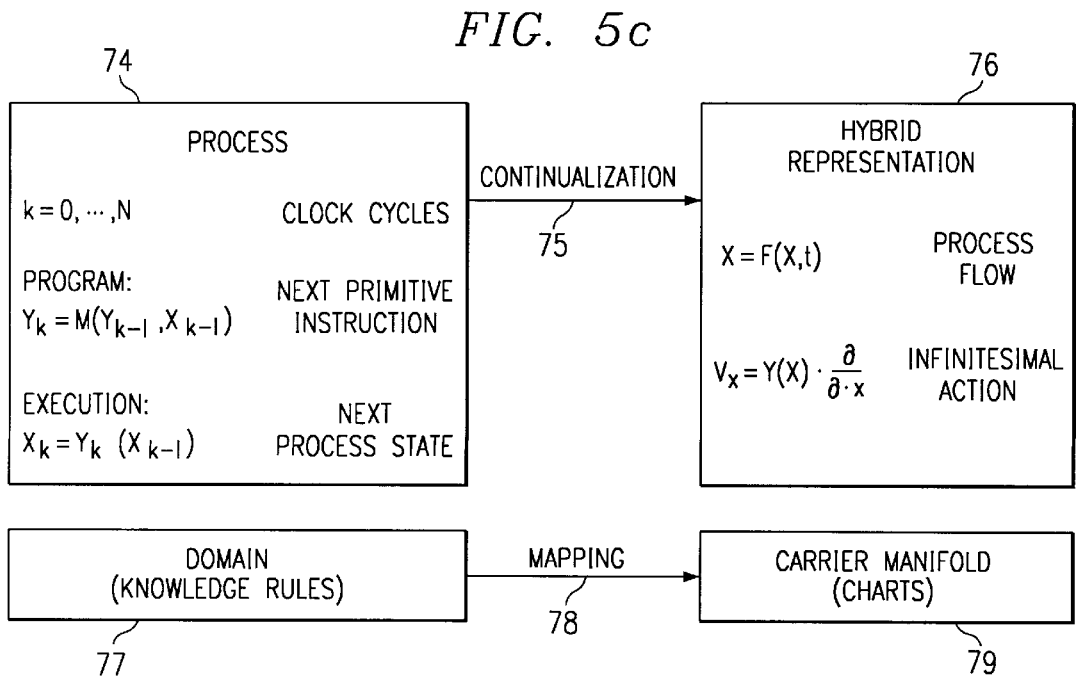
FIG. 5c shows continualization of a software process.

FIG. 5c shows a process 74 is embedded in a hybrid representation 76 via a continualization 75 algorithm. The algorithm constructs an invariant mapping 78 from the domain 77 into carrier manifold 79. The equational-relational clauses that are domain (knowledge rules) 77 that declare Knowledge in the domain of the Knowledge Base have a one-to-one mapping 78 with charts (open sets) 79 in the carrier manifold. For general control problems, the Knowledge Base organization shown in FIG. 5a provides the hierarchy of declarations from elemental Laws of the Variety to the level of building domain models. The Knowledge Base organization also supports continualization of discrete processes for inclusion in the optimization framework. This approach is also applicable for general discrete processes (e.g., sorting and traveling salesman problems). The embedding of procedures in continuum representations is a fundamental step in applying a unified representation of system state to develop a functional that can be used to determine the near-optimal path.

The denotational semantics of each clause in the Knowledge Base is one of the following: (1) a conservation principle; (2) an invariance principle; or (3) a constraint principle. Conservation principles are one or more clauses about the balance of a particular process in the dynamics of the system or the computational resources. Conservation laws hold when the controlled physical or logical device satisfies its performance specification. For instance, equation (15) encoded as a clause expresses the conservation of demand in the logic communications network. For the purpose of illustration, this rule is written below.

$$\text{conservation\_of\_unsatisfied\_demand} \quad (19)$$

$$(p, t, [Q_{i,k}], S_{ri}, [D_k], \Delta, C_i^u) <$$

$$C_i^{u++} = \sum_j \frac{(v_i|_p(C_i^{u+}))^j \cdot \Delta^j}{j!}$$

(encoding of equation (13))

$$\wedge C_i^{u+} = C_i^u + S_{ri} + \sum_k Q_{i,k} \cdot D_k$$

(encoding of equation (15))

$$\wedge \text{process\_evolution}(p, t, p'')$$

(encoding of equation (13))

$$\wedge t_+ = t + \Delta$$

$$\wedge \text{conservation\_of\_unsatisfied\_demand}$$

$$(p'', t_+, [Q_{i,k}], S_{ri}, [D_k], \Delta, C_i^{u++})$$

In expression (19), the first equational term relates the unsatisfied demand for agent i at the current time to the unsatisfied demand in the past and the net current demand of the other agents connected to i on i. The last term of the rule implements recursion.

As another example, consider the following clause representing conservation of computational resources:

$$\text{comp}(\text{Load}, \text{Process}, \text{Op\_count}, \text{Limit}) <$$

-continued $$\text{process}(\text{process\_count})$$

$$\wedge \text{process\_count} \cdot \text{Load1} - \text{Op\_count} \text{Load}$$

$$\wedge \text{Load1} < \text{Limit}$$

$$\wedge \text{comp}(\text{Load1}, \text{Process}, \text{Op\_count}, \text{Limit})$$

where "Load" corresponds to the current computational burden measured in VIPS (Variable Instantiations Per Second), "process" is a clause considered for execution, and "Op_count" is the current number of terms in process. Conservation principles always involve recursion whose scope is not necessarily a single clause, as in the example above, but may have chaining throughout several clauses.

Invariance principles are one or more clauses establishing constants of motion in a general sense. These principles include stationarity, which plays a pivotal role in the formulation of the theorems proved by the architecture, and geodesics. In the control of DIS processes, invariant principles specify quality response requirements. That is, they specify levels of performance as a function of traffic load that the system must satisfy. The importance of invariance principles lies in the reference they provide for the detection of unexpected events. For example, in a DIS process, the update time after a request is serviced is constant, under normal operating conditions. An equational clause that states this invariance has a ground form that is constant; deviation from this value represents deviation from normality.

Constraint principles are clauses representing engineering limits to actuators or sensors and, most importantly, behavioral policies. For instance, in a DIS process, the characteristics of the speed of response of the values controlling the input flow size or the speed of access are given by empirical graphs (e.g., byte number vs. velocity, with traffic volume as a parameter) stored in the system relational base. Another example in this application is given by the clauses that define the lifting strategy for embedding discrete varying trajectories into manifold M (interpolation rules). The clause Knowledge Base is organized in a nested hierarchical structure as previously shown in FIG. 5a.

Figure 6A:
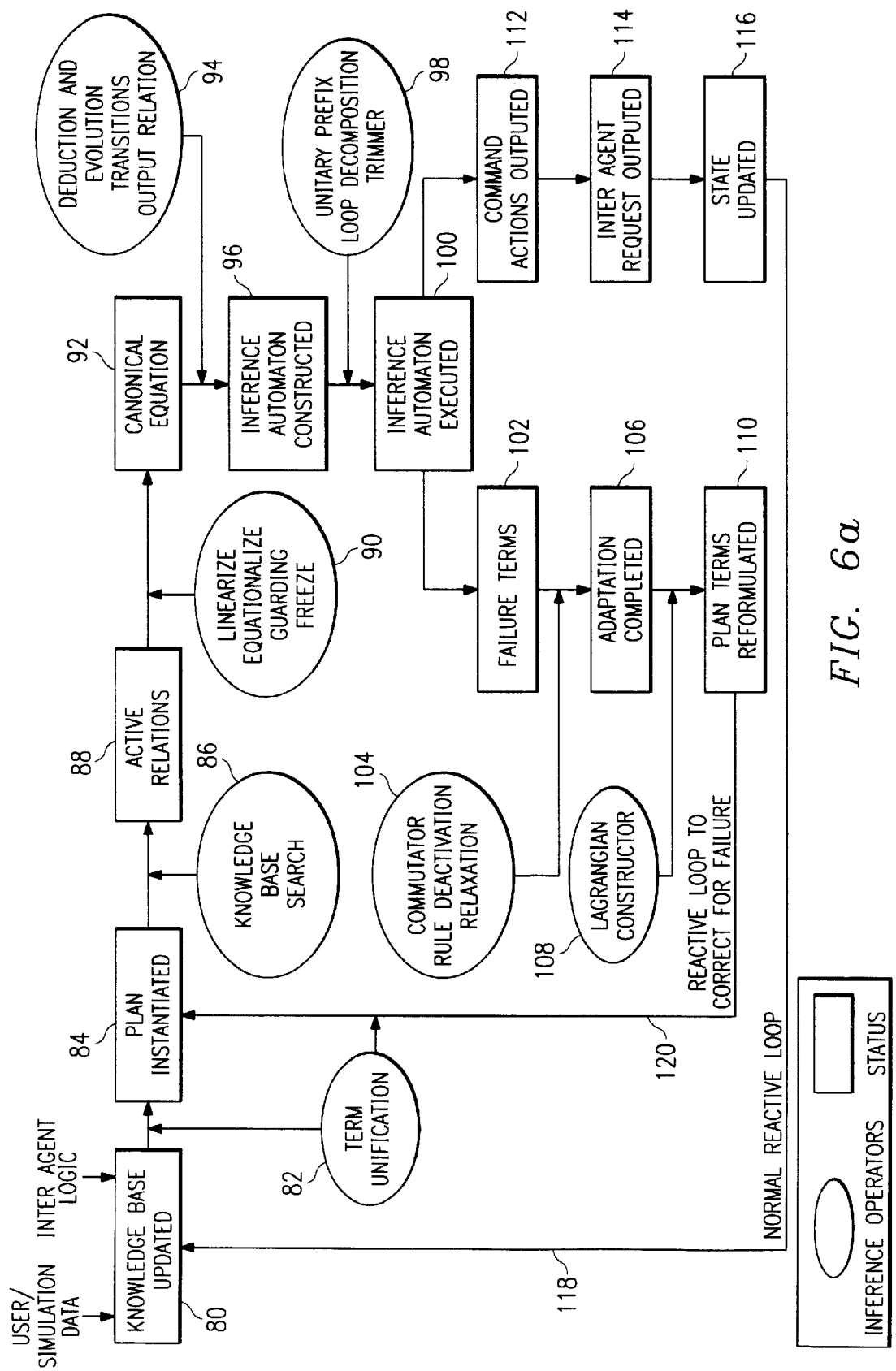
FIG. 6a shows actions performed by individual agents to synchronize distributed, real-time systems.

FIG. 6a shows actions performed by individual agents to synchronize distributed, real-time systems. Actions are performed by automata created by each agent in compliance with constraints contained in the equational-relational clauses and with input from sensors and from other agents in the logic agent network. A single agent generates automata through performing transformations on points in a carrier manifold. This figure shows the data flow resulting from single-agent components performing appropriate transformations on points in a carrier manifold. The data flow diagram shows how the system can be state updated each time the Knowledge Base is updated 80 using inputs from users, inputs from other agents in the logic agent network, current agent state 118 from the previous decision cycle, or sensed results from actions taken in the previous decision cycle. The state of the system is maintained in values of a point in the carrier manifold, which has both logical and evolution attributes. The data flow diagram of a single agent indicates how values of points in the carrier manifold are changed in extracting an automaton that complies with logical and evolution constraints at each update interval.

The data flow diagram shows the architecture of the instantiation of a plan 84 is achieved by the Planner 24 shown in FIG. 2 through term unification 82 of current updates 80 in the Knowledge Base 86 (also shown in as reference numeral 28 in FIG. 2) with item potentials constructed by the Adapter 30 shown in FIG. 2 from failure terms 102 received from the Inferencer 26 shown in FIG. 2. Active relations 88 are the result of receiving the behavior criterion from the Planner 24 shown in FIG. 2 and applying relaxation principles to construct relaxation criterion. The canonical equation 92 is the result of applying the Levi-Civita connection principle to the relaxed criterion (using linearize, equationalize, guarding, and freeze 90) to build a dynamic programming equation, which is the action equation. The inference automaton is constructed 96 using an inference blueprint constructor (deduction and evolution transitions output relation) 94. An inference procedure (unitary prefix loop decomposition trimmer) 98 is then used to construct an automaton. If the inference automaton execution 100 fails to meet the goal criterion, then the failure terms 102 are sent to the Adapter 30 shown in FIG. 2 where syntactic rules for relaxation (commutator rule deactivation relaxation) 104 are applied to perform adaptation 106. The plan terms are reformulated 110 as potentials using a Lagrangian constructor 108 and sent to the Planner 24 shown in FIG. 2 for instantiation 84 as a reactive loop 120 to correct for system failure. If the execution 100 of the inference automaton constructed meets the near-optimality constrains of the goal criterion, then command actions are output 112, interagent requests are output 114, and the system state is updated 116 as a normal reactive loop 118.

The set of individual (infinitesimal) actions over an execution interval of an individual agent are normally identified, selected, and executed through the execution loop (normal reaction loop) 118. The execution loop of the MAHCA for an individual agent is the means whereby smooth conformance with both logical and evolution constraints of system behavior for an individual agent for local constraints is achieved. The set of actions implemented over a set of action intervals by the agents of a logic agent network is the means whereby smooth conformance with both logic and evolution constraints of system behaviors for multiple time scales and multiple displacement distances is achieved for distributed systems.

In the event of failure to prove a solution to the composed problem, the clauses in the Knowledge Base of an individual agent are corrected for failure in accordance with rules for syntactic relaxation of constraints. Following this relaxation of constraints, a set of individual (infinitesimal) actions over an execution interval of an individual agent are then identified, selected, and executed through the reactive loop to correct for failure (failure loop) 120. The failure loop of the MAHCA is the means whereby robust implementation of both logical and evolution degrees of freedom in the architecture is achieved. Allowable relaxation criteria for logic constraints such as safety and quality constraints are supported in a common framework for relaxation of precision performance criteria of evolution constraints. These allowable degrees of freedom operate at the local level to support robust control of individual nonlinear processes and at the global level to support robust control of large-scale, distributed systems.

The embedding of logic constraints in continuum representations is a fundamental step in applying a unified representation of system state to develop a functional which can be used to determine the near-optimal path. The carrier manifold is the means for forming a unified declaration of system state (status) which includes both logic and evolution parameters. The logical Lagrangian (equation 20)) is the means whereby the logical constraints and evolution constraints are embedded in a continuum representation of system behavior. The Knowledge Decoder 32 shown in FIG. 2 functions to place discrete and evolution values for user inputs, sensor inputs, and inputs from other agents in a continuum representation—the logical Lagrangian.

Figure 6B:
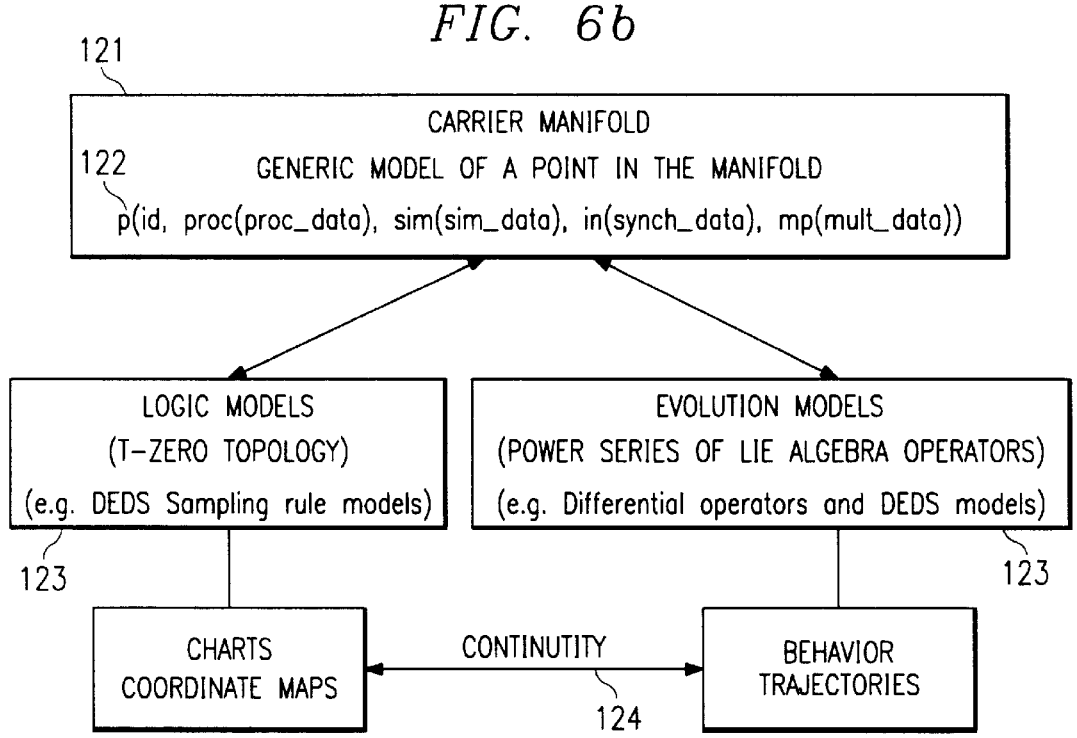
FIG. 6b shows the carrier manifold as the mathematical entity whereby a unified model of system state is constructed and in which the invariant transformations necessary for system solution are performed.

FIG. 6b shows the carrier manifold as the mathematical entity whereby a unified model of system state is constructed and in which the invariant transformations necessary for system solution are performed. MAHCA rests on the application of the calculus of variations in a new manner. The symbolic formulas for controls which are generated by automata constructed by individual agents can be viewed as formulas for the coefficients of a Cartan connection on an appropriate Finsler manifold associated with a parametric calculus of variations formulation of the optimal control problem. The carrier manifold 121 is the MAHCA version of the appropriate Finsler manifold. Following Caratheodory's lead as shown in Wolf Kohn et al., *Hybrid System as Finsler Manifolds: Finite State Control as Approximation to Connections* (Wolf Kohn et al. eds., Springer Verlag 1995) construes the evolution of the hybrid system state as taking place on a differentiable manifold defined by the constraints. A key attribute of Finsler manifolds is the introduction of a metric ground form for calculation of Finsler length which is used to define a norm on the tangent space to the manifold at a given point. This use of a Finsler metric is key to calculating the appropriate e-optimal control law at each update interval.

The carrier manifold 121 is the foundational mathematical entity for unification of logical, geometric, and evolution constrains on system behavior. A point p 122 in the carrier manifold has both logical and evolution parameters as previously described in expression (2). While conventional system representations split system models into logic models and evolution models 123, the Kohn-Nerode definition of continuity 124 of process models supports the use of the carrier manifold to achieve an amalgamation of logic and evolution models into a continuum representation.

Figure 6C:
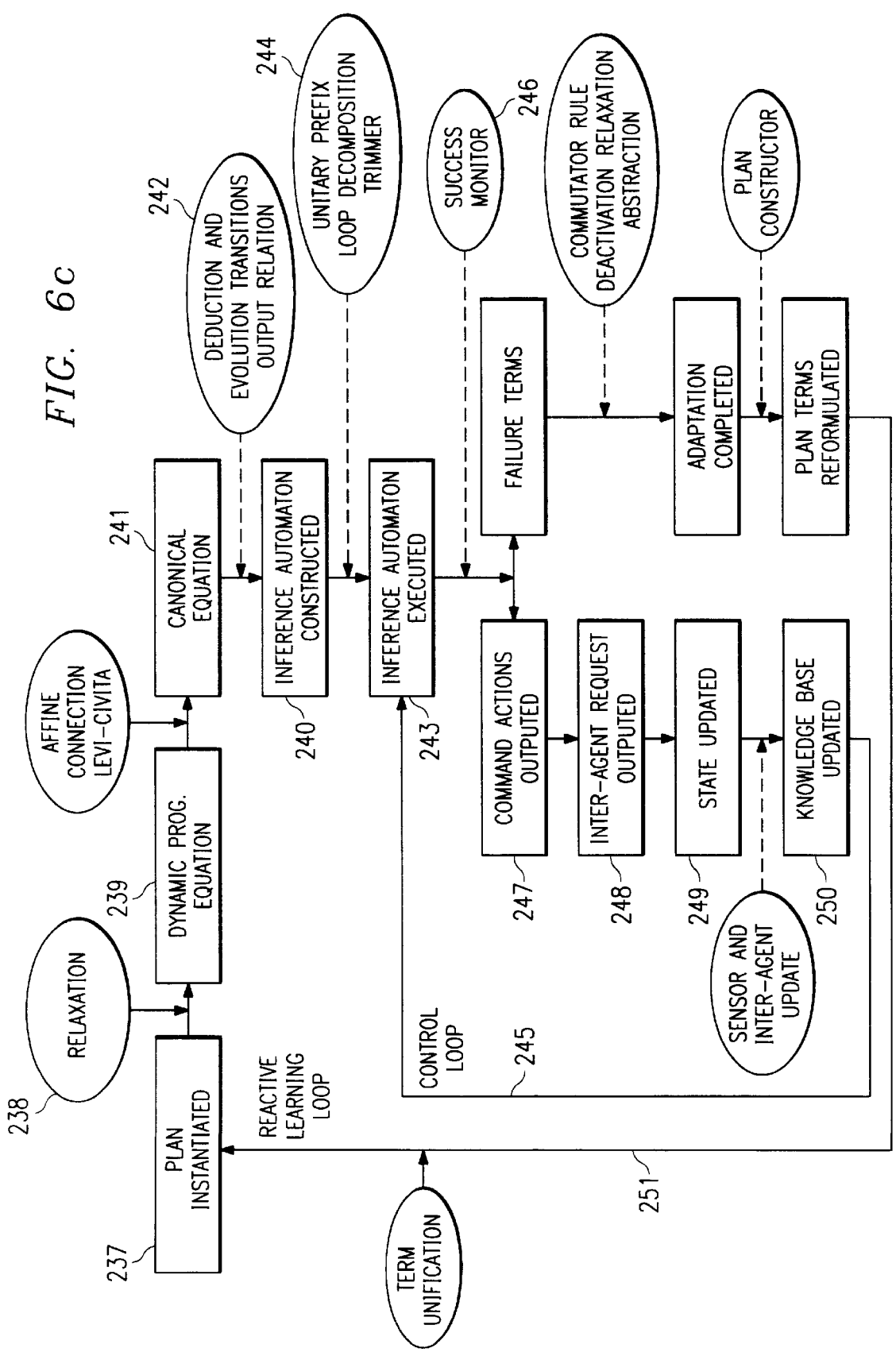
FIG. 6c shows the actions performed by individual agents similar to those shown in FIG. 6a, but contains different descriptions for some of the events and the operators that are important for the DMM implementation shown in FIG. 15.
Figure 15:
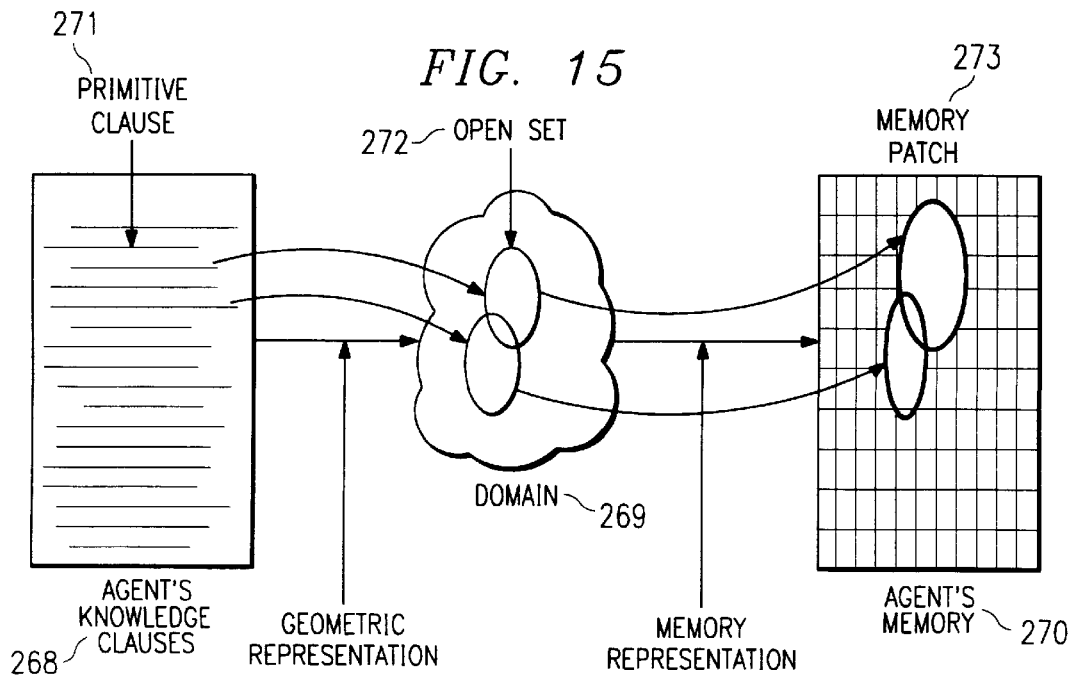
FIG. 15 shows a conceptual illustration of the Direct Memory Map (DMM) that is used to implement the agent architecture of FIG. 14.

FIG. 6c is similar to FIG. 6a, but contains different descriptions for some of the events and the operators, which are important for the DMM implementation shown in FIG. 15. FIG. 6c provides a data flow diagram of the Prolog prototype implementation of a MAHCA agent. In this figure, boxes represent events in the computation and circles represent inference operators on events. An event is transformed into the next event along the data flow by an inference operator acting on the event. This action is always carried out by unification. See Lloyd, J. W. "Foundations of Logic Programming", Springer-Verlag, 2nd ed., 1992.

The first event that appears at the beginning of the update interval is Plan Instantiated 237. This instantiation is encoded as an optimization criterion that captures the present desired behavior of the agent. The relaxation operator 238 convexities this optimization criterion. This convexification is required to obtain a new criterion that approximates the original one as close as desired and allows the construction of computationally effective solutions if they exist. The new criterion is presented in the form of a dynamic programming equation 239. The form and characteristics of this equation is described in Kohn, W. J. James and A. Nerode. "The Declarative Approach to Design of Robust Control Systems", CACSD '96, An Arbor, Mich., Sept. 1996. The two events described above are functionally carried out by the planner module in the agent's architecture.

The agent solves the dynamic programming equation by constructing on-line a procedure, termed the inference automaton 240, that generates a solution. A solution consists of the control actions to be sent to the process under control and the current state of the agent. The solution is generated in three steps. First the dynamic programming equation is transformed into two subproblems: goal backward propagation and current interval optimization. The coordination resolution of these two subproblems is generated by a two-level finite state machine (each level computes a solution to one of the two subproblems) referred to as the inference automaton associated with a current plan. The event at the end of this step is a blueprint for the inference automation 240, referred to in FIG. 3 as the canonical equation 241.

In the second step, the canonical equation 241 is operated on by the deduction, evolution and output relation inference operators 242 to construct the inference automaton 240. Finally, in the third step, the inference automaton 243 is executed by first decomposing the inference automaton into an equivalent (i.e. same behavior) series-parallel network of simpler inference automata. This is carried out from the canonical equation by the unitary, prefix, loop decomposition, and trimmer inference operators 244. As the inference automaton executes 243, it accesses clauses in the knowledge base which are used to determine the control actions to be executed and the next state of the agent is the basis of the Direct Memory Map concept depicted in FIG. 15.

The three steps previously described implement most of the functionality provided by the Inferencer during an iteration of a step in the control loop 245. If the execution of the inference automaton 243 is successful, that is, if there is a state path from the current agent state to the agent goal, the output relation of the automaton generates the corresponding command actions 242, the interagent status 248, the updated agent state 249 and sensor-based updates 249 of the knowledge base 250. Then the inference automation is reset and the procedure is repeated. Unless the success monitor inference operator 246 detects an inference automaton failure, the inference automaton is used again for the next update interval, while the code associated with the reactive learning loop 251 remains dormant. One of the advantages in the separation of the two loops is that in a multitask environment, the preparative part of the reactive learning loop 257 can be run concurrently with the control loop 245 yielding a substantial time performance improvement during reactive learning events.

Figure 7:
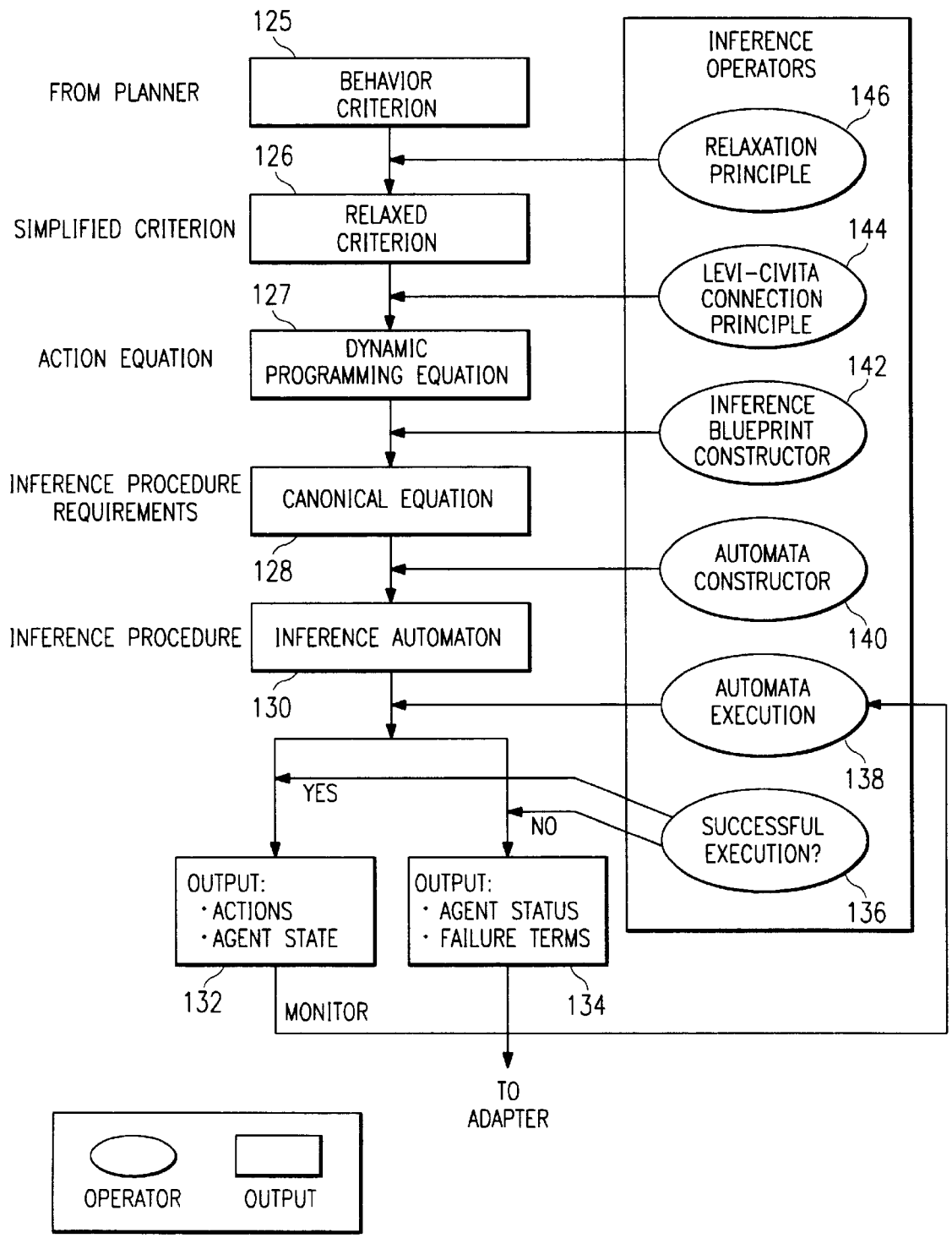
FIG. 7 shows the basic method of operation of the multiple-agent hybrid control architecture as the creation of the next automaton given the current set of system goals, the current set of logical and evolution constraints on system behavior, the current set of inputs from the user(s), and the current set of sensor values.

FIG. 7 shows the basic method of operation of the MAHCA as the creation of the next automaton given the current set of system goals, the current set of logical and evolution constraints on system behavior, the current set of inputs from user(s), and the current set of sensor values. These parameters are all declared and appear as equational-relational clauses to the Inferencer 26 shown in FIG. 2. This figure shows the sequence of operations taken by the Inferencer to generate an automaton that provides near-optimal actions for achieving system goals while complying with logical and evolution constraints and current system inputs.

The Inferencer takes a theorem from the Planner 24 shown in FIG. 2 and either produces an automaton that performs the near-optimal actions in terms of a cost function or produces the failure terms so the Adapter 30 shown in FIG. 2 can provide relaxed criteria to the Planner 24 shown in FIG. 2 for construction of a new theorem. The hybrid control system architecture and Inferencer operation result in generation of automata that execute actions to follow a near-optimal path to reach the goal criterion. The relaxed criterion 126 is the result of receiving the behavior criterion 125 from the Planner 24 shown in FIG. 2 and applying the relaxation principle 146. The dynamic programming equation 127, which is the action equation, is the result of applying the Levi-Civita connection principle 144 to the relaxed criterion 126. The canonical equation 128 is constructed from the dynamic programming equation 127 using an inference blueprint constructor 142. The inference automaton 130 is constructed from the canonical equation 128 using an automata constructor 140. An inference procedure (unitary prefix loop decomposition trimmer) 98 shown in FIG. 6a is then used to construct an automaton. If the automata execution 138 of the inference automaton 130 constructed fails to meet the goal criterion 134, then the failure terms and agent status are sent to the Adapter 30 shown in FIG. 2 where syntactic rules for relaxation are applied to perform adaptation. If the execution 138 of the inference automaton constructed will successfully 136 meet the near-optimality constraints of the goal criterion, then command actions are output 132, interagent requests are output, and the system state is updated as a normal reactive loop.

The function of the theorem Planner 24 shown in FIG. 2, which is domain-specific, is to generate, for each update interval, a symbolic statement of the desired behavior of the system, as viewed by the agent (e.g., agent i) throughout the interval. The theorem statement that it generates has the following form:

Given a set of primitive actions, there exists control schedule $v_{i|_p}$ of the form equation (12) and a fraction function differential $d\alpha_i(\cdot)$ (FIG. 1b) in the control interval (t, t+$\Delta$) such that $d\alpha_i(\cdot)$ minimizes the functional $$\int_t L_i(\Psi_i(\tau, p), v_i|_p(G_i(\tau, p))) \cdot d\alpha_i(p, d\tau) \tag{20}$$

subject to the following constraints:

$$G_i(S_i, \Psi_i(t + \Delta, p)) = G(t, X_i) \tag{21}$$

(local goal for the interval),

-continued $$\sum_m Q_{i,m}(p,t) \cdot D_m(p,t) = V_i(p,t)$$

(interagent constraint)

and $\int_{[t,t+\Delta)} d\alpha_i(p, d\tau) = 1"$

In equation (20), $L_i$ is called the local relaxed Lagrangian of the system as viewed by agent i for the current interval of control (t, t+$\Delta$). This function, which maps the Cartesian product of the state and control spaces into the real line with the topology defined by the clauses in the Knowledge Base, captures the dynamics, constraints, and requirements of the system as viewed by agent i. The relaxed Lagrangian function $L_i$ is a continuous projection in the topology defined by the Knowledge Base in the coordinates of the i-th agent of the global Lagrangian function L that characterizes the system as a whole.

In equation (21), which is taken from equation (15), p∈M represents the state of the process under control as viewed by the agent and $G_i$ is the parallel transport operator bringing the goal to the current interval. The operator $G_i$ is constructed by lifting the composite flow (see equation (10)) to the manifold. The composite flow and the action schedule are determined once the fraction function (measure) $\alpha_i$ is known, and this function is the result of the optimization equations (20) and (21). In particular, the action schedule is constructed as a linear combination of primitive actions (see equation (12)).

The expressions in equation (21) constitute the three constraints imposed in the relaxed optimization problem solved by the agent. The first constraint is the local goal constraint expressing the general value of the state at the end of the current interval. The second constraint represents the constraints imposed on the agent by the other agents in the network. Finally, the third constraint indicates that $d\alpha_i(\cdot)$ is a probability measure.

Under relaxation and with the appropriate selection of the domain, the optimization problem stated in equations (20) and (21) is a convex optimization problem. This is important because it guarantees that if a solution exists, it is unique, and also, it guarantees the computational effectiveness of the inference method that the agent uses for proving the theorem.

The term $d\alpha_i(\cdot)$ in equation (20) is a Radon probability measure on the set of primitive command or control actions that the agent can execute for the interval (t, t+$\Delta$). It measures, for the interval, the percentage of time to be spent in each of the primitive actions. The central function of the control agent is to determine this mixture of actions for each control interval. This function is carried out by each agent by inferring from the current status of the Knowledge Base whether a solution of the optimization problem stated by the current theorem exists, and, if so, to generate corresponding actions and state updates.

The construction of the theorem statement given by equations (20) and (21) is the central task carried out in the Planner 24 shown in FIG. 2. It characterizes the desired behavior of the process as viewed by the agent in the current interval so that its requirements are satisfied and the system "moves" towards its goal in an optimal manner.

The function under the integral in equation (20) includes a term, referred to as the "catch-all" potential, which is not associated with any clause in the Knowledge Base 28 shown in FIG. 2. Its function is to measure unmodelled dynamic events. This monitoring function is carried out by the Adapter 30 shown in FIG. 2, which implements a generic commutator principle similar to the Lie bracket discussed previously. Under this principle, if the value of the catch-all potential is empty, the current theorem statement adequately models the status of the system. On the other hand, if the theorem fails, meaning that there is a mismatch between the current statement of the theorem and system status, the catch-all potential carries the equational terms of the theorem that caused the failure. These terms are negated and conjuncted together by the Inferencer 26 shown in FIG. 2 according to the commutation principle (which is itself defined by equational clauses in the Knowledge Base 28 shown in FIG. 2) and stored in the Knowledge Base as an adaptation dynamic clause. The Adapter 30 shown in FIG. 2 then generates a potential symbol, which is characterized by the adaptation clause and corresponding tuning constraints. This potential is added to criterion for the theorem characterizing the interval.

The new potential symbol and tuning constraints are sent to the Planner 24 shown in FIG. 2 which generates a modified local criterion and goal constraint. The new theorem, thus constructed, represents adapted behavior of the system. This is the essence of reactive structural adaptation in this model.

Synchronization is achieved through generation of automata whose actions apply: (1) the Kohn-Nerode definition of continuity for hybrid systems which is the basis for creation of a unified statement of hybrid system state and for determining when evolution of the system state violates topological continuity constraints, causing the proof procedure to fail and requiring reaction to restore continuity, and (2) the Kohn-Nerode optimality result to select appropriate chattering combination of individual (infinitesimal) actions to achieve near-optimal performance. The smooth and near-optimal synchronization of actions to control distributed processes subject to both logical and evolution constraints in order to achieve satisfaction of global and local goals is the primary result of applying the hybrid control architecture. Since the MAHCA is effective for near-optimal control of dynamic distributed processes, it is also appropriate for near-optimal solution of static systems.

Figure 8:
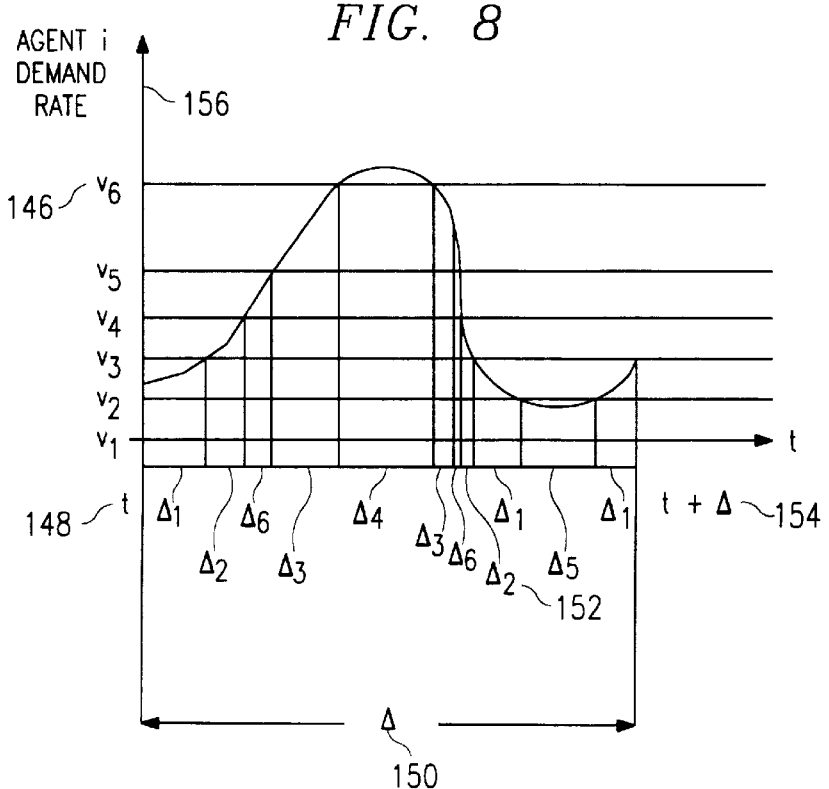
FIG. 8 shows a process of achieving a near-optimal solution of a hybrid system problem i through chattering between individual actions.

FIG. 8 shows a process of achieving a near-optimal solution of a hybrid system problem i 156 through chattering between individual actions. FIG. 8 illustrates the relations between the primitive actions $v_i$ 146 and the fraction $\Delta_i$ 152 of $\Delta$ 150 for which they are active in the interval (t, t+$\Delta$) 148, 154. Chattering refers to switching between infinitesimal control actions $v_i$ 146 at subintervals $\Delta_i$ 152 of the update interval $\Delta$ 150. Agent actions are taken for a finite interval of time $\Delta$ 150 appropriate for each agent. The automata that execute near-optimal actions are updated for each interval.

At this point, the issue of robustness should be addressed. To a large extent, the Adapter 30 shown in FIG. 2 of each controller agent provides the system with a generic and computationally effective means to recover from failures or unpredictable events. Theorem failures are symptoms of mismatches between what the agent thinks the system looks like and what it really looks like. The adaptation clause incorporates Knowledge into the agent's Knowledge Base which represents a recovery strategy. The Inferencer, discussed next, effects this strategy as part of its normal operation.

The Inferencer 26 shown in FIG. 2 is an on-line equational theorem prover. The class of theorems it can prove are represented by statements of the form of equations (20) and (21), expressed by an existentially quantified conjunction of equational terms of the form:

$$\exists Z | W_1(Z, p) rel_1 V_1(Z, p) \wedge \ldots \wedge W_n(Z, p) rel_n V_n(Z, p) \quad (22)$$

where Z is a tuple of variables each taking values in the domain D, p is a list of parameters in $D = G \times S \times X \times A$ (i.e. a point in manifold M), and $\{W_i, V_i\}$ are polynomial terms in the semiring polynomial algebra $$D\langle\Omega\rangle \quad (23)$$

with $D = \{D, <+, \cdot, 1, 0>\}$ a semiring algebra with additive unit 0 and multiplicative unit 1.

In equation (22), $rel_i$, $i = 1, \ldots, n$, are binary relations on the polynomial algebra. Each $rel_i$ can be either an equality relation ($\approx$), inequality relation ($\neq$), or a partial order relation. In a given theorem, more than one partial order relation may appear. In each theorem, at least one of the terms is a partial order relation that defines a complete lattice on the algebra; that corresponds to the optimization problem. This lattice has a minimum element if the optimization problem has a minimum.

Given a theorem statement of equation form (22) and a Knowledge Base of equational clauses, the Inferencer determines whether the statement logically follows from the clauses in the Knowledge Base, and if so, as a side effect of the proof, generates a non-empty subset of tuples with entries in D giving values to Z. These entries determine the agent's actions. Thus, a side effect is instantiation of the agent's decision variables. In equation (23) $\Omega$ is a set of primitive unary operations $\{v_i\}$. Each $v_i$ maps the semiring algebra, whose members are power series involving the composition of operators, on Z to itself $$v_i : D\langle\langle Z \rangle\rangle \to D\langle\langle Z \rangle\rangle \quad (24)$$

These operators are characterized by axioms in the Knowledge Base, and are process dependent. In formal logic, the implemented inference principle can be stated as follows: Let $\Sigma$ be the set of clauses in the Knowledge Base. Let $\to$ represent implication. Proving the theorem means to show that it logically follows from $\Sigma$, i.e., $$\sum \Rightarrow \text{theorem} \quad (25)$$

The proof is accomplished by sequences of applications of the following inference axioms:

| | |
|---|---|
| equality axioms | convergence axioms |
| inequality axioms | knowledge base axioms |
| partial order axioms | limit axioms |
| compatibility axioms | |

Each of the inference principles can be expressed as an operator on the Cartesian product:

$$D\langle\langle W \rangle\rangle \times D\langle\langle W \rangle\rangle \quad (26)$$

Each inference operator transforms a relational term into another relational term. The Inferencer applies sequences of inference operators on the equational terms of the theorem until these terms are reduced to either a set of ground equations of the form of equation (27), or it determines that no such ground form exists.

$$Z_i \approx \alpha_i, \alpha_i \in D \quad (27)$$

The mechanism by which the Inferencer carries out the procedure described above is by building a procedure for variable goal instantiation: a locally finite automaton (referred to as the Proof Automaton). This important feature is unique to our approach. The proof procedure is customized to the particular theorem statement and Knowledge Base instance it is currently handling.

Figure 9:
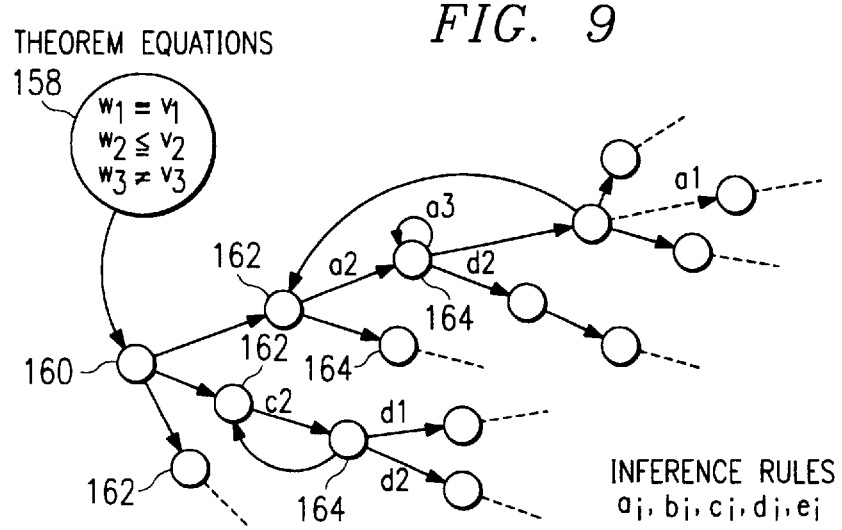
FIG. 9 shows a conceptual structure of a proof automaton describing sequences of actions that are possible for the automaton constructed by an Inferencer.

FIG. 9 shows a conceptual structure of a proof automaton describing sequences of actions that are possible for the automaton constructed by the Inferencer 26 shown in FIG. 2 and further detailed in FIG. 7. Agents achieve optimal control over an interval by chattering between infinitesimal actions which are chosen from a finite set of alternatives. Infinitesimal actions are followed over subintervals of the action update interval $\Delta$ 150 shown in FIG. 8. Actions are implemented by proof automata generated as a side-result of proving that a near-optimal solution to the control problem can be achieved.

The structure of the proof automaton generated by the Inferencer is illustrated in FIG. 9. In FIG. 9, the initial state 160 represents the equations 158 associated with the theorem. In general, each following state 162, 164 corresponds to a derived equational form of the theorem through the application of a chain of inference rules $a_i$, $b_i$, $c_i$, $d_i$, $e_i$ to the initial state that is represented by the path $$S_0 \xrightarrow{inf_1} S_1 \xrightarrow{inf_2} S_2 \xrightarrow{inf_3} \ldots \xrightarrow{inf_k} S_k$$

Each edge in the automaton corresponds to one of the possible inferences. A state is terminal if its equational form is a tautology, or it corresponds to a canonical form whose solution form is stored in the Knowledge Base.

In traversing the automaton state graph, values or expressions are assigned to the variables. In a terminal state, the equational terms are all ground states (see equation (27)). If the automaton contains at least one path starting in the initial state and ending in a terminal state, then the theorem is true with respect to the given Knowledge Base and the resulting variable instantiation is valid. If this is not the case, the theorem is false.

The function of the complete partial order term, present in the conjunction of each theorem provable by the Inferencer, is to provide a guide for constructing the proof automaton. This is done by transforming the equational terms of the theorem into a canonical fixed point equation, called the Kleene-Schutzenberger Equation (KSE), which constitutes a blueprint for the construction of the proof automaton. This fixed point coincides with the solution of the optimization problem formulated in equations (20) and (21), when it has a solution. The general form of KSE is:

$$Z \approx E(p) \cdot Z + T(p) \qquad (28)$$

In equation (28), E is a square matrix, with each entry a rational form constructed from the basis of inference operators described above, and T is a vector of equational forms from the Knowledge Base. Each non-empty entry, $E_{ij}$, in E corresponds to the edge in the proof automaton connecting states i and j. The binary operator between E(p) and Z represents the "apply inference to" operator. Terminal states are determined by the non-empty terms of T. The p terms are custom parameter values in the inference operator terms in E(·). A summary of the procedure executed by the Inferencer is presented in FIG. 7.

The construction of the automaton is carried out from the canonical equation and not by a non-deterministic application of the inference rules. This approach reduces the computational complexity of the canonical equation (low polynomic) and is far better than applying the inference rules directly (exponential). The automaton is simulated to generate instances of the state, action, and evaluation variables using an automaton decomposition procedure, which requires n $\log_2$ n time, where n≈number of states of the automaton. This "divide and conquer" procedure implements the recursive decomposition of the automaton into a cascade of parallel unitary (one initial and one terminal state) automata. Each of the resulting automata on this decomposition is executed independently of the others. The behavior of the resulting network of automata is identical with the behavior obtained from the original automaton, but with feasible time complexity.

The Inferencer 26 shown in FIG. 2 for each control agent fulfills two functions: generating a proof for the system behavior theorem of each agent generated by the Planner (equations (20) and (21)) and functioning as the central element in the Knowledge Decoder. Its function for proving the behavior theorem will now be described. Later, its function as part of the Knowledge Decoder will be shown.

To show how the Inferencer is used to prove the Planner theorem, equations (20) and (21), first this theorem is transformed into a pattern of the equation form (22). Since equations (20) and (21) formulate a convex optimization problem, a necessary and sufficient condition for optimality is provided by the following dynamic programming formulation:

$$V_i(Y, \tau) = \inf_{\alpha_i} \int_\tau L_i(\Psi_i(\tau, Y), v_i|_p(G_i(\tau, p))) \cdot d\alpha_i(p, d\tau) \qquad (29)$$

$$\frac{\partial V_i}{\partial \tau} = \inf_{\alpha_i} \mathcal{H}\left(Y, \frac{\partial V_i}{\partial Y}, \alpha_i\right)$$

$$Y(t) = p$$

$$\tau \in [t, t + \Delta)$$

In expression (29), the function $V_i$, called the optimal cost-to-go function, characterizes minimality starting from any arbitrary point inside the current interval. The second equation is the corresponding Hamilton-Jacobi-Bellman equation for the problem stated in equations (20) and (21), where H the Hamiltonian of the relaxed problem. This formulation provides the formal coupling between deductive theorem proving and optimal control theory. The Inferencer allows the real-time optimal solution of the formal control problem resulting in intelligent distributed real-time control of the multiple-agent system. The central idea for inferring a solution to equation (29) is to expand the cost-to-go function V(.,.) in a rational power series V in the algebra $$D\langle\langle(Y, \tau)\rangle\rangle \qquad (30)$$

Replacing V for $V_i$ in the second equation in expression (29), gives two items: a set of polynomic equations for the coefficients of V and a partial order expression for representing the optimality. Because of the convexity and rationality of V, the number of equations needed to characterize the coefficients of V is finite. The resulting string of conjunctions of coefficient equations and the optimality partial order expression are in equation form (22).

In summary, for each agent, the Inferencer 26 shown in FIG. 2 operates according to the following procedure.

Step 1: Load current theorem equations (20) and (21);
Step 2: Transform theorem to equational form (22) via equation (29); and
Step 3: Execute proof according to chart shown in FIG. 7, which was described previously.

If the theorem logically follows from the Knowledge Base (i.e., it is true), the Inferencer procedure will terminate on step 3 with actions $\alpha_i($ ). If the theorem does not logically follow from the Knowledge Base, the Adapter 30 shown in FIG. 2 is activated, and the theorem is modified by the theorem Planner 24 shown in FIG. 2 according to the strategy outlined above. This mechanism is the essence of reactivity in the agent. Because of relaxation and convexity, this mechanism ensures that the controllable set of the domain is strictly larger than the mechanism without this correction strategy.

The Knowledge Decoder 32 shown in FIG. 2 translates Knowledge data from the network into the agent's Knowledge Base by updating the inter-agent specification clauses of the Knowledge Base. These clauses characterize the second constraint in expression (29). Specifically, they express the constraints imposed by the rest of the network on each agent. They also characterize global-to-local transformations. Finally, they provide the rules for building generalized multipliers for incorporating the inter-agent constraints into a complete unconstrained criterion, which is then used to build the cost-to-go function for the nonlinear optimization problem in the first equation in expression (29). A generalized multiplier is an operator that transforms a constraint into a potential term. This potential is then incorporated into the original Lagrangian which now accounts explicitly for the constraint.

The Knowledge Decoder 32 shown in FIG. 2 has a built-in inferencer used to infer the structure of the multiplier and transformations by a procedure similar to the one described for equation (14). Specifically, the multiplier and transformations are expanded in a rational power series in the algebra defined in equation (30). Then the necessary conditions for duality are used to determine the conjunctions of equational forms and a partial order expression needed to construct a theorem of the form of equation (22) whose proof generates a multiplier for adjoining the constraint to the Lagrangian of the agent as another potential.

The conjunction of equational forms for each global-to-local transformation is constructed by applying the following invariant embedding principle: For each agent, the actions at given time t in the current interval, as computed according to equation (29), are the same actions computed at t when the formulation is expanded to include the previous, current, and next intervals.

By transitivity and convexity of the criterion, the principle can be analytically extended to the entire horizon. The invariant embedding equation has the same structure as the dynamic programming equation given in equation (29), but using the global criterion and global Hamiltonians instead of the corresponding local ones.

The local-to-global transformations are obtained by inverting the global-to-local transformations obtained by expressing the invariant embedding equation as an equational theorem of the form of equation (22). These inverses exist because of convexity of the relaxed Lagrangian and the rationality of the power series.

Figure 10A:
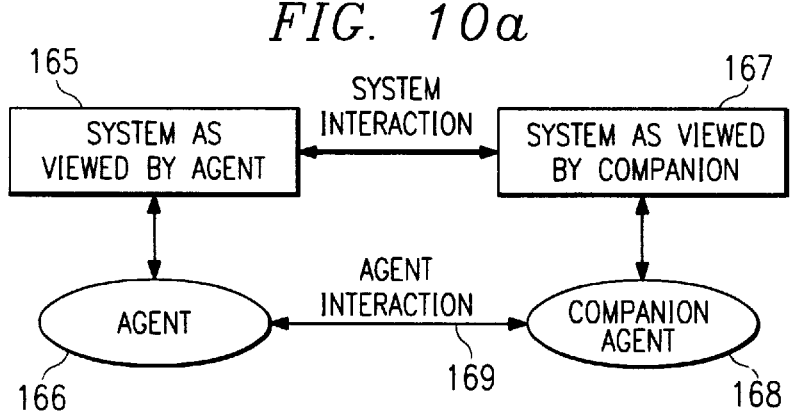
FIG. 10a shows a dipole network equivalent, which describes a useful result of the multiple-agent hybrid control architecture formulation.

FIG. 10a shows the functionality of the Knowledge Decoder 32 shown in FIG. 2 of each agent in terms of what it does. The multiplier described above has the effect of aggregating the rest of the system and the other agents into an equivalent companion system 167 and companion agent 168 through system interaction and agent interaction 169, respectively, as viewed by the current agent 165. The aggregation model shown in FIG. 10a describes how each agent 166 perceives the rest of the network. This unique feature allows characterization of the scalability of the architecture in a unique manner. Namely in order to determine computational complexity of an application, consider only the agent 166 with the highest complexity (i.e., the local agent with the most complex criterion) and its companion 168.

Figure 10B:
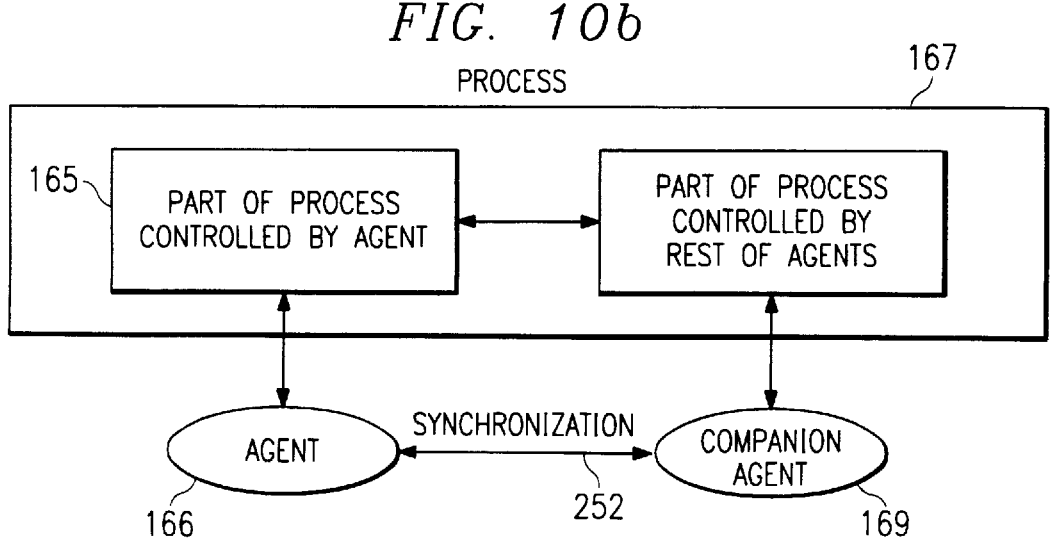
FIG. 10b shows depicts agent synchronization that is achieved by satisfaction of an interagent invariance principle.

FIG. 10b depicts agent synchronization. This is achieved by satisfaction of an interagent invariance principle. This principle states that, at each update time, the active plan of each of the agents in the network encodes equivalent behavior module a congruence relation determined by the knowledge clauses in each agent's Knowledge Base called Noether relations (see Logan, J. D. "Invariant Variational Principles," Academic Press 1987). These relations capture the similarities between the models of the process under control encoded in the agents Knowledge Base. Thus, when an agent 166 gets out of synchrony with respect to the network 169, at least one of the encoded Noether relations fails which causes a failure in the agent's Inferencer which then causes the activation of that agent's reactive learning loop to re-establish the agent's synchronization 252 with the rest of the agents.

From a practical point of view, the equivalence between the agent's models relative to the Noether relations permits the conception of the domain knowledge as a single virtual domain, with the agents navigating in different areas of this domain. This concept is exploited by the Direct Memory Map implementation depicted in FIG. 15. However, the synchronization 252 of agents is established by incorporating for each agent in the network, a companion agent which is also known as a Thevenin Agent.

The knowledge base of an agent's Thevenin agent encodes an abstracted model of the process under control by the other agents in the network. This level of abstraction is compatible with the description that the agent has about the process. The problem of network synchronization then reduces to the synchronization of each agent with its companion Thevenin agent.

The synchronization of agents operates as follows. Each agent views the remainder of the agents in a MAHCA network as a single agent called the companion agent. An agent and its companion agent is referred to as an agent pair where the agent is referred to as the prime agent of the agent pair. In other words, there is a virtual agent called the companion agent such that the companion agent's interaction with the prime agent is equivalent to the interaction of the rest of the agents in the MAHCA network with the prime agent.

A companion agent has the same architecture as any MAHCA agent. The companion agent's state is an abstraction of the states of the other agents in the network that summarizes the features relevant to the prime agent.

The prime agent's Inferencer constructs state and clock time transformations of the dynamics of the other agents in the MAHCA network to the prime agent's domain as a function of the plans being executed by the other agents in the MAHCA network and the prime agent's goal.

A special set of rules, called the invariance rules, are stored in the Knowledge Base of each prime agent. This rule is functionally dependent on the states of the prime agent and companion agent.

If a prime agent and its companion agent are in synchrony, then, at the current update time, the prime agent's invariance rule evaluates to a constant, pre-encoded value called the agent's invariance value. The side effect of evaluating this rule is the instantiation of the state and clock time transformations.

If a prime agent is out of synchrony with the network, its invariance rule evaluates to a value different from the agent's invariance value. When this situation is detected, the Inferencer of the prime agent will fail and trigger a plan synchronization change which is carried out by the prime agent's Adapter and Planner.

Figure 11:
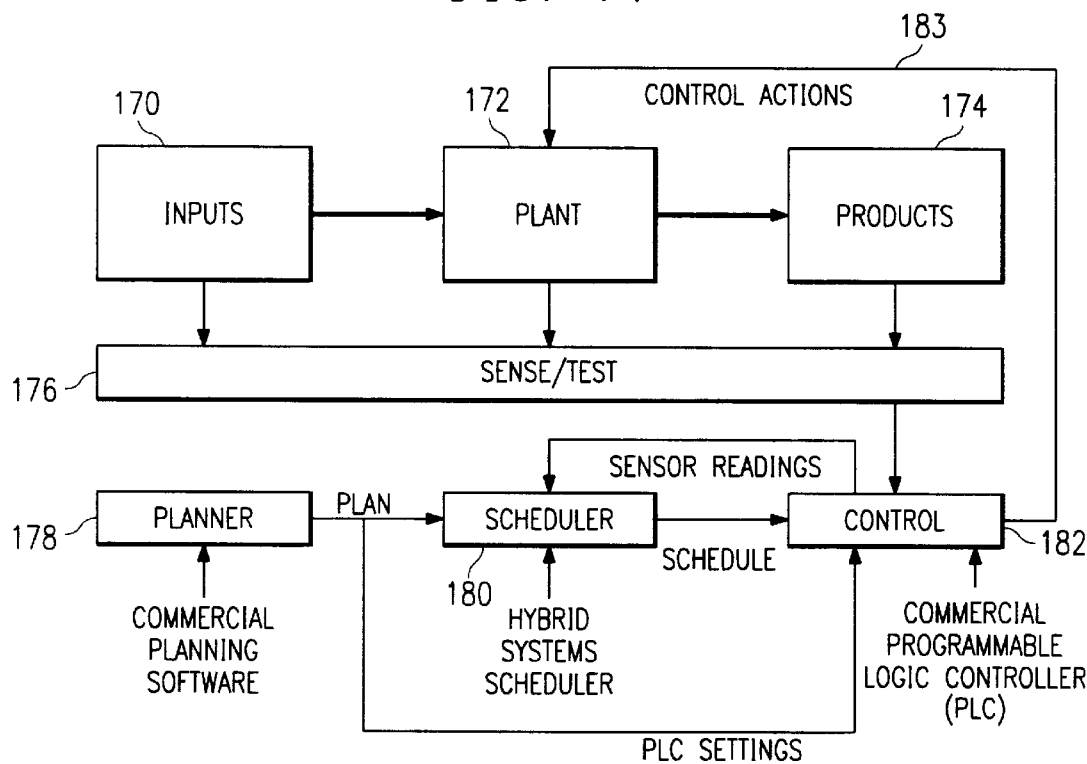
FIG. 11 shows an example of applying the multiple-agent hybrid control architecture to planning, scheduling, and control of discrete manufacturing plants.

FIG. 11 shows an example of applying the MAHCA to planning, scheduling, and control of a discrete manufacturing plant 172. A logic agent network 11 as shown in FIG. 1 can synchronize the logical operation of event-based components with the evolution operation of continuum-based components such as repair of failed schedules 180 to synchronize execution of the output of high-level discrete-manufacturing planning functions 178 in order to achieve near-optimal schedules of actions to be executed by programmable logic controllers (PLCs) 182. The actions demanded of the PLC components must comply with evolution constraints. Such a system could be implemented with the Scheduler 180 being a single agent acting as the hybrid system scheduler "glue" between the high-level Planner 178 and the low-level Control 182 implemented using conventional commercial planning software and commercial programmable logic controllers or as a multiple-agent system with the Planner, Scheduler, and Controller implemented as agents. The Control 182 interfaces into the physical plant through Sense/Test 176 components which detect the state of the Plant 172, the Inputs 170 and the Products 174. The Control directs the operation of the Plant through control actions 183.

Figure 12:
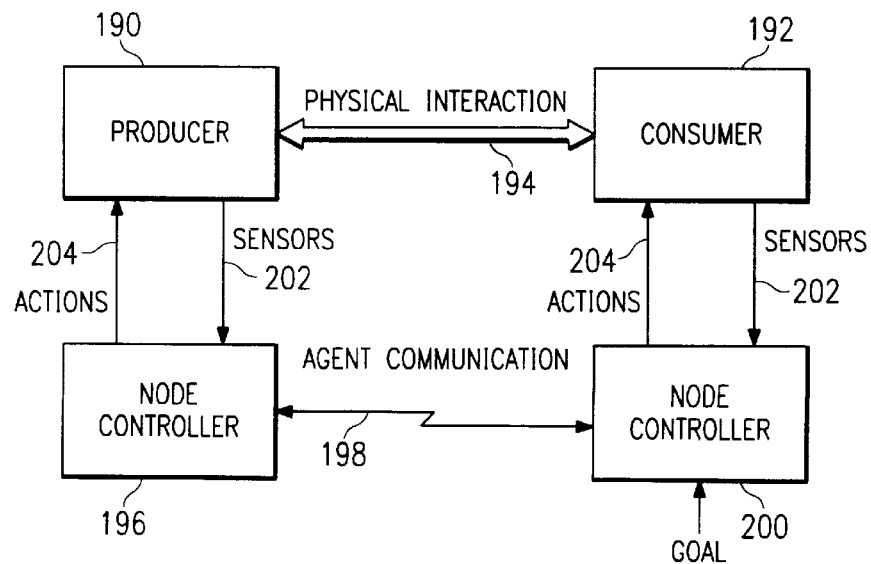
FIG. 12 shows an example of a two-agent multiple-agent network for discrete manufacturing applications.

FIG. 12 shows an example of a two-agent multiple-agent network for a discrete manufacturing plant such as the one shown in FIG. 11. A producer 190, node controller agent 196, and a consumer 192 node controller agent 200 can be used to produce and repair near-optimal schedules of work cell actions to synchronize execution of production requests in accordance with established priorities and production constraints. This synchronization is accomplished by having the system goal introduced into the consumer node controller agent 200 which passes messages via agent communication 198 to the producer node controller agent 196. Agents sense the state of the producer 190 and consumer 192 using sensors 202 and change the state of the system using commanded actions 204. Producer and consumer interactions are constrained by physical interaction 194. Actions produced by the two-agent network synchronize the operation of the plant.

FIG. 13 shows an example of a five-agent multiple-agent network for a discrete manufacturing application such as the one shown on FIG. 11. A multiple-agent network (as shown in FIGS. 1 and 7) can be configured to synchronize five cells for control of a discrete manufacturing plant. FIG. 13 illustrates MAHCA with five Permanent Agents controlling a manufacturing process for producing molded plastic products. The plant is composed of five functional cells:

Cell 1 210 performs the shipping and receiving functions and also includes an automated forklift 220 which can transport materials and products through the factory. The functions of Cell 1 are controlled and scheduled by the shipping and receiving MAHCA agent 221. Note that the agent in this cell interacts with a human operator 222 (MAHCA can perform semi-autonomous tasks).

Cell 2 212, the accounting agent, performs the accounting and plant coordination functions. This agent also performs inventory and control functions on the element of Cell 3, an automated warehouse bin 213.

Cell 3 214 is composed of a blender 230 that mixes the raw materials and produces the resin mix used in the final products. The blender is controlled by the blender control agent 224.

Cell 4 216 is composed of a molder 226 and the molder control agent 228. This agent 228 also performs control functions on the process component of Cell 5.

Cell 5 218, including the packing unit 234, is also controlled by MAHCA's packaging control agent 232.

Additionally, the MAHCA framework is capable of causing conventional procedures to run faster by transforming those functions into representations suitable for parallel solution. This is achieved through continualization, which is a symbolic algorithm for transforming a discrete process with a differential equation, whose solution contains the values computed by the process. Continualization is a generic procedure that replaces an executing reduced instruction set computer (RISC) procedure with solving a differential equation whose solution at selected sampling points coincides with output values of the procedures. The key element of the algorithm is a generic method for coding recursion into evolution of ordinary differential equations. The second key is to regard the program as a set of constraints, and to regard executing the program to termination as finding a near-optimal solution to a corresponding Lagrangian problem on a Finsler manifold determined by the constraints.

In solving on-line the corresponding Hamilton-Jacobi-Bellman equations for this problem, each individual digital instruction of the original program codes as an infinitesimal generator of a vector field on the manifold. The near-optimal chattering solution that gives the digital solution is a chattering combination of these vector fields. The chattering can be done in any order, which means that each digital instruction vector field gets attention during a certain portion of the chatter, but the order does not matter. This is a source of extreme parallelism in this continuous execution of digital programs. The chatters are found via the connection coefficients of the Cartan connection of the manifold. This can be used to accelerate virtually any digital program, and applies also to perpetual processes with slight modifications. In this alternate application of MAHCA, the Lagrangian problem formulation is the MAHCA formulation, the Finsler space is the MAHCA carrier manifold, and the infinitesimals are computed as in MAHCA. Each MAHCA agent can speed up an individual procedure and a network of agents can speed up an ensemble of procedures.

Figure 14A:
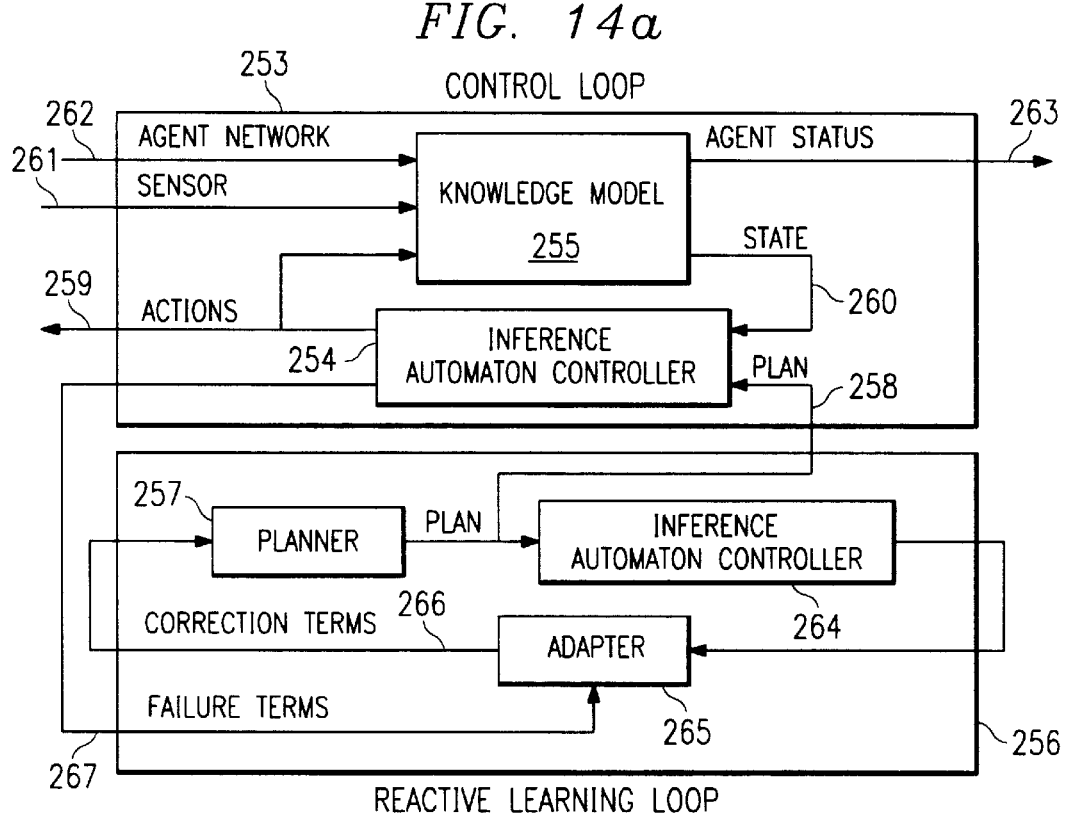
FIG. 14a shows the architectural model of an agent with the same functionality as the architecture in FIGS. 2, 6a, and 6c, but in which the Control Loop and the Reactive Learning Loop are implemented separately.

FIG. 14a depicts the architectural model of an agent with separated loops. This separation results in an implementation which is logically equivalent to the implementation previously described, but runs faster and with less memory requirements.

FIG. 14a is a blueprint of an implementation architecture of a MAHCA Agent with the same functionality as the architecture in FIGS. 2, 6a and 6c, but in which the Control Loop 253 and the Reactive Learning Loop 256 are implemented separately. In the implementation depicted in FIG. 14a, the Control Loop and the Reactive Learning Loop interact via two coupling channels. One of these coupling channels, labeled plan 258, goes from the Planner 257 in the Reactive Learning Loop 256 to the Inference Automaton Controller 254 of the Control Loop 253. The second coupling channel, Failure Terms 267, goes from the Inference Automaton Controller 254 of the Control Loop 253 to the Adapter Module 265 in the Reactive Learning Loop 256. The functionality of the modules in each of the loops is as follows.

Figure 14B:
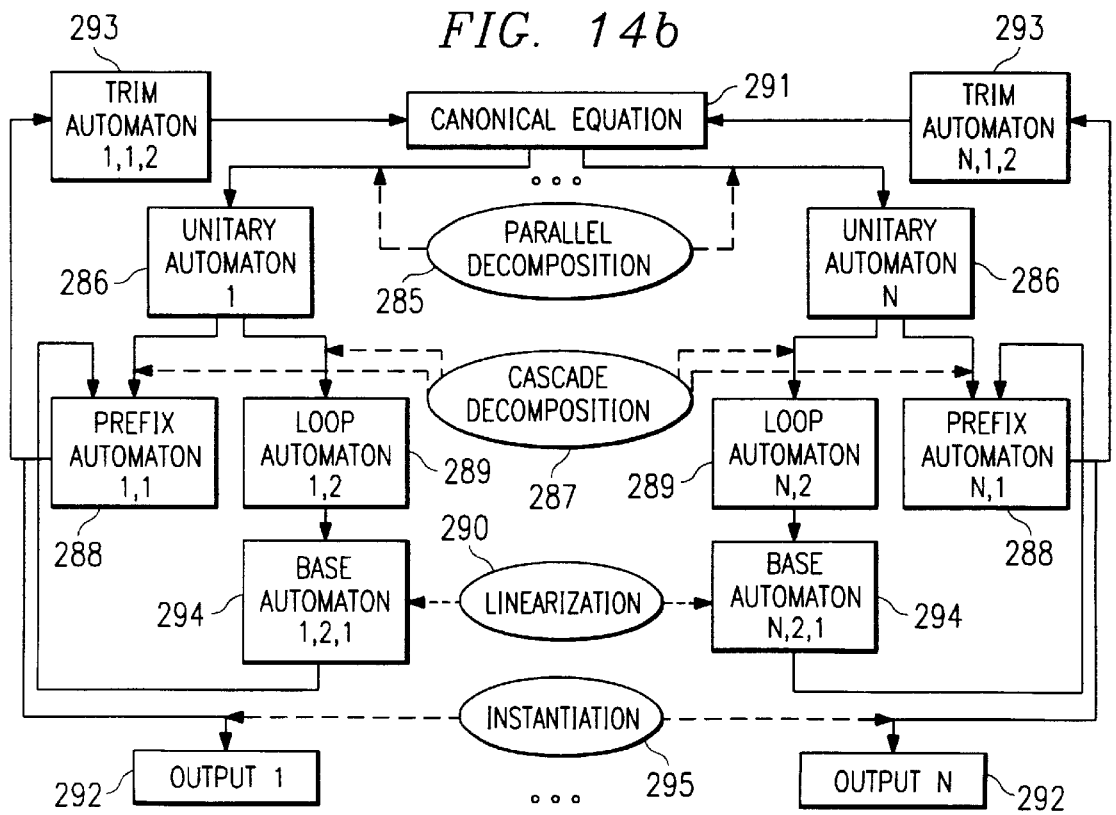
FIG. 14b shows the basic recursive finite state machine decomposition procedure which is also used in the Inference Automaton Controller Module.

The functionalities of the Adapter 265 and the Planner 257 in FIG. 14a are the same as the corresponding modules in FIG. 2. However, their implementations are different. In the architecture of FIG. 2, the Planner 30 and Adapter 24 use symbolic pattern matching as the basic schema for computation. In the architecture of FIG. 14a, the equivalent functionality is achieved by recursive decomposition and execution of finite state machines. The basic recursive finite state machine decomposition procedure is shown in FIG. 14b. This procedure is also used in the Inference Automaton Controller Module.

FIG. 14b, rectangles represent computational steps and circles represent transformations on computational steps called inference operators. The input to the procedure is an equation called the canonical equation 291 which captures the intended behavior of a finite state machine (automaton). The canonical equation in FIG. 14b is a version of the Kleene-Schutzenberger Equation (KSE). The generic form of a KSE is given below. This is a generic blueprint for all the procedures executed in the modules of the architecture of FIG. 14a.

$$Q(V) = E(V) \cdot Q(V) + T(X)$$

with $V \in I$, The space of instructions $X \in CS$, The computation space $$Q(V) = \begin{bmatrix} Q_1(V) \\ \vdots \\ Q_n(V) \end{bmatrix}, \text{Vector of rules}$$

$$E(V) = \begin{bmatrix} E_{1,1}(V) & \cdots & E_{1,n}(V) \\ \vdots & \vdots & \vdots \\ E_{n,1}(X) & \cdots & E_{n,n}(V) \end{bmatrix} \begin{array}{l} \text{Matrix of inference} \\ \text{operators of the procedure} \end{array}$$

$$T(X) = \begin{bmatrix} G_1(X) \\ \vdots \\ G_n(X) \end{bmatrix} \text{The vector of goals}$$

In the KSE equations, each entry of the matrix E is a rational form constructed from the basis of inference operators and T is a vector of equational forms from the Knowledge Base. If the (ij)-th entry of the matrix E is a non-empty entry, this represents an edge in the finite state machine from state i to state j. The binary operator "." between E(V) and Q(V) represents "apply inference to" operator. This operator is also called unification and is implemented as an evaluation routine. The ELL code implementing this operator is given below. The top level of the unification procedure, called eval, is executed by loading the current memory patch data structure and its neighbors and then recursively applying eval to them. The procedure uses two dynamic data bases: value_table which holds partial unification result and op_pred which holds the active rules associated with the patch. With some modification the same unification procedure is used for all the modules of the agent architecture.

Each procedure in the modules of FIG. 14a consists of one or more nested primitive sub-procedures of the form:

/*Basic Subprocedure*/

1. Formulate a canonical equation (KSE equations)
2. Compute the solution of the canonical equation using the procedure of FIG. 14b.

```
/* initialize */
initial :-asserta(value_table(initial,initial)).
/*initial :- asserta(value_table(initial10,initial10)).*/
/* evaluation of numbers */
eval(E,E) :- number(E),
    !,
/* evaluation of symbols */
/* If the symbol has a value assigned to it */
eval(E,F) :- atom(E),
E\==[ ],
value_table(E,F1_,
    !,
eval(F1,F),
retract(value_table(E,F1)),/*value_table is a data base of assignments */
assert(value_table(E,F)),
/* If the symbol has no value assigned to it, its value is itself */
eval(E,E) :- atom(E),
    !,
/* If the symbol is a ELL variable its value is itself */
eval(E,E) :- var(E),
    !,
/* evaluation of special objects */
/* list of evaluation */
eval([X|R],[Y|R1]) :- eval(X,Y),
eval(R,R1),
/* evaluation of composite expressions */
eval(E,F) :- functor(E,Op,N),
Op \=='.',
arg_exp(E,N,F_list),
eval(F_list,New_list),
(op_pred(Op,Pred,M),
/* op_pred is the set of ELL clauses defining the inference operators in the current memory patch */
    !,
append([Pred]),New_list,F1), .*constructs the inference operator */
(N1 is N+1),
M = N1,
append(F1,[F],F2), Y =.. F2, call(Y);
M = N,
Y1 =.. F1,
call(Y1));/* executes inference operator, if it is a new operator, then create a new functor form */
append([Op],New_list,F3),
/* determining the arguments of an expression */
arg_exp(E,N,F) :- exp_args(E,[],F,O,N).
exp_args(_,F,F,N,N) :-!.
exp_args(E,L,F,M,N) :- M1 is M+1,
arg(M1,E,A),
append(L,[A],L1),
exp_args(E,L1,F,M1,N).
```

In FIG. 14b, the Parallel Decomposition 285 transformation decomposes the finite state machine into a parallel series of unitary automata 286. A unitary automaton 296 is a finite state machine with a single initial state and a single terminal state. The Cascade Decomposition 287 then transforms each unitary automaton into a series of a prefix automaton 288 followed by a loop automaton 289. A prefix automaton is a unitary automaton which has no transitions from its terminal state and a loop automaton is a unitary automaton whose initial state and terminal state coincide. The Linearization modifies 290 the loop automaton 289 by incorporating a new terminal state which as the same edges as the initial state of the loop automaton and forms a base automaton 294. Then the inaccessible states are trimmed 293 from the resulting automata and the entire decomposition procedure is repeated if necessary. Whenever an automaton is produced in this decomposition which consist of a single path from the initial state to the terminal state, such an automaton is called a path automaton, it corresponds to a successful path in the original finite state machine and an output 292 is produced. Instantiation 295 generates the control law specified by the canonical equation 291.

The linear complexity of the procedure described above is a direct result of the non-deterministic nature of the procedure. The partial results of executing each path through the procedure are collected in the corresponding output states 232. The first path automaton in the decomposition produced by the procedure is executed and the result is stored in the corresponding output state. Once a successful path automaton is produced and executed, the decomposition procedure is terminated (first_finish_half_strategy).

The knowledge Model encodes the main data structures for the Direct Memory Map called memory patches. A memory patch is a computational representation of an open set in the topology of the carrier manifold. The Knowledge Model in the Control Loop of FIG. 14a is a collection of memory patches. Each memory patch encodes the following items:

(a) The pattern of a generic point (agent state) contained in the corresponding open set in the carrier manifold. This pattern is referred to as Boundaries in equation (31).

(b) The names of the primitive control actions, also called primitive infinitesimal control actions or primitive control derivations, available to the agent when its state an instance of the pattern of the generic point in the corresponding patch. These names are the $op_k$'s in equation (31).

(c) A set of symbols or values for the chattering coefficients, also called relaxation coefficients. Instantiated values of the chattering coefficients prescribe the percentage of time of the current update interval of the agent that the corresponding primitive control action is to be used. These names are the $\alpha_k$'s in equation (31).

(d) A collection of pointers to the sets of ELL clauses required for the Inference Automaton Controller to infer the primitive control actions, also called primitive infinitesimal control actions or primitive control derivations, available to the agent when its state an instance of the pattern of the generic point in the corresponding patch. A $pcc_k$ in equation (31) is a pointer to a precompiled version of the collection of ELL clauses which correspond to the primitive control action $op_k$.

(e) A mechanism for chaining the memory patch with its neighbors. This mechanism is referred to as Christoffel_symbol_pointers of equation (31) are functional forms which when given an Instantiated value of the generic point in clause (a) will compute the weights that allow the Inference Automaton Controller to infer transitions to neighboring memory patches. Equations based on the Christoffel symbols provide the compatibility relations between the primitive control actions of a memory patch and those of its neighbors.

A generic patch is data structure with a variable number of fields. The number of fields in a generic point is problem dependent. These fields encode state information coming from the companion agent and current sensory data coming from the sensors of the agent. From the computational point of view, a memory patch is a nested list of items (a)–(e). The entire collection of memory patches is itself a type of linked list data structure of an agent with the links provided by the Christoffel symbols. The links in this data structure are pre-established but are data dependent. The main functionality of a memory patch is to store knowledge about the primitive control actions available to an agent in the corresponding open set. Generic clauses needed to execute automata, system procedures and I/O procedures are not stored in (expensive) content addressable memory which is the type of memory used to store the memory patches. For example, the knowledge required for executing any of the transformations of the Inference Automaton Controller in FIG. 14c is not stored in the memory patches.

Figure 14C:
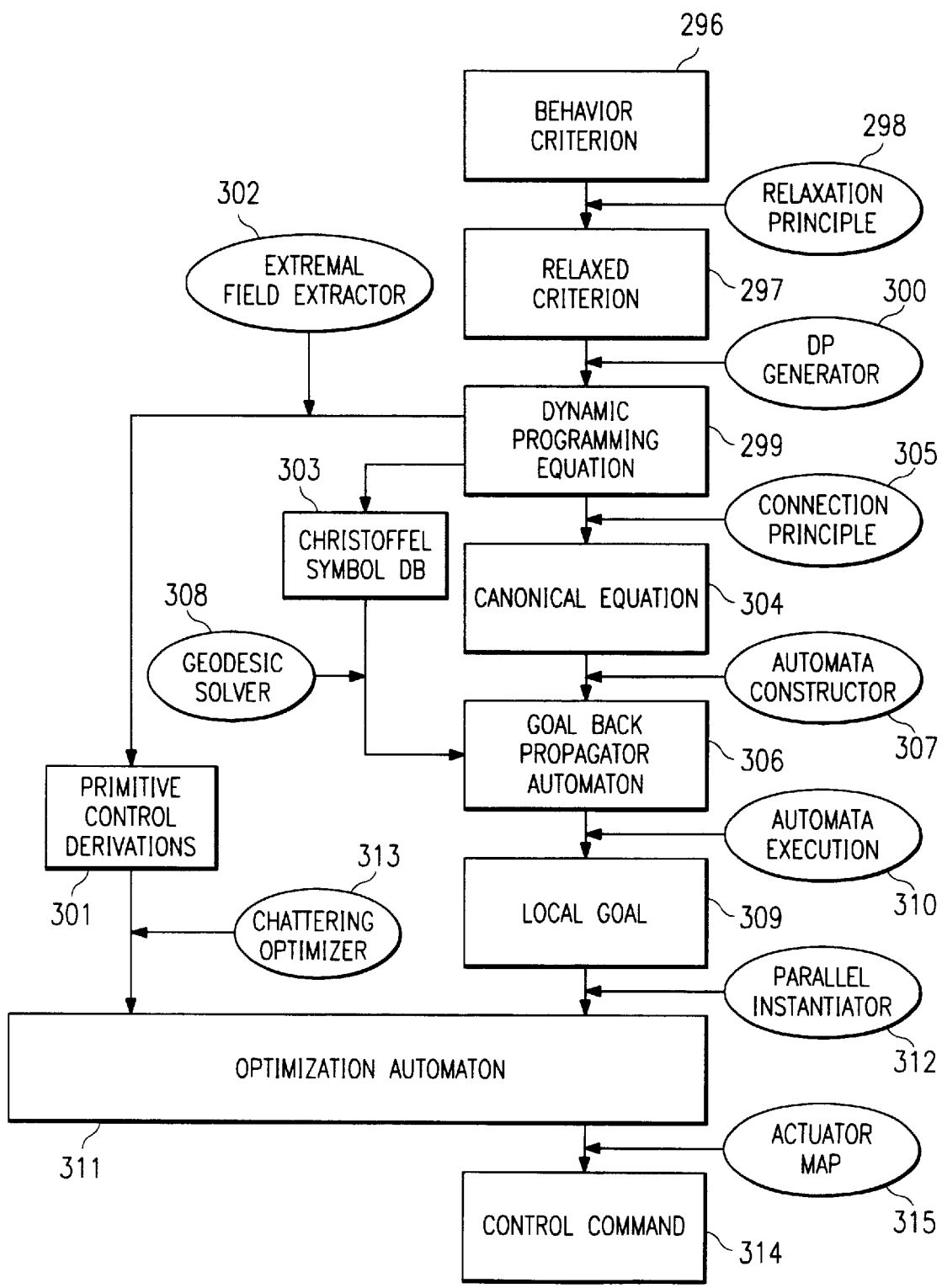
FIG. 14c shows a flowchart for the Inference Automaton Controller which has the same functionality as the Inferencer in depicted FIG. 7, and it can be executed by the procedure of FIG. 14b.

FIG. 14c is a flowchart for the Inference Automaton Controller. It has the same functionality as the Inferencer in FIG. 7. However, the implementation of FIG. 14c is itself a finite state machine and hence can be described by a canonical equation of the type described above. Thus, it can be executed by the procedure of FIG. 14b. Each of the states in this machine and each of the edges of transformations is executed by one or more nested basic sub-procedures of the type described above. The data processed by the Inference Automaton Controller is extracted from the Direct Memory Map (DMM) data structure. Using the same convention as in FIG. 14b, the rectangles of FIG. 14c represent computation steps and the circles and ovals represent inference operators. Each computational step of FIG. 14c along with the inference operators which produce that computational step as described as follows.

The Behavior Criterion 296 is the plan generated by the Planner. The behavior criterion 296 is encoded as an optimization criterion and is a function of the state trajectory (through the carrier manifold) of the distributed process under control as viewed by the agent, see FIG. 1c, the rate of change with respect to the state of each state point and the agent clock variable. This criterion is described as the Lagrangian functional of the agent.

The Relaxed Criterion 297 is a convex approximation criterion of the behavior criterion 296. It is constructed by applying the relaxation principle 298 to the encoded behavior criterion. This inference operator is encoding of Young's relaxation principle.

The Dynamic Programming Equation 299 is a hybrid version of the Bellman optimality principle. It is described in "Feedback Derivations: Near optimal control for Hybrid Systems" by W. Kohn, J. Remmel and A. Nerode, Proceedings of CESA '96 517–521. The dynamic programming equation is obtained from the relaxed criterion by the application of the DP generator 300.

Primitive control derivations 301 are also called primitive control actions or primitive infinitesimal control actions. The primitive control actions are operators in the tangent bundle of the carrier manifold and are extracted from the dynamic programming equation 299. In the vicinity of the current agent state, they define a basis of the tangent space for near optimal trajectories from the current state of the agent that solves the dynamic programming equation. The primitive control actions are obtained from the dynamic programming equation using the external field extractor 302 inference operator.

The Christoffel symbol data base 303 are functional forms depending on the current agent state. They are determined by relations extracted from the dynamic programming equation criterion and are computed as solutions to differential equations which are structurally dependent on the Hessian of the agent Lagrangian.

The canonical equation 304 is a representation of the dynamic programming equation of the form of KSE equations. It is a blueprint for solving the dynamic programming equation 299 by constructing a finite state machine. The inference operator that effects the transformation from the dynamic programming formulation to the canonical equation is the connection principle 305. This principle is based in the Levi-Civita formulation of geodesic trajectories via connections.

The goal back propagator automation 306 is a finite non-deterministic state machine that simulates navigation over the set of memory patches which is a function of agent sensory data and the Christoffel symbols. This navigation is performed along a tube of near optimal trajectories (geodesic trajectories) backwards from the goal towards the patch containing the current state point. The underlying mechanism defining the state transition of this machine is the Levi-Chivita parallel transport procedure. The goal propagator automaton is obtained in symbolic form from the canonical equation by applying the automata constructor inference operator 307 and is instantiated for execution from the Christoffel Symbol DB via a procedure called the geodesic solver 308 which solves differential equations for the geodesics.

The local goal 309 is a point in the current memory patch or a memory patch which is a neighbor of the current memory patch. The local goal is obtained by backwards navigation. That is, it is obtained by executing the goal back propagator automaton. The execution 310 of the goal back propagator automaton is carried out using the decomposition procedure of the KSZE equations.

The optimization automation 311 implements the computation of the control action for the next update interval as a chattering combination 313 of the primitive control derivations and the local goal. The machine that implements the optimization algorithm produces an iterative Lie bracket of the primitive control actions of the current memory patch as a function of the chattering coefficients and the primitive control derivations. The resulting control derivation at the end of the update interval and the local goal must be parallel to each other in the sense of Levi-Civita. The parallel instantiator 312 determines the labels of the edges in the optimization automation 311.

The control command 314 is computed by mapping the control derivation computed by the optimization automaton to the tangent space of the control signal space. This produces a control derivation in this space. Next, the actuator map 315 is applied to this derivation. The range of this actuator map 315 is the set of possible feedback control trajectories computed by the agent. The actuator map 315 is computed by deriving a canonical equation whose solution is the actuator map, constructing the corresponding automaton and then executing this automaton with the procedure of FIG. 14b.

As shown in FIG. 14a, the control loop operation 253 involves only two modules: the Inference Automaton Controller 254 and the Knowledge Model 255. The Inference Automaton Controller 254 is an abstract state machine that navigates in the domain defined by the Knowledge Model 255. The knowledge model encodes the agent knowledge into objects referred to as memory patches. Although the Knowledge Model 255 is logically equivalent to the Knowledge Base 28 of the architectural model given in FIG. 2, it is implemented in a content addressable memory structure and should not be thought of as a collection of clauses as the Knowledge Base is thought. In the Control Loop 253, the plan 258 generated by the Planner 252 in the Reactive Learning Loop 256 is fixed. The Inference Automaton Controller functions 254 to monitor whether the current plan 258 is logically compatible with the current state 260 of the Knowledge Model 255. The Controller 254 also generates control actions 259 at the appropriate times (when the controlling process expects them) and to generate status information (agent constraints) for the other agents. The Knowledge Model functions to update the agent knowledge as a function of sensory inputs 261. Agent Network inputs 262, and inference inputs 257. The Knowledge Model also maintains and updates agent state 260. The module also generates agent status information 263 for the Agent Network.

The plan 258 generated by the Planner 257 which is seen by the control loop 253 does not change over time as long as the Inferencer 257 can successfully prove that the plan 258 logically follows from the model stored in the Knowledge Model 255. Thus, during intervals in which the plan 252 is valid, the reactive learning loop 256 operates independently of the control loop 253. The connection between Reactive Learning and the Control loops is activated only when the Inferencer 254 in the Control Loop determines an incompatibility between the stored model 255 and the current plan 158.

The Inference Automaton Controller 264 in the Reactive Learning Loop 252 functions to monitor the success of the Control Loop Inference Automaton 254 and to verify correctness of plan 258 generated by the Planner 257.

The function of the Adapter 265 is to compute plan correction terms 266 as a function of Failure Terms 267 generated by the Control Loop 253 upon its failure.

The functionality of the Reactive Learning Loop is to generate the Behavior Criterion as a function of encoded agent goal and failure terms. Once a plan is formulated by the Planner that plan will remain active until the Control Loop fails to produce the control signals in a given update interval. To generate a new plan, the Planner replaces the catch-all potential of the current Behavior criterion with correction terms generated by the Adapter. The correction terms produced by the Adapter are a function of the failure terms passed to it by the Control Loop. This produces a new candidate for the Behavior Criterion.

The Planner then passes this new candidate to the Inference Automaton Controller of the Reactive Learning Loop to test whether the new candidate is consistent with a set of generic ELL rules which is stored in that Inference Automaton Controller. If the new candidate is consistent with those rules, then the new candidate is passed to Adapter which checks if further correction is needed. If further correction is needed, the new candidate is sent back to the Planner and the process is repeated until the Adapter does not change the current candidate for the Behavior Criterion which has been passed to it by the Inference Automaton Controller of the Reactive Learning Loop. Finally when a candidate for a new Behavior Criterion is not modified by the Adapter, the Adapted passes that candidate to the Planner which, in turn, passes it to the Inference Automaton Controller of the Control Loop.

Figure 14D:
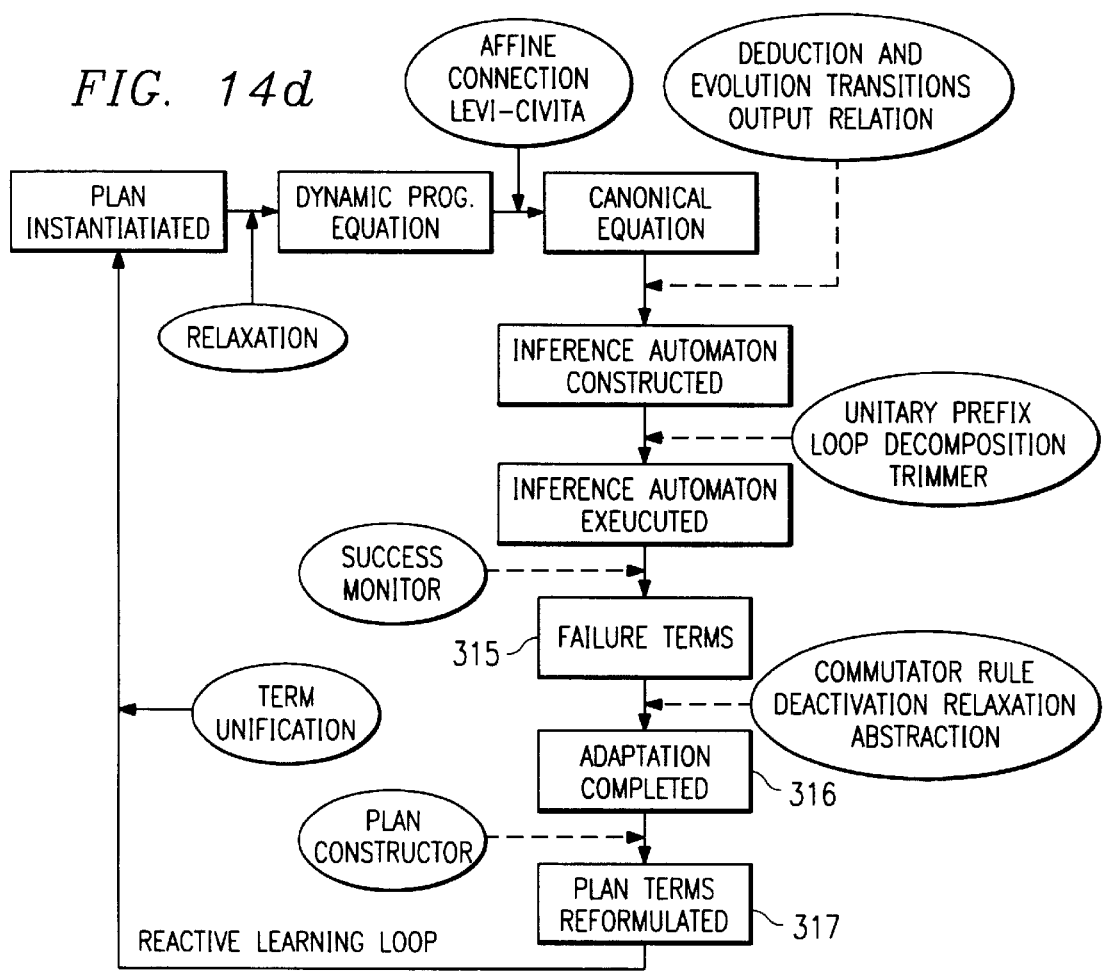
FIG. 14d shows the computational steps of the Reactive Learning Loop.

FIG. 14d provides a picture of the computational steps of the Reactive Learning Loop. In FIG. 14d, the rectangles represent computational steps and the circles and ovals represent inference operators. Each computational step of FIG. 14d along with the inference operators which produce that computation step are described as follows.

The computational steps starting with Plan Instantiated and proceeding through to Inference Automaton Executed are just an abridged representation of the path in the Inference Automaton Controller pictured in FIG. 14c which starts as the Behavior Criterion and ends at the Optimization Automaton. This is consistent with the FIG. 14a which shows the Planner and Inference Automaton Controller as part of the Reactive Learning Loop. The remaining computational steps of FIG. 14d correspond to the Adapter Module of FIG. 14a.

The failure terms 315 are state trajectory segments of the Optimization Automaton constructed by the Inference Automaton Controller that fails to reach a terminal state. The terminal states of such automaton always correspond to a goal memory patch. These state trajectories corresponds to path automata constructed by the Basic Subprocedure implementing the Optimization Automaton and they represent traversing a sequence of memory patches. The last term in each one of these state trajectories is actually a failure term if either it is not a goal state or is a goal state which fails to instantiate any values when the "apply inference to" operator the ELL code is invoked. This means that one or more of the clauses associated with the memory patch corresponding to the end of one of these state trajectories is a modifiable clause whose variables cannot be instantiated to a value which will make the clause true. Here we note that the clauses of the Knowledge Bases are divided into two categories. There are clauses which are not modifiable such as the clauses which defined the basic operational aspects of the modules or clauses corresponding to invariant conditions which must hold.

If a failure term corresponds to a memory patch not in the goal class, then the commutator inference operator is used to generate a correction potential which a correction term which will be included in the catch all potential of the modified plan generated by the Planner. This correction potential is constructed as follows. First a new rule corresponding to the potential is constructed by the commutator inference operator, specifically Commutator($pcc_i^q, pcc_i^g$,) (Boundaries$_q$, t)=$pcc_{iq}(pcc_i^q)$(Boundaries$_q$, t) where the superscript q corresponds to the memory patch, the superscript g refers to the goal class, and the subscript i refers to the i-th pcc in the memory patch. Let $pcc_i^{q,new}$=Commutator ($pcc_i^q$, $pcc_{ig}$)(Boundaries$_q$, t). The "apply inference to" operator is used to construct a new primitive derivation operator corresponding to this clause, specifically eval($pcc_i^{q,new}$,Boundaries$_q$, t)←$op_{iq,new}$(Boundaries$_q$, t), whose effect is to drive that state corresponding to q closer to the goal state g. Then the commutator inference operator constructs a potential function which when added to the current will produce the desired effect of enabling the system to make a transition from q to g. This potential is given by:

$$V_q(Boundaries_g, t) = \frac{\int_{Boundaries_g}^{Boundaries_q} \exp(t \cdot op^{q,new}(X, t)) \cdot \exp(t \cdot op_i^g(X, t)) \cdot dX}{k}$$

Each potential $V_q$ constructed in this way is incorporated into the new plan by adding it to the catchall potential. There are two points that need to be clarified at this point. First, $pcc_i^{q,new}$ is actually a pointer to the new clause but for the purposes of this explanation, we will identify $pcc_i^{q,new}$ with this clause. Second, this new clause is not immediately incorporated into the Knowledge Model. The incorporation of the new clause into the Knowledge Model only happens when we make one more pass through the Reactive Learning. That is, it is incorporated into the Knowledge Model only when the new Canonical Equation is constructed corresponding to the new Behavior Criterion constructed by the Planner.

If the memory patch corresponding to a failure term is a goal patch, then a variable cannot be instantiated in one of the clauses to make it true. In this case, the Behavior Criterion is tightened by replacing the update interval length Δ by Δ/2. In this case, the Planner will construct a new Behavior Criterion via a Relaxation Operator.

There are two other cases that cause failures. First, a clause in the failed patch may be inconsistent with the current sensory information stored in the Knowledge Model. In this case, the clause is deactivated, i.e. the rule is eliminated from the Knowledge Model by the Deactivation operator. Only modifiable rules can be deactivated. Finally it may be the case that the open set corresponding to the failed memory patch and the open set corresponding to a goal class intersect, but the rules of the two memory patches for values of Boundaries in the intersection are not compatible. In this case, the Abstraction operator creates a new memory patch which is the union of the failure memory patch and the goal memory patch. The key step in creating the union is to create a new list of primitive control derivations for the union which is just the union of the primitive control derivations in the two memory patches. This is carried out by the Abstraction operator via the following rule:

$$pcc_1^q(Boundaries_q \cap Boundaries_g) \neq pcc_i^g(Boundaries_g) \xrightarrow{abstraction}$$
$$Boundaries_q \cup Boundaries_g.$$

The Adaption completed, module 316 is the module that actually creates the new clauses and/or memory patches depending on the four classes of failure terms described above. The Plan Terms reformulated module 317 is the module that modifies the catch all potential or added new clauses to the knowledge base depending on the four classes of failure terms described above.

FIG. 15 is a conceptual illustration of the Direct Memory Map (DMM). The DMM is used to implement the agent architecture of FIG. 14. DMM is a procedure for transforming knowledge. At the input of the procedure, the agent's knowledge 268 is encoded as a collection of Equational Logic Clauses (FIGS. 5a, 5b). These are a special class of Horn clauses which allow a designer to encode properties of the system under control, desired agent behaviors, constraints, agent network interaction, etc. These types of clauses are very effective bridges between a graphic description of these properties and the run time representation of the agent knowledge. The DMM acts as a Compiler of agent knowledge. The Direct Memory Map provides a data structure, called memory patches, which is used to organize the knowledge contained in each agent's Knowledge Base. A memory patch is a computational representation of an open set in the topology of the carrier manifold.

The DMM procedure is conceptualized as occurring in 2 steps.

Figure 16:
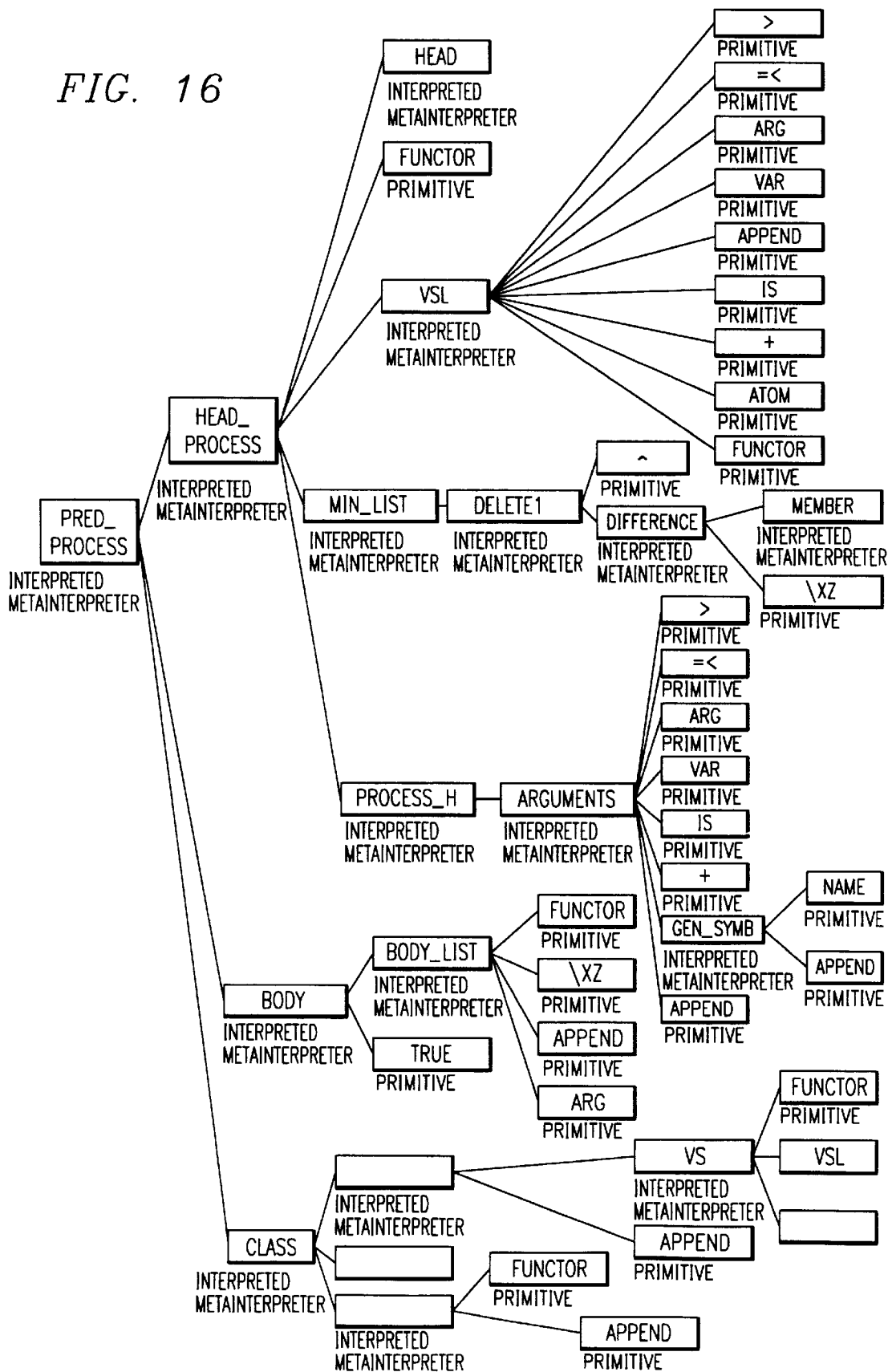
FIG. 16 shows the evolution elements called Derivation Control Operators which are the primitive instructions of the programmable abstract machine for implementing the navigation of a hybrid agent in memory patches.

In the first step, from the given agent ELL clauses 271, DMM extracts the evolution elements, domain descriptors, variables and parameters. The evolution elements, called Derivation Control Operators, are the primitive instructions of the programmable abstract machine for implementing the navigation of a hybrid agent in memory patches pictured in FIG. 16. The domain descriptors are additional constraints beyond the Derivation Control Operators which constrain the behavior of the process controlled by the agent.

Unlike most other programmable digital devices, the instruction set (i.e. the set of Derivation Control Operators) is not defined independently of the domain 269. That is, each geometric object in the domain, called an Open Set 272, has a set of Derivation Control Operators assigned to it that is determined by the knowledge associated with that open set 272. The Derivation Control Operators define how the navigator moves from a point in the open set 272 to another point which is either in the same open set or in a neighboring open set. The Planner provides a blueprint which enables the Inference Automation Controller to assemble for each open set 272, a particular combination of the combinations ensure, if possible, the desired local behavior. However, two or more open sets must have a nontrivial intersection due to the fact that the knowledge of the system to be controlled may not be precise enough to obtain a complete partition of the domain space. This means that the implementation of the plan is in general nondeterministic. This nondeterminism can be resolved by on-line optimization.

In the second step, the basic geometric objects and their corresponding Control Derivations Operators are mapped into the basic element of the overall data structure called memory patches 273. A memory patch 273 is a nested list of the form:

$$[\text{Boundaries}, [op_1, \ldots, op_n], [\alpha_1, \ldots, \alpha_n], [pcc_1, \ldots, pcc_n], \text{Christoffel\_Symbol\_Pointers}] \quad (31)$$

In Equation (31), Boundaries represent boundary conditions for the evolution which takes the form of a partially instantiated point in the open set, each $op_i$ is a Derivation Control Operator associated to the open set, each $pcc_i$ is a pointer to control clauses which characterize the properties of the corresponding Control Derivation operator $op_i$, and each $\alpha_i$ is a chattering combination coefficient. Each $\alpha_i$ is a fraction of the control interval that the agent's uses to Control Derivation operator $op_i$ to evolve to the next state. The Christoffel_Symbol_Pointers are pointers to functional data needed to map the goal memory patch back to the current memory patch 270. The algorithm which implements this map is a variant of the dynamic programming algorithm for hybrid systems. The algorithm implementing the map of the goal memory patch back to the current memory patch uses the parallel transport element of the Hybrid Dynamic Programming Algorithm that computes a local goal in the current memory patch that is compatible with the contents of the goal patch. Specifically, the algorithm computes a parallel version of the goal field elements and evaluates them with the state data of the current memory patch.

The advantage of this architecture is that a pointer to a control clause $pcc_i$ can point to a preprocessed module which represent the result of the Prolog resolution of the set of clauses which characterize the Control Derivation Operator $op_i$. These derivation are not processed on-line. An example of the type of code which can be processed is given in FIG. 16 where the call graph of predicate pred_process is depicted. The predicate pred_process takes a general ELL clause and separates and classifies the various parts of the clause so that the clause can be easily modified or manipulated in subsequent computations. In the Direct Memory Map architecture, these modules are constructed by carrying out linear resolution without unification during the compilation using DMM. This means that the only elements of a computation is kept to a minimum. Also, the memory requirements for carrying out resolution on line have been reduced.

TABLE I

Percentage of Time for the Basic Operations of MAHCA Implementation

| Operation | Non-DMM Implementation | DMM Implementation |
|---|---|---|
| Unification | 13% | <8% |
| Search | 42% | 0% |
| Resolution | 30% | 9%* |
| Backtracking | 10% | 0% |
| I/O | 5% | 5% |
| Memory Operations | 0% | 87% |
| Bus Speed | ~10 milliseconds | ~100 nanoseconds |

*Precompiled

Table I compares % of the update time that the agent modules spending the basic operations of deductive inference. The first row shows that the percentage of time spent by the Non-DMM implementation on unification is 13% while the DMM implementation spends <8% of its time on unification. This reduction is due to the fact that the non-DMM implementation uses the general Robinson unification procedure while the DMM uses the procedure 'apply inference to' of /* basic subprocedure */, which has been optimized for performing unification on the data structures of the memory patches. Clause search is not required in the DMM implementation because the knowledge clauses are mapped into the appropriate patch so that during execution the agent uses the clauses pointed to by the current memory patch and no others. Resolution is not required in the DMM implementation is replaced with adaptation which is significantly more efficient. Finally, most of the update time of the DMM implementation of a MAHCA agent is spent in memory operations. However, these memory operations can be carried out in Digital Signal Processor in which the bus speed ~100 nanoseconds/operation while the non-DMM implementation requires a general purpose processor where the bus speed is approximately ~10 millisecs/operation. This is the main reason for the speed-up of the DMM implementation of agents.

Figure 17A:
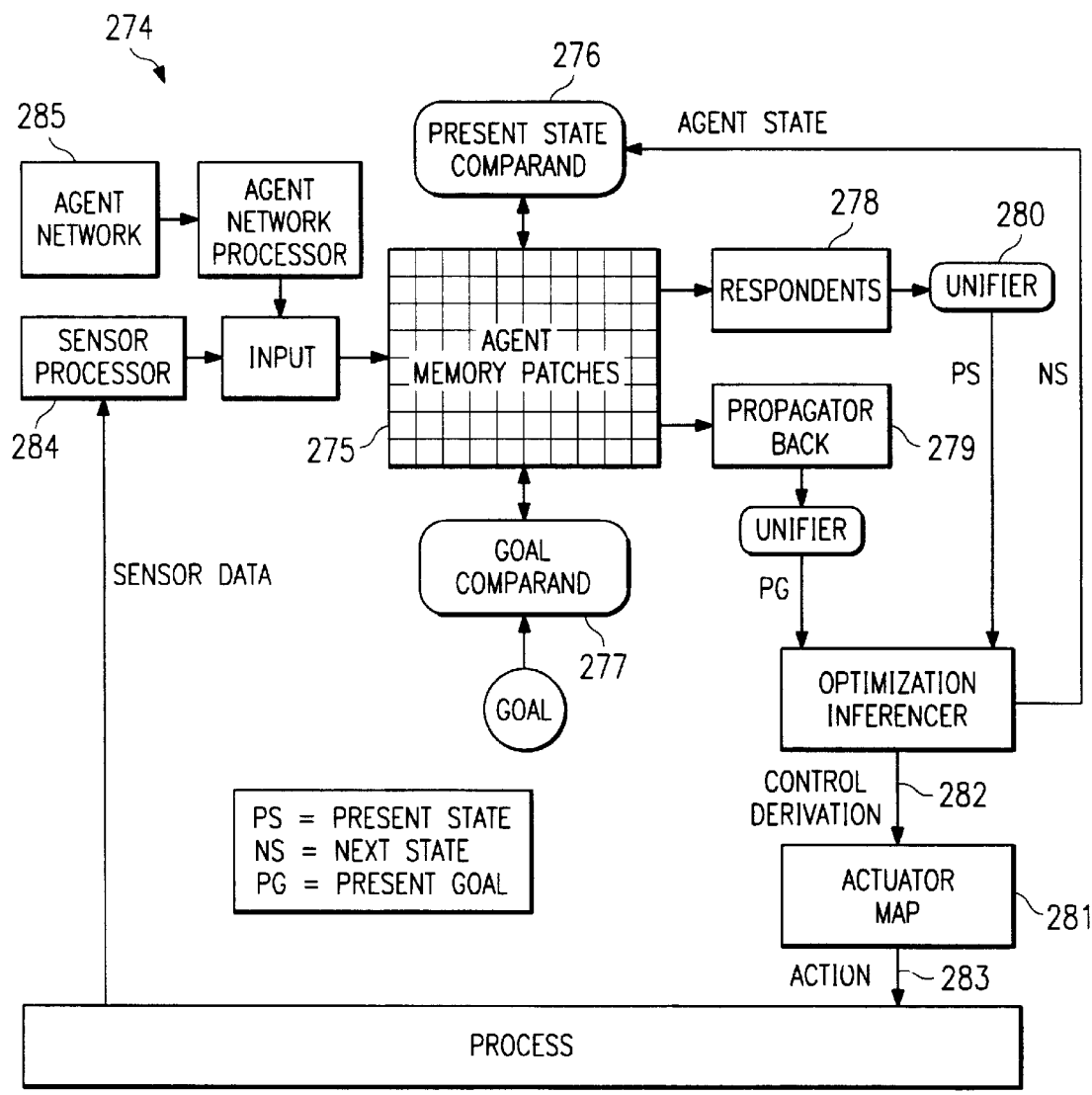
FIG. 17a shows a diagram of the Direct Memory Map Machine for the Control Loop of an agent.

FIG. 17a is a diagram of the Direct Memory Map Machine 274 for the Control Loop of an agent. The central functionality is given by an active array of memory patches encoding the Knowledge Model. Each element of Agent Memory Patches array 275 has the structure described in equation (31). The basic mechanism of this structure operates as content addressable memory.

Content addressable memory schemes operate as follows. A specialized register called the comparand stores a pattern that is compared with contents of the memory cells. If the content of a memory cell matches or partially matches the pattern of the comparand that cell is activated. The DMM has two comparands, the Present State Comparand and the Goal Comparand 277. The content of the memory patches which are activated by the Present State Comparand 276 are transferred to the Respondents buffer 278. The content of the memory patches which are activated by the Goal Comparand 277 are transferred to the area marked Back Propagator 279. The comparand pattern involves only the first two coordinates of the 5-tuple structure of a memory patch, but may use others, depending the structure of the memory patch.

The contents of memory patches transferred to the Respondents area 278 represent the current state of information about the process under control by the agent. Through the process of pattern unification 280, all this information is summarized into a respondent memory patch where the first two coordinates are instantiated or partially instantiated. The remaining three coordinates of the respondent memory patch are computed as follows. The hybrid systems theory shows that there is a unique chattering combination of the Control Derivation Operators of the respondent memory patch such that it produces a Derivation Operator that is the result of back propagation of the goal Derivation Operator. The back propagation of the goal Derivation Operator is obtained by the process of parallel transport via the Levi-Civita connection. This chattering combination can be computed by two applications of a unification or pattern matching applied to Derivation Operators. The chattering combination gives the chattering coefficients of the respondent memory patch. The pointers to control clauses of the respondent memory patch can be computed from the Derivation Operators of the respondents. The Christoffel coefficients are functions which depend on the boundary condition of the respondent memory patch. These coefficients are computed through a process of interpolation of coefficients stored in data base.

Finally, the Control Derivation Operator determined by the chattering combinations is feed to a procedure called Actuator Map 281. This procedure executes the Control Derivation 282. This procedure executes the Control Derivation 282 and produces the required Control Action 283 for the process until the next update.

The memory patches of the next update are constructed from the current memory patches, the sensory data 284 received at the next update time, and the constraints received from the other agents 285 at the next update time.

The DMM can be viewed as a schema for implementing MAHCA, not as a collection of agents and the agent network, but as a collection of agents navigating in a virtual memory space whose elements are virtual pages. Here a virtual page is collection of memory patches of the form of an Agent Memory Patch described in FIG. 17a which is stored in auxiliary memory rather than main active main. The Boundary Condition field of a memory patch is coordinatized by 3 parameters: Agent Id, Page Number and Offset Number. The first parameter establishes the agent owner of the knowledge encoded in the patch, the second parameter gives the virtual page of the memory patch, and the third its relative position in virtual or domain. In principle, the network characteristics and protocols can be encoded in memory patches as just another type model knowledge. So, an agent looks at the domain as a collection of processes working in a common memory space. This model of the agent is only feasible when we have a system where the characteristics and protocols of the network are known in advance and remain stable. However, in may applications such total knowledge of the network is not available. In that case, a different model must be used, in which each agent has a Knowledge Decoder module.

Figure 17B:
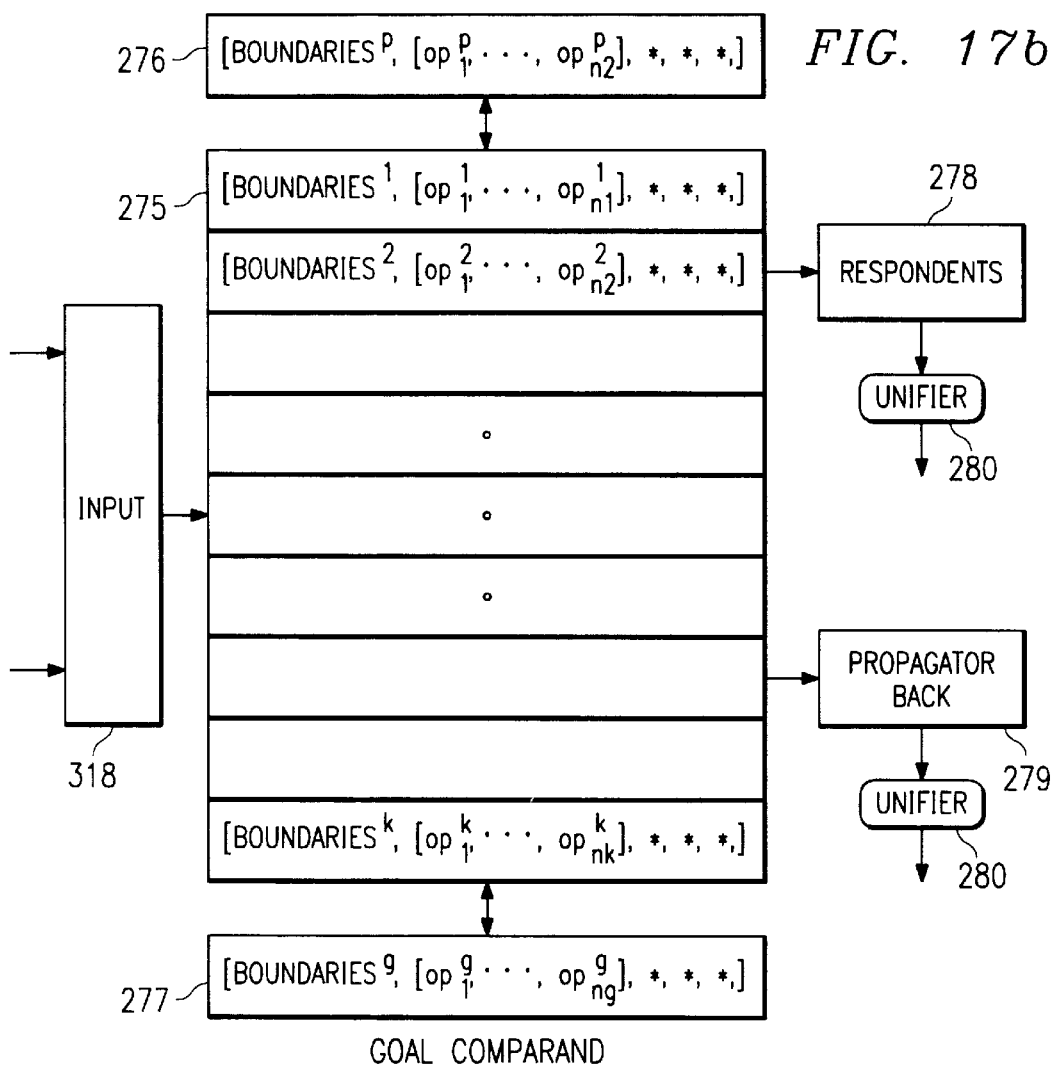
FIG. 17b shows an implementation diagram of the role of the memory patches in DMM that uses content addressable memory, which uses variable fields for storage.

FIG. 17b is an implementation diagram of the role of the memory patches in DMM. It uses content addressable memory, which uses variable fields for storage. Each variable field stores a memory patch data structure 275. The mechanism used by content addressable memories is the following. First register, called a comparand, broadcasts a pattern to the memory field. Those fields whose content unifies, in the sense of the "apply-to" function whose code is given in the /* Basic Subprocedure */, with the comparand download their contents to a buffer called the respondents buffer. In the content addressable memory implementation of FIG. 17b, there are two comparand registers, the present state comparand register 276 and the goal comparand register 277.

In addition to these buffers, there is an INPUT processor 318 that updates the fields of the Boundaries in the memory patches 275 with information derived from the agent sensors and its companion agent. That information is broadcast to both the present state 276 and goal comparand 277 registers to update the fields of the present state and goal comparands. The chattering coefficients subfield of the present state comparand is updated by the optimization inferencer (also called the optimization automation) which is part of the Inferencer Automation Controller. The goal comparand is constructed from the goal which is stored in the Planner.

The contents of those memory patched that respond to the present state comparand 276 are downloaded to the Respondents buffer 278 and the contents of those memory patches that respond to the goal comparand 277 are downloaded to the Back Propagator buffer 279.

Only the first two subfields of a memory patch are tested for unification with pattern broadcast by the Present State and Goal comparands. The remaining three subfields are the payload of the patch. Once the subfield corresponding the chattering coefficients is updated by the optimization inferencer, the comparand register downloads that information to the corresponding fields of the memory patches that responded to the broadcast of the present state comparand. The fourth subfield contains pointers to the call graphs of the clauses of rules defining the primitive control derivations stored in the second subfield. The actual call graphs are stored in regular memory and executed when the corresponding patch is activated, i.e. when its data is downloaded to the respondents buffer.

The rules in the Knowledge Base of an agent are preprocessed at compile time so that for each memory patch, the entries of the fourth subfield of the memory patch can be computed. Each entry in the pcc's is a pointer to a call graph which computes the corresponding primitive control action in the second subfield of the memory patch.

The application of MAHCA to compression/decompression consists of processing and storage of the audio or video source as a DMM data structure and the on-line or off-line decompression of the stored DMM data structure. The processing of the source is a lossy process which can be altered by changing the set precision in the knowledge models of the compression and decompression agents. The uncompressed data source is a sequence of data pages. In the case of video, a page is a frame composed of pixels 320. In the case of audio, a page is a collection of counts 320.

The pages 319 are causally ordered with respect to the clock of the source. For the purpose of compression sequence of pages 319 are viewed as moving surfaces over a 2-dimensional carrier manifold. The compression algorithm is implemented in a MAHCA agent as follows: Each page of the source is fed consecutively to the agent planner as a goal. The planner builds a plan fragment as a potential corresponding to the current 3 consecutive pages. This potential is added to the current plan as a catchall potential. The planner generates the current optimization criterion and send it to the inference automation controller. This criterion captures the data from the pages.

Figure 18:
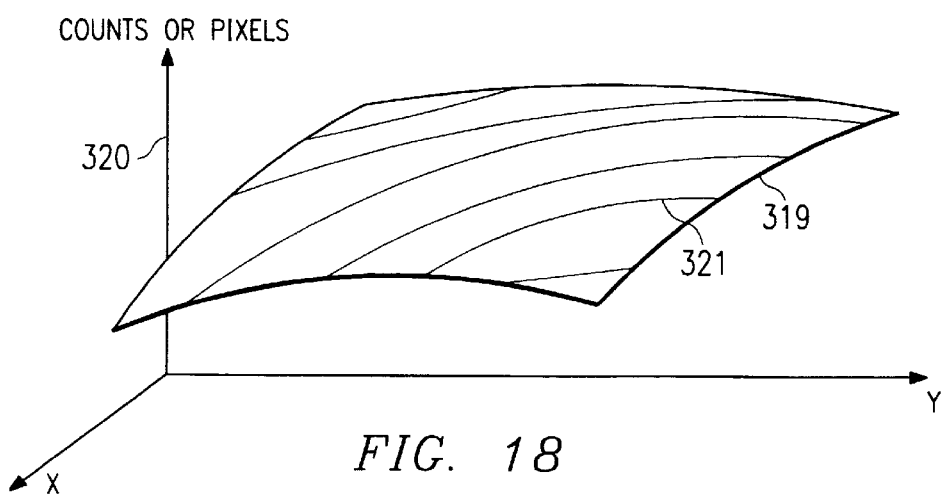
FIG. 18 shows coordinate geodesic curves to cover the last page fed that are generated by the inference automaton controller.

The inference automaton controller generates coordinate geodesic curves 321 to cover the last page fed. This is illustrated in FIG. 18. The inference automaton controller encodes each of these coordinates into a DMM structure. The stream of DMM encodings constitute the compressed version of the source.

The decompression agent does not have a planner or an adapter. The DMM stream is fed via the input processor to the knowledge model of the decompression agent. Once a page has been received, the inference automaton controller of this agent uses the DMM data to generate the coordinate geodesics via the integration procedure of the actuator map. The result is the corresponding uncompressed page.

The architecture for content addressable memory is part of the implementation of MAHCA called the Direct Memory Map (DMM). The DMM associative memory is a special kind of associative memory. DMM associative memory is an array of variable length, i.e., variable number of bits, elements referred to as the fields of the array.

Each field of an element of DMM associative memory is composed of two arrays of bits called the pattern matching subfield 322 and the payload subfield 323. The pattern matching subfield is itself composed of two sub-arrays and called the state sub-array 324 and the operator sub-array 325. The payload subfield is itself composed of two subfields called the coefficient subfield 326 and the pointer subfield 327.

Figure 19:
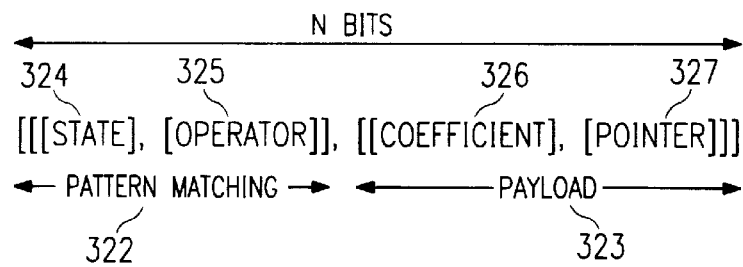
FIG. 19 shows a content addressable array of DMM associative memory elements which are used to form the DMM associative memory device.

The DMM associative memory device is composed of a content addressable array of DMM associative memory elements of the form shown in FIG. 19. The addressing is carried out by two comparand registers called the state comparand register and the goal comparand register. The state comparand register includes two pattern matching subfields, the state subfield and the operator subfield. The goal comparand register has a single pattern matching subfield called the goal subfield.

The pattern matching subfields contains the information necessary for determining unification substitutions that match the contents of the comparand registers. The state comparand register unifies with respect to both the state and the operator subfields. The goal comparand register unifies only with respect to the state subfield.

The state subfield 324 is a variable length string of bits corresponding to an attainable state of the process or computation under control. The operator subfield 325 is a string of bits encoding one or more primitive operators that transform the current state to a new state.

The coefficient subfield 326 is an encoding of a list of tokens. A token can either be a variable symbol or a rational number between 0 and 1. The pointer subfield 327 is a list of integers encoding pointers to callable procedures stored in non-associative memory. For each element in DMM associative memory, the number of operators encoded in the operator subfield equals the number of tokens encoded in the coefficient subfield which in turn equals the number of pointers encoded in the pointer subfield.

Functionally, the operators 325 encoded in the operator subfield determine primitive transformations of the state when the corresponding associative memory is selected via unification. The tokens encoded in the coefficient subfield are used to construct a complex transformation from these primitive transformations via a chattering procedure. The pointers encoded in the pointer subfield are pointers to clauses which encode rules for evaluating the corresponding primitive transformations.

The DMM memory device is a component of a nonstandard hardware processor for dynamic navigation in memory. A block diagram of this processor is shown in FIG. 17b. The device is composed of eight functional subsystems.

The input processor subsystem 318 is a subsystem which processes external sensor and goal data and generates updates for the state subfields of some or all of the elements in the memory. The functionality of the two comparand registers, is similar to the one found in standard memories with two caveats. First, the state 276 and goal comparands 277 work asynchronously so hardware components in the memory fields must be provided to recover from accessing clashes. Second, the comparison criteria is based on a generalized intersection operation called Robinson unification instead of equality. The state and goal respondents 278 are buffers that collect the memory field contents which unified with the state 276 and goal 277 comparand respectively after a unification step. The unifier 280 is a device that combine fields in the buffer into a single element which is compatible with DMM syntax by a generalized unification procedure based on parallel transport. The data generated by the unifiers 322 is fed to an external processor, called the Memory Navigation Automaton or optimization inferencer, which computes the contents for the next state comparand and the actions the hybrid control system sends to the process under control.

Thus, the multiple-agent hybrid control architecture can be used for intelligent, real-time control of distributed, nonlinear processes and real-time control of conventional functions. This invention may, of course, be carried out in specific ways other than those set forth here without departing from the spirit and essential characteristics of the invention. Therefore, the presented embodiments should be considered in all respects as illustrative and not restrictive, and all modifications falling within the meaning and equivalency range of the appended claims are intended to be embraced therein.

What is claimed is:

1. An agent for controlling a local process of a distributed hybrid system comprising:

a control loop for controlling the local process according to stored requirements that are valid;

a reactive learning loop for modifying the stored requirements when the requirements are not valid; and wherein the control loop is separated from the reactive learning loop such that while the stored requirements are valid, the control loop operates independently from the reactive learning loop.

2. The agent of claim 1, wherein the control loop comprises:

a knowledge model for storing the requirements as a plan; and a control inferencer that comprises an abstract state machine that navigates in a domain defined by the knowledge model and determines whether the plan is compatible with a current state of the knowledge model.

3. The agent of claim 2, wherein the plan is fixed until the control inferencer indicates that the plan is not compatible with the current state of the knowledge model.

4. The agent of claim 3, further comprising:

a coupling channel that connects the control loop with the reactive learning loop;

wherein failure terms of the incompatibility of the plan are sent from the control inferencer to the reactive learning loop through the coupling channel, and the coupling channel is active only when the plan is incompatible.

5. The agent of claim 1, wherein the reactive learning loop comprises:

a planner for generating a plan representing the requirements of desired behavior of the system as logic expressions;

a reactive inferencer for determining whether the plan is currently active in the control loop; and an adapter connected to the inferencer for computing correction terms for the plan if the plan is not currently active in the control loop.

6. The agent of claim 5, further comprising:

a coupling channel that connects the control loop with the reactive learning loop;

wherein a corrected plan is sent from the planner to the control loop through the coupling channel, and the coupling channel is active only when the plan is inactive.

7. The agent of claim 1, wherein the control loop comprises:

a knowledge model for storing the requirements as a plan; and a control inferencer that comprises an abstract state machine that navigates in a domain defined by the knowledge model and determines whether the plan is compatible with a current state of the knowledge model; and wherein the reactive learning loop comprises:

a planner for generating the plan representing the requirements of desired behavior of the system as logic expressions;

a reactive inferencer for determining whether the plan is currently active in the control loop by monitoring the control loop inferencer; and an adapter connected to the inferencer for computing correction terms for the plan if the plan is not currently active in the control loop.

8. The agent of claim 7, wherein the control loop is connected to the reactive learning loop through first and second coupling channels, wherein the first coupling channel relays failure terms defining the incompatibility of the plan from the control inferencer to the adapter; and the second coupling channel relays the correction terms for the plan from the planner to the control inferencer.

9. The agent of claim 8, wherein the coupling channels only relay the failure terms and the correction terms when the plan in the control loop is inactive because it is incompatible.

10. The agent of claim 8, wherein the agent is used for data compression from a data source.

11. The agent of claim 10, wherein the data source is a video source.

12. The agent of claim 10, wherein the data source is an audio source.

13. The agent of claim 10, wherein each data page from the data source is fed to the planner as a goal;

the planner constructs a plan fragment as a potential corresponding to at least two current consecutive pages;

the planner generates a current optimization criterion from the plan fragment and provides the criterion to the control inferencer;

the control inferencer generates coordinate geodesic curves based on the criterion;

the curves are encoded into a direct memory map structure; and the encoded curves are the compressed data.

14. The agent of claim 8, wherein the agent is used for data decompression of compressed data from a data source.

15. The agent of claim 14, wherein the data source is a video source.

16. The agent of claim 14, wherein the data source is an audio source.

17. The agent of claim 14, wherein the compressed data is provided to the knowledge model;

the control inferencer uses the data in the knowledge model to construct coordinate geodesics through an integration procedure; and the geodesics correspond to the uncompressed data.

18. The agent of claim 7, wherein the planner and the adapter use symbolic pattern matching during computational operation.

19. The agent of claim 7, wherein the reactive inferencer is a finite state machine and includes means for recursive finite state machine decomposition for computational operation.

20. The agent of claim 19, wherein the means for recursive finite state machine decomposition further comprises:

means for parallel composition for transforming the finite state machine into a parallel series of unitary automatons;

means for cascade decomposition for transforming each unitary automaton into a series of prefix automatons and loop automatons;

means for linearization for modifying the loop automatons by including a new terminal state to form base automatons;

means for trimming inaccessible base automatons that include inaccessible states;

means for determining if each base automaton corresponds to a successful path in the finite state machine; and means for outputting each successful base automaton as to the adapter for eventual use as correction terms for the plan.

21. The agent of claim 7, wherein the adapter receives the failure terms from the control inferencer and computes correction terms as a function of the failure terms;

the planner receives the correction terms from the adapter and generates a new plan from the correction terms; and the reactive inferencer receives and tests the new plan for consistency with ELL rules stored with the reactive inferencer, if the new plan is inconsistent, then the new plan is sent back to the adapter for refinement, if the new plan is consistent then the new plan is sent to the control inferencer.

22. The agent of claim 7, wherein the knowledge model uses memory patches to store the requirements of the local process.

23. The agent of claim 1, wherein the control loop is a direct memory map machine.

24. The agent of claim 23, wherein the direct memory map machine comprises:

an input for providing input information from sensory information about the process being controlled and constraint information from other agents;

an array of memory patches for storing a knowledge model corresponding to the input information;

a goal comparand register for comparing a stored process goal with the input information, the register operates to activate at least one of the memory patches of the array of memory patches if the pattern of the process goal at least partially matches the pattern of said at least one of the array of memory patches;

a present state comparand register for comparing a stored present state of the process with the input information, the register operates to activates at least one of the memory patches of the array of memory patches if the pattern of the present state at least partially matches the pattern of said at least one of the array of memory patches;

a respondents buffer for storing matched memory patch contents that are activated by the present state comparand register, the contents represent the current state of the process;

a back propagator buffer for storing matched memory patch contents that are activated by the goal comparand register;

means for unifying a portion of the information stored in the respondents buffer to form a portion of a respondent memory patch;

means for computing the remaining portion of the respondent memory patch using a unique chattering combination of the contents of the respondents buffer and the contents of the back propagator buffer; and means, using the respondent memory patch, to generate a required control action for controlling the process.

25. The agent of claim 24, wherein the array of memory patches operates as content addressable memory.

26. The agent of claim 24, wherein the memory patch is a computational representation of an open set in a topology of a carrier manifold.

* * * * *